United States Patent
Tomaru et al.

(10) Patent No.: US 6,818,062 B2
(45) Date of Patent: Nov. 16, 2004

(54) COATING METHOD AND APPARATUS

(75) Inventors: Mikio Tomaru, Odawara (JP);
Toshihiro Mandai, Odawara (JP);
Norio Shibata, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/281,970

(22) Filed: Oct. 29, 2002

(65) Prior Publication Data

US 2003/0175430 A1 Sep. 18, 2003

(30) Foreign Application Priority Data

| Oct. 29, 2001 | (JP) | .................................... | 2001-330709 |
| Oct. 29, 2001 | (JP) | .................................... | 2001-330710 |
| Oct. 29, 2001 | (JP) | .................................... | 2001-330711 |
| Oct. 29, 2001 | (JP) | .................................... | 2001-331019 |
| Oct. 29, 2001 | (JP) | .................................... | 2001-331178 |
| Nov. 20, 2001 | (JP) | .................................... | 2001-354092 |
| Sep. 20, 2002 | (JP) | .................................... | 2002-275108 |
| Sep. 20, 2002 | (JP) | .................................... | 2002-275109 |
| Sep. 20, 2002 | (JP) | .................................... | 2002-275110 |
| Sep. 20, 2002 | (JP) | .................................... | 2002-275111 |

(51) Int. Cl.$^7$ ............................................ B05C 11/04
(52) U.S. Cl. .................... 118/123; 118/126; 118/413; 427/356

(58) Field of Search ................................ 118/123, 126, 118/413, 62; 427/356, 358

(56) References Cited

U.S. PATENT DOCUMENTS

| 3,113,884 | A | * | 12/1963 | Kohler | ........................ 427/288 |
| 3,733,711 | A | * | 5/1973 | Haythornthwaite | .......... 34/456 |
| 4,776,997 | A | * | 10/1988 | Chino et al. | ................. 264/412 |
| 4,899,687 | A | * | 2/1990 | Sommer et al. | ............ 118/126 |
| 5,306,523 | A | * | 4/1994 | Shibata | ........................ 427/129 |
| 5,582,870 | A | * | 12/1996 | Shigesada et al. | ........... 427/358 |

FOREIGN PATENT DOCUMENTS

| JP | 04-260471 | * | 9/1992 |
| JP | 5-8065 | | 2/1993 |
| JP | 2614119 | | 2/1997 |

* cited by examiner

Primary Examiner—Katherine A. Bareford
(74) Attorney, Agent, or Firm—Sughrue Mion, PLLC

(57) ABSTRACT

It is possible to give ultrathin and uniform coating on a flexible web in scraping-off type coating. The distribution of pressure in a web width direction is adjusted by a pressure distribution adjusting device when an excess of coating liquid excessively applied is scraped off by a doctor blade by giving relative pressure to a coating surface of a web and the doctor blade after applying the coating liquid that is more excessive than the desired quantity of the coating liquid on the web by a precoating apparatus while making the web continuously travel.

7 Claims, 33 Drawing Sheets

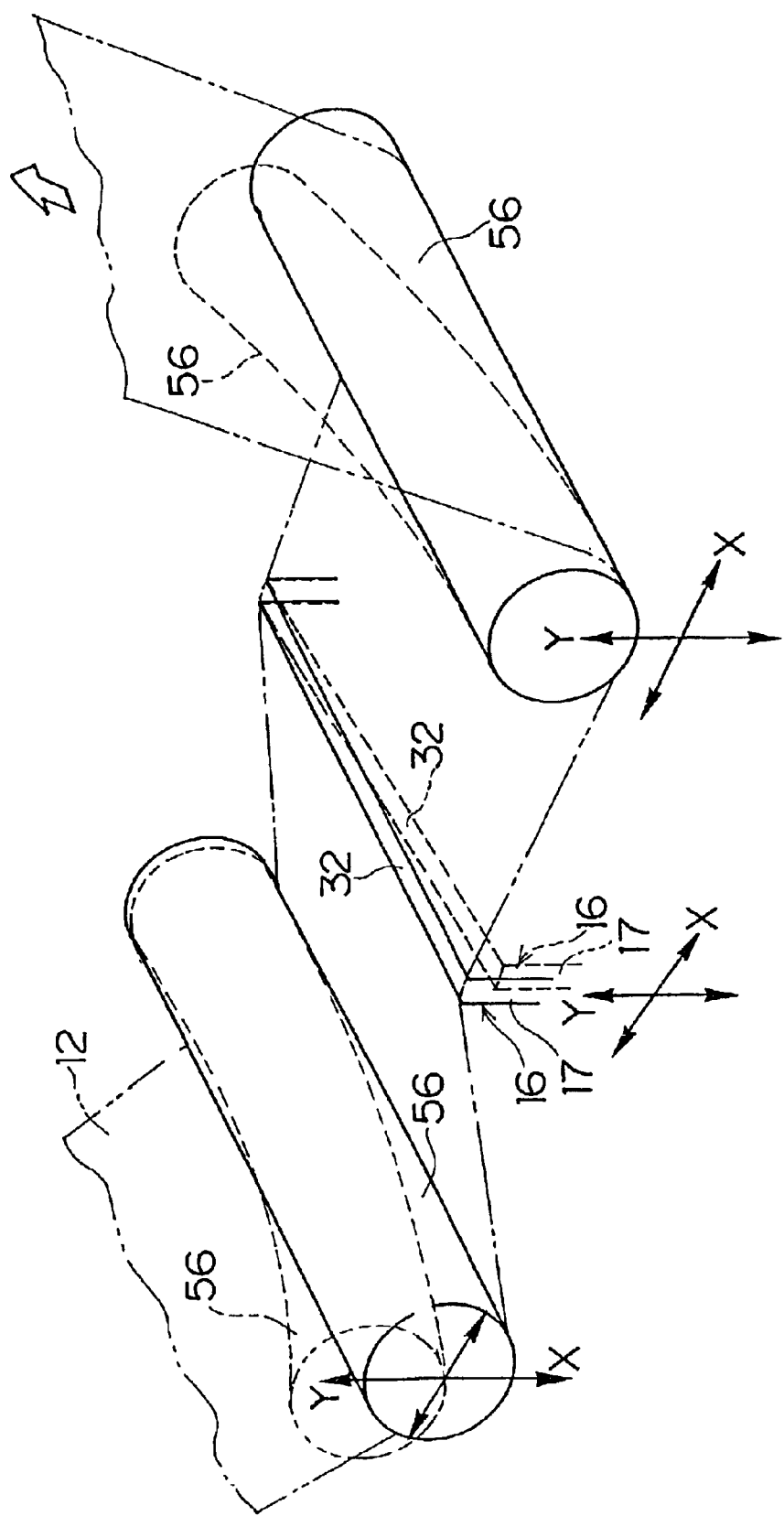

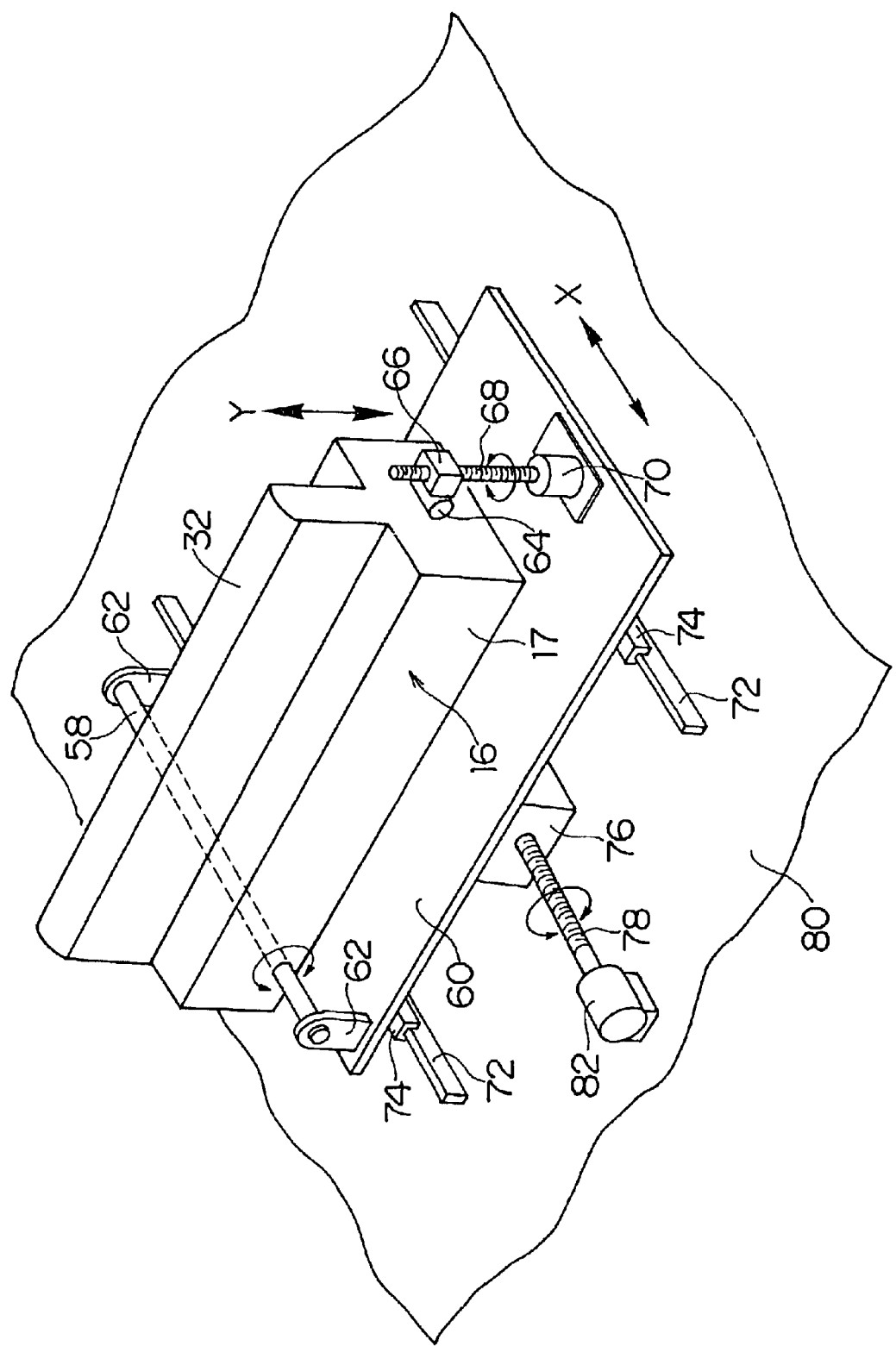

COATING METHOD AND APPARATUS

BACKGROUND OF THE INVENTION

1. Field of the Invention

The present invention relates to a coating method and an apparatus, and in particular, to a coating method and an apparatus for applying a substrate used for the production of photosensitive material and a magnetic recording medium.

2. Description of the Related Art

Each of photosensitive material and magnetic recording media is produced through a coating step of forming a coating film by applying predetermined coating liquid such as magnetic liquid on a continuously running flexible substrate (hereinafter referred to as a web). In particular, since the capacity and recording density of magnetic recording media such as magnetic recording tapes are rapidly improved as the use for broadcasting and computers, the coating technology of being able to obtain a magnetic layer having thin film thickness and smooth surface has been requested.

As methods of applying coating liquid on a web surface, there are, for example, a roll coater method, a gravure coating method, a roll coater plus doctor method, an extrusion type coating method, and a slide coater type coating method, etc.

Among extrusion type coating apparatuses, in such a coating apparatus of pressing a point of a coating head to a web as disclosed in Japanese Patent Publication No. 5-8065, it is possible to obtain a thin uniform coating layer with excluding air coming with the web by raising hydraulic pressure in the point of the coating head by using web tension. Hence, this type of apparatuses is frequently used in a field of production of magnetic recording media.

However, since there is a limit in the thickness of a possible coating layer even when coating is performed by this extrusion type of coating apparatus, there is a problem that it is not possible to sufficiently respond to a demand of obtaining a magnetic layer with thin film thickness. In addition, there is a defect that a stripe is easily generated in the coating layer due to web cut at the point of the coating head.

From this, as a coating apparatus that can obtain a thinner coating layer without a coating stripe, there is a doctor blade scraping-off type coating apparatus disclosed in Japanese Patent No. 2614119. This coating apparatus obtains a thin coating layer by scraping off an excess of coating liquid with a doctor blade arranged in a downstream side of a roll coater type applicator after applying the excessive coating liquid on a web by the applicator. In this case, though the roll coater type apparatus is used in Patent No. 2614119 as a coating apparatus to apply the excessive coating liquid on the web, it is not limited to this, but it is possible to use a supporting-member-pressurizing extrusion type apparatus, a backed-up extrusion type apparatus, a gravure slide coater type apparatus, or the like.

Nevertheless, though a conventional doctor blade scraping-off type coating apparatus is a coating apparatus that comparatively easily forms a thin coating layer without a coating stripe, there is a defect that the following coating defects may be caused when an ultrathin magnetic layer, which is unprecedented and is 2 $\mu$m or less in a moist state, like those of magnetic recording media in recent years is formed.

(1) Coating thickness distribution is easily generated in a web width direction of a coating layer after scraping-off by the doctor blade due to the thickness distribution of the web itself and single-edged slack.

(2) Coating thickness distribution is easily generated in the web width direction of a coating layer after scraping-off by the doctor blade.

(3) Coating thickness variation is easily generated in a web-traveling direction of a final coating layer after scraping-off by the doctor blade.

(4) Uneven coating may be caused in the web width direction.

(5) A detailed unevenness may be generated as a coating surface gets rough.

(6) Coating stripes may happen frequently.

The above-described coating defects from items (1) to (6) were not problems particularly in the case of coating layer thickness demanded of a magnetic layer of a conventional magnetic recording medium. Nevertheless, they become obvious by making the thickness of a magnetic layer of a magnetic recording medium be 2 $\mu$m or less, which is unprecedented and ultrathin, in a moist state in recent years. Hence, it is necessary to pursue occurrence causes of these coating defects and to exclude their factors.

SUMMARY OF THE INVENTION

The present invention is devised in consideration of such circumstances and aims to provide a coating method and an apparatus for being able to perform ultrathin and uniform coating on a web without causing a coating defect in scraping-off type coating.

In order to achieve the above-described object, the first form of the present invention is characterized in a coating apparatus that scrapes off an excess of coating liquid, excessively applied, with an doctor blade with relatively pressing the doctor blade on a coated side surface of a web after applying of the coating liquid, which is more excessive than desired quantity of coating liquid, on the web by a precoating apparatus while making a web travel continuously, comprising a pressure distribution adjusting device which adjusts pressure distribution in a width direction of the web pressed.

According to the first form of the present invention, a pressure distribution adjusting device adjusting the distribution of pressure, relatively pressuring the doctor blade and the web, in the width direction of the web is installed. Hence, it is possible to intentionally adjusting the scraping-off quantity of coating liquid in the width direction of the web. Owing to this, it is possible to perform the scraping-off of the coating liquid according to the thickness distribution of the web itself, the single-edged slack of the web, and the like. In particular, when a ultrathin magnetic layer, which is unprecedented and has the thickness of 2 $\mu$m or less in a moist state, like a magnetic recording medium in recent years, the influence of the thickness distribution of the web itself and the single-edged slack becomes obvious, but it is possible to solve it by the present invention.

As a preferable form of the pressure distribution adjusting device, a roller is installed in at least one side of an upstream side and a downstream side of the doctor blade in a traveling direction of the web, and this roller is inclined by an inclination mechanism in a width direction of the web. Owing to this, it is possible to adjust pressure distribution in the width direction of the web. In this case, when an expander roller is used as the roller, it is possible not to linearly incline the web in the width direction of the web, but to curvilinearly incline it. Therefore, it is possible not to make the pressure distribution be linear from one edge to another edge in the width direction of the web, but to adjust the pressure distribution curvilinearly.

As another preferable form of the pressure distribution adjusting device, a blade inclination mechanism inclining the doctor blade in the width direction of the web can be also used.

Furthermore, pressure distribution in the width direction of the web can be adjusted with air by installing an air jet nozzle, which can adjust blowing pressure in the width direction of the web, on the opposite side of the doctor blade across the web.

As still another preferable form of the present invention, it is preferable to adjust the pressure distribution in the width direction of the web by a pressure distribution adjusting device so that the coating thickness distribution of a coating layer in the width direction of the web after scraping-off by the doctor blade may become 20% or less.

As a further preferable form of the present invention, it is preferable to have the configuration that coating liquid applied on the web is not exposed to the air during from the applying of the coating liquid on the web to the scraping-off of an excess of the coating liquid. Here, a sentence "coating liquid applied on the web is not exposed to the air" means a state that a coating surface of the web where the coating liquid is applied is not exposed to at least the air, but it is not a problem whether an edge in the width direction of the web is exposed to the air.

In order to achieve the above-described object, the fifth form of the present invention is characterized in a coating method for scraping off an excess of coating liquid, excessively applied, with a scraping-off member with relatively pressing the scraping-off member on a coated side surface of a web after applying of the coating liquid, which is more excessive than desired quantity of coating liquid, on the web by a precoating apparatus while making a web travel continuously, comprising a step of making coating thickness distribution in the width direction of the web before an excess of coating liquid is scraped off by the scraping-off member be 20% or less.

Like the fifth form of the present invention, in the case of a post-measurement system of coating method for forming a final coating layer by scraping off an excess by a scraping-off member after excessive applying is performed by a precoating apparatus beforehand, it has been considered that the final layer thickness of the coating layer and the thickness distribution in the width direction of the web are determined by the quality of scraping-off with the scraping-off member. Hence, heretofore, the scraping-off technology has been researched.

However, when researching factors that the final thickness distribution of the coating layer was generated, the present inventor found that not only the quality of scraping-off with the scraping-off member greatly influences, but also the coating thickness distribution of the web in the width direction before the scraping-off greatly influences the thickness distribution of a final coating layer in the width direction of the web after the scraping-off. In particular, when an ultrathin magnetic layer, which is unprecedented and has the thickness of 2 $\mu$m or less in a moist state, like a magnetic recording medium in recent years, the influence of the coating thickness distribution of the web in the width direction before scraping-off becomes obvious.

The present invention is devised on the basis of this finding, and makes the coating thickness distribution in the width direction of the web before scraping-off of the excess of coating liquid, excessively applied in a precoating apparatus, by scraping-off member 20% or less. Owing to this, with maintaining features of the scraping-off type coating method suitable for obtaining an ultrathin coating layer, it is possible to remarkably reduce the thickness distribution of the final coating layer in the width direction of the web. Hence, this is particularly effective as a coating method of obtaining an ultrathin magnetic layer of 2 $\mu$m or less in a moist state. In addition, as the scraping-off member used here, a doctor blade or a rod (a flat rod, a wire rod, or a grooved rod) can be suitably used.

Moreover, as a method of making the coating thickness distribution in the width direction of the web before scraping-off be 20% or less, any one of a method of providing a coating thickness distribution adjusting function for a precoating apparatus itself, or a method of providing the coating thickness distribution adjusting function separately from the precoating apparatus is acceptable.

As a preferable form of adjusting the coating thickness distribution in the width direction of the web before scraping-off, it is possible to suitably use a method of adjusting its slit width by using a coating head, having a slit, such as a supporting-member-pressurizing extrusion type coating head or a backed-up extrusion type coating head as the precoating apparatus. In this case, in the supporting-member-pressurizing extrusion type coating head, it is possible to adjust the coating thickness distribution by inclining support rollers installed in the upstream and downstream sides of the coating head. Moreover, it is also good to use the inclination of the support rollers and slit width adjustment together. In short, the method is good so long as the method can make the coating thickness distribution in the width direction of the web before scraping-off by the scraping-off member be 20% or less.

In addition, also in the case of the fifth form, it is preferable to have the configuration that coating liquid applied on the web is not exposed to the air during from the applying of the coating liquid on the web to the scraping-off of an excess of the coating liquid.

In order to achieve the above-described object, the seventh form of the present invention is characterized in a coating method for scraping off an excess of coating liquid, excessively applied, with a scraping-off member with relatively pressing the scraping-off member on a coated side surface of a web after applying of the coating liquid, which is more excessive than desired quantity of coating liquid, on the web by a precoating apparatus while making a web travel continuously, comprising a step of making variance of coating thickness in the traveling direction of the web in a coating layer after scraping-off of an excess of coating liquid by the scraping-off member be 20% or less.

In the case of a post-measurement system of coating method for forming a final coating layer by scraping off an excess by a scraping-off member after excessive applying is performed by a precoating apparatus beforehand, like the seventh form of the present invention, it has been considered that the final layer thickness of the coating layer and the thickness variance in a traveling direction of the web are determined by the quality of scraping-off with the scraping-off member. Hence, heretofore, the scraping-off technology has been researched.

However, when researching factors that the thickness variance of the final coating layer in the traveling direction of the web was generated, the present inventor found that not only the quality of scraping-off with the scraping-off member greatly influences, but also respective factors of thickness variance in the traveling direction of the web before an excess of coating liquid is scraped off by the scraping-off member, variance of traveling speed of the web, tension variance of the web in a portion of the web (a scraping-off portion) where pressure is given by the scraping-off member, and viscosity of the coating liquid greatly influence the thickness variance of the final coating layer in the traveling direction of the web. In particular, when an ultrathin magnetic layer that is unprecedented and has the layer thickness of 2 μm or less in a moist state, the influence of the above-mentioned respective factors becomes obvious. Then, it was found that it is important to make coating thickness variance in the traveling direction of the web in the final coating layer after an excess of coating liquid is scraped off by the scraping-off member be 20% or less, so as to maintain and improve the performance of the coating layer, and in particular, the performance of an ultrathin magnetic layer of 2 μm or less in a moist state.

The present invention is devised on the basis of this finding, and makes the coating thickness variance in the traveling direction of the web after scraping-off of the excess of coating liquid, excessively applied in a precoating apparatus, by the scraping-off member 20% or less. Owing to this, with maintaining features of the scraping-off type coating method suitable for obtaining an ultrathin coating layer, it is possible to remarkably reduce the thickness variance of the final coating layer in the width direction of the web. Hence, it is possible to maintain the quality of the ultrathin magnetic layer, which is unprecedented and is 2 μm or less in the moist state, like those of magnetic recording media in recent years. As the scraping-off member used here, a doctor blade or a rod (a flat rod, or a grooved rod) can be suitably used.

Moreover, as a preferable form of a method of making the coating thickness variation of the coating layer in the traveling direction of the web after scraping-off by the scraping-off member be 20% or less, there are a method of making coating thickness variance in the traveling direction of the web before scraping-off an excess of coating liquid by the scraping-off member be 20% or less, a method of making the variance of traveling speed of the web be 20% or less, a method of making the variance of tension in a traveling direction of the web in a web portion, where pressure is given by the scraping-off member, be 10% or less, and a method of making the variance of viscosity of coating liquid be 20% or less, but it is preferable to combine these methods properly.

In addition, also in the case of the seventh form, it is preferable to have the configuration that coating liquid applied on the web is not exposed to the air during from the applying of the coating liquid on the web to the scraping-off of an excess of the coating liquid.

In order to achieve the above-mentioned object, the twelfth form of the present invention is characterized in a coating method for scraping off an excess of coating liquid with relatively pressing a scraping-off member on a coated side surface of a web after applying of the coating liquid, which is more excessive than desired quantity of coating liquid, on the web by a precoating apparatus while making a web travel continuously, comprising a step of preventing a crimp of the web in a position of the scraping-off member.

The inventor of the present invention paid attention to the crimp of the web in a position of the scraping-off member as a cause of the uneven thickness generated in the width direction of the web. The crimp of the web used here means a wrinkle in a longitudinal direction that is generated by the web being elastically transformed, as shown in FIG. 31. Heretofore, even if some crimp was generated in a web, there was no large influence on a coated face since the thickness of a coating layer was thick. However, the present inventor found that even some crimp influences directly on the coating surface since the influence of the crimp grows in a position of the scraping-off member when forming an ultrathin coating layer, in particular, a coating layer with the thickness of 2 μm or less in a moist state. The present invention is devised on the basis of this finding, and performs ultrathin and even coating by preventing the crimp of the web in a position of the scraping-off member.

As a method of preventing the crimp, there is a method of adjacently arranging crimp prevention members such as expander rollers, grooved rollers, and edge guiders, before and after the scraping-off member. In this case, it is possible to effectively prevent the crimp of the web in the position of the scraping-off member by arranging the crimp prevention members within a range of not exceeding 1000 mm before and after the scraping-off member in the traveling direction of the web.

Moreover, as another crimp preventing method, there is a method of adjacently arranging a member, having a crimp prevention effect such as support rollers, backup rollers, and coating heads before and after the scraping-off member. In this case, it is possible to effectively prevent the crimp of the web in the position of the scraping-off member by arranging the members, each having a crimp prevention effect, within a range of not exceeding 200 mm before and after the scraping-off member in the traveling direction of the web.

In addition, also in the case of the twelfth form, it is preferable to have the configuration that coating liquid applied on the web is not exposed to the air during from the applying of the coating liquid on the web to the scraping-off of an excess of the coating liquid.

In order to achieve the above-described object, the sixteenth form of the present invention is characterized in a coating apparatus that scrapes off an excess of coating liquid with relatively pressing a doctor blade on a coated side surface of a web after applying of the coating liquid, which is more excessive than desired quantity of coating liquid, on the web by a precoating apparatus while making the a web travel continuously, wherein thickness of the doctor blade in a traveling direction of the web is 1 mm to 30 mm.

The inventor of the present invention paid attention to the cohesion of coating liquid as a main cause of face roughness being generated when ultrathin coating in 2 μm or less was performed in a moist state. Then, from the fact that a coating surface got rougher as coating liquid had stronger cohesion, the inventor found that unevenness appears on a coating surface by the cohesion of the coating liquid and the face roughness is generated. Moreover, the inventor found that what is necessary so as to control this face roughness is to untie the aggregation in the coating liquid by giving an appropriate shearing force with a doctor blade. The present invention is devised on the basis of such a finding, and provide a coating apparatus that can obtain an excellent coating surface by untying the cohesion of coating liquid, which influences an ultrathin coating layer, by giving an appropriate shearing force with a doctor blade.

As a method of giving an appropriate shearing force with a doctor blade, a method of making the thickness of the doctor blade (hereinafter, it is called a "blade thickness") in the traveling direction of a web within an appropriate range, and a method of making a shape of an apical surface (a surface facing the web) of the doctor blade an appropriate shape are conceivable. For example, when ultrathin coating in 2 µm or less is performed in a moist state, the blade thickness of the doctor blade can be made within a range of 1 mm to 30 mm. Since the aggregation in the coating liquid cannot be untied enough if the blade thicknesses is smaller than this range, the face roughness is generated. On the contrary, since the coating liquid scraped off by the doctor blade does not flow smoothly if the blade thickness is larger than this range, uneven coating is generated as a result. Hence, it is possible to obtain an ultrathin coating surface without uneven coating and surface roughness by making the blade thickness of the doctor blade be 1 mm to 30 mm.

Moreover, as a shape of the apical surface of the doctor blade that can effectively give the shearing force, a shape of combining a plurality of planes, a shape of combining a plurality of curved surfaces, or a shape of combining a plane and a curved surface is conceivable. For example, if the radius of curvature is made to become gradually small from an upstream side in the traveling direction of the web to a downstream side when the shape of combining a plurality of curved surfaces is adopted, it is possible to give the shearing force effectively, and hence, it is possible to obtain an ultrathin coating surface without face roughness and uneven coating.

In addition, also in the case of the sixteenth form, it is preferable to have the configuration that coating liquid applied on the web is not exposed to the air during from the applying of the coating liquid on the web to the scraping-off of an excess of the coating liquid.

In order to achieve the above-described object, the seventeenth form of the present invention is characterized in a coating method for scraping off an excess of coating liquid with relatively pressing a scraping-off member on a coated side surface of a web after applying of the coating liquid, which is more excessive than desired quantity of coating liquid, on the web by a precoating apparatus while making a web travel continuously, the evaporation of a solvent vaporizing from the coating liquid on the web is controlled between from the precoating apparatuses to the scraping-off member lest a concentration of a solid component in the coating liquid applied on the web should exceed 80% at a position of the scraping-off member.

The inventor of the present invention found that a main cause that coating stripes happen frequently when an excess of coating liquid is scraped off in the ultrathin coating with the thickness of 2 µm or less in a moist state is the concentration of a solid component in the coating liquid on the web in a position of the scraping-off member. That is, the inventor found that the main cause of the coating stripe is that a solvent evaporates from the coating liquid applied on the web by the precoating apparatus and the concentration of the solid components rises, and in particular, when the concentration of the solid component in the position of the scraping-off member exceeds 80%, the coating stripe happens frequently in the ultrathin coating in the thickness of 2 µm or less. The present invention is devised on the basis of such a finding, and performs ultrathin and even coating by performing control so that the concentration of the solid component in the coating liquid may not exceed 80% in the position of the scraping-off member. The concentration of the solid components in the coating liquid can be adjusted by controlling the evaporate of a solvent (hereinafter, it is called a "solvent evaporate") from coating liquid on the web between from the precoating apparatus to the scraping-off member. In addition, the solvent evaporate may be set to be, for example, 50% or less of the quantity of the solvent (hereinafter, it is called an "initial content") contained in the coating liquid that is applied by the precoating apparatus.

As a preferable control method of the solvent evaporate, it is good to set the time, necessary for scraping off the coating liquid, applied by the precoating apparatus, by the scraping-off member (i.e., "evaporation time" of the solvent) to be, for example, 0.2 seconds or less. Owing to this, since it is possible to reduce the solvent evaporate, it is possible to make the concentration of solid components in coating liquid be 80% or less.

Moreover, as another control method of the solvent evaporate, it is good to lower the temperature of coating liquid applied by a precoating apparatus by 30° or more than a boiling point of a solvent with the lowest boiling point (hereinafter, this is called a "lowest boiling point solvent") among contained solvents in the coating liquid. Owing to this, since the coating liquid in low temperature is applied on the web, it becomes difficult for solvents in the coating liquid to evaporate, and hence, it is possible to control the concentration of the solid components in the coating liquid at 80% or less.

Moreover, as still another control method of the solvent evaporate, it is good to lower the temperature of the web in the position of the precoating apparatus by 30° or more than a boiling point of the lowest boiling point solvent. Owing to this, since the coating liquid is applied on the web in low temperature, it becomes difficult for solvents in the coating liquid to evaporate, and hence, it is possible to control the concentration of the solid components in the coating liquid at 80% or less.

In addition, also in the case of the eighteenth form, it is preferable to have the configuration that coating liquid applied on the web is not exposed to the air during from the applying of the coating liquid on the web to the scraping-off of an excess of the coating liquid.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is an explanatory diagram showing the roller inclination type pressure distribution adjusting device in the case where expander rollers are used as rollers;

FIG. 6 is an explanatory diagram showing an example of an inclination mechanism of the doctor blade inclination type pressure distribution adjusting device;

DETAILED DESCRIPTION OF THE PREFERRED EMBODIMENTS

Hereafter, according to accompanying drawings, preferable embodiments of coating method and apparatus according to the present invention will be explained in detail.

Embodiment 1

Figure 1:
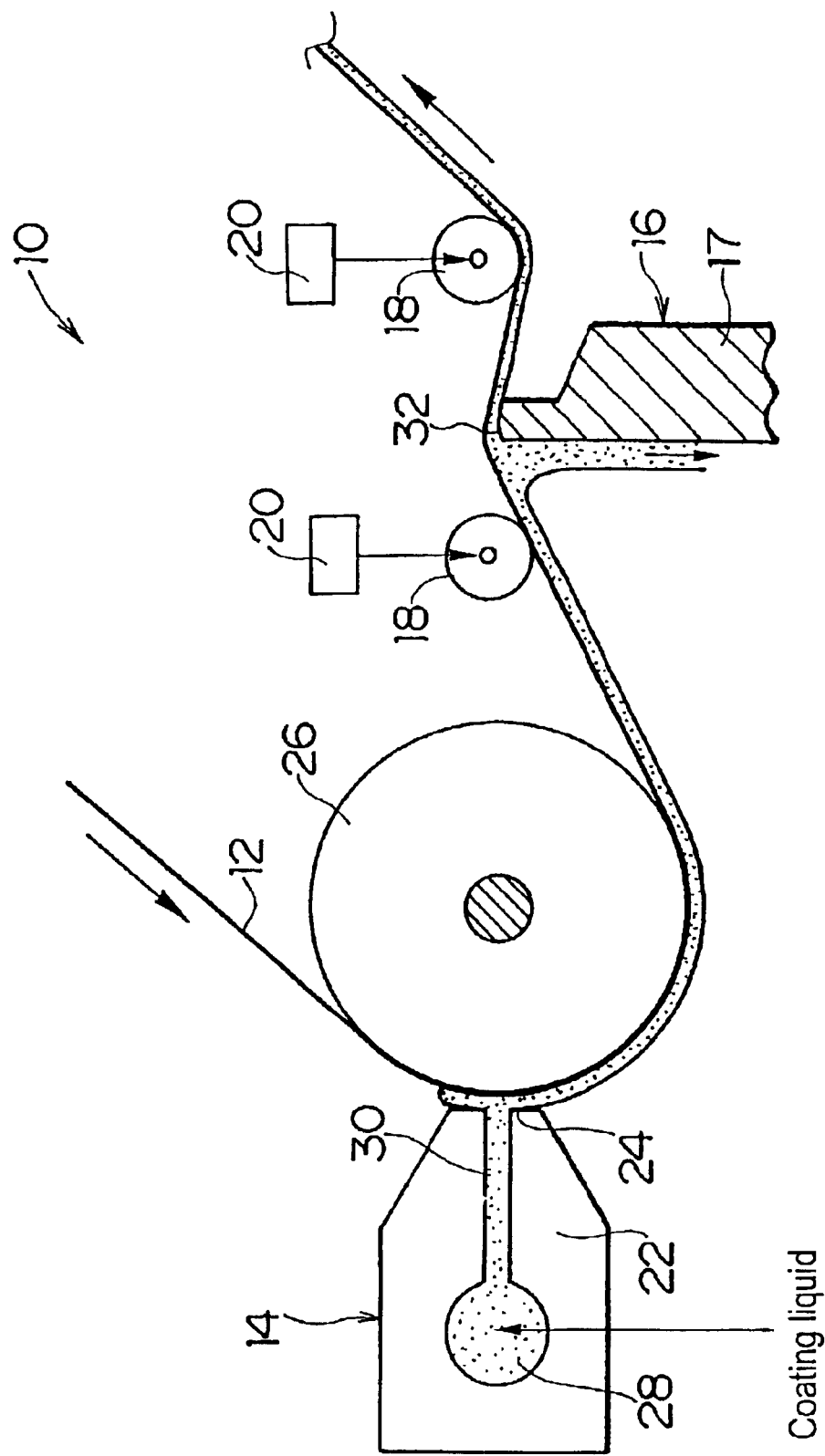
FIG. 1 is a conceptual drawing showing the entire configuration of a scraping-off type coating apparatus according to the first embodiment of the present invention.
Figure 2:
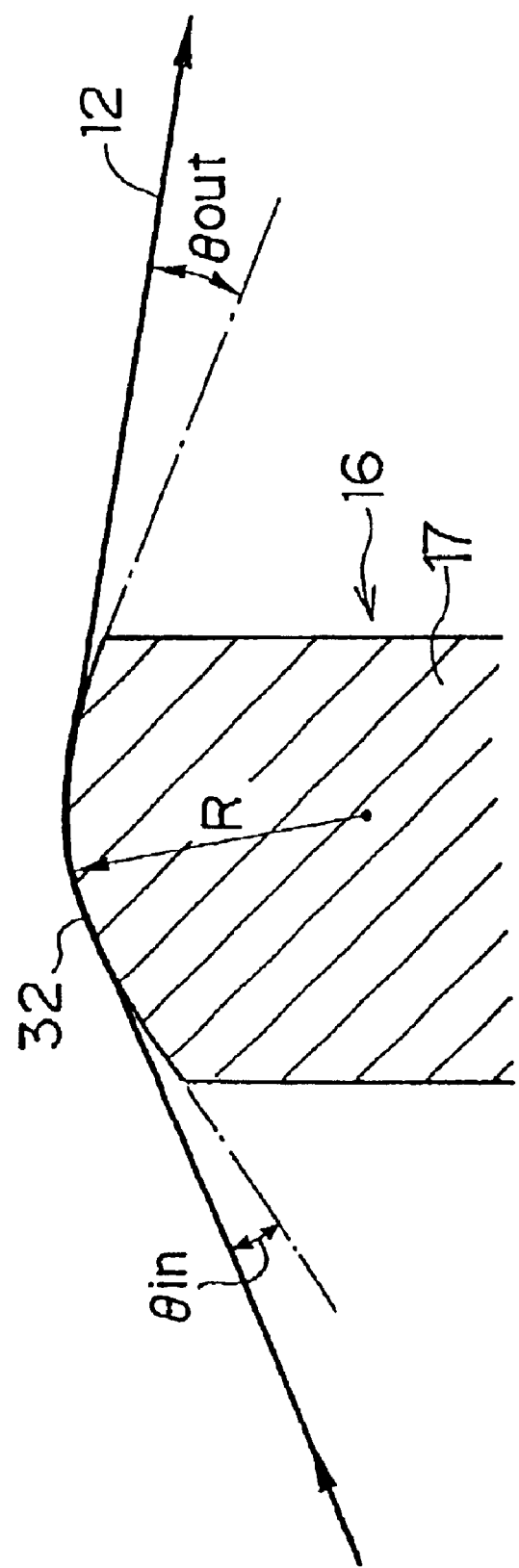
FIG. 2 is a sectional view showing a doctor blade of a coating apparatus according to the present invention.

FIG. 1 is a conceptual drawing showing the entire configuration of a scraping-off type coating apparatus 10 according to the present invention, and FIG. 2 is an enlarged view of an end section of a doctor blade.

As shown in FIG. 1, the coating apparatus 10 mainly comprises: a precoating apparatus 14 applying coating liquid more excess than the desired coating quantity on a web 12 traveling continuously; a doctor blade 17 as a scraping-off member 16 that scraps off an excess of coating liquid; support rollers 18 and 18 that press the web 12 against the doctor blade 17; and a pressure distribution adjusting device 20 that adjusts the pressure distribution in a web width direction. In addition, though a backed-up extrusion type coating head will be exemplified as the precoating apparatus 14, the present invention is not limited to this. But, with providing each support roller in upstream and downstream sides of the precoating apparatus 14 without using a backup roller 26, it is possible to use an extrusion type, roll coater type, gravure coater type, roll coater plus doctor type, slide coater type coating head, or the like, which pressurizes the web to press the web 12 against the precoating apparatus 14.

The precoating apparatus 14 is mainly composed of an extrusion type coating head 22, a backup roller 26 that is arranged with adjacently facing a lip face 24 in an end section of the coating head 22. Inside the coating head 22, not only a cylindrical pocket section 28 is formed along a width direction of the web 12, but also a slit 30 reaching the lip face 24 from the pocket section 28 is formed. The slit 30 is a narrow flow path connecting at the pocket section 28 to the lip face 24, and is extended to the width direction of the web 12. Then, coating liquid supplied to the pocket section 28 of the coating head 22 rises in the slit 30 after being expanded in an web width direction in the pocket section 28, and is discharged from a slit discharge opening. The discharged coating liquid is applied to the web 12 with forming beads between the lip face 24 and web 12 continuously traveling with being supported by the backup roller 26. In addition, as a method of sending the coating liquid to the pocket section 28, any one of a method of blocking one end of the pocket section 28 and supplying the coating liquid from another end, a method of supplying the coating liquid from one end of the pocket section 28 and drawing out the coating liquid from another end, and a method of supplying the coating liquid from a central section of the pocket section 28 and diverting the coating liquid to both ends can be used.

The doctor blade 17 is arranged so as to be approximately orthogonal to a traveling direction of the web 12, and a couple of support rollers 18 and 18 are provided in upstream and downstream sides in the web traveling direction with making the doctor blade 17 a border. This couple of support rollers 18 is arranged in a position that is lower than an edge of the doctor blade 17. Owing to this, since the web 12 continuously traveling is pressed against an apical surface 32 of the doctor blade 17, an excess of the coating liquid excessively applied to the web 12 is scraped off by the doctor blade 17. As shown in FIG. 2, the apical surface 32 of the doctor blade 17 facing the web 12 curves in the curvature R of 1 mm to 30 mm, the web 12 is made to approach to this apical surface 32 with lapping within an incidence angle ($\theta_{IN}$) range of 0.5° to 2°, and a separation angle ($\theta_{OUT}$) is properly set. Owing to this, since it becomes possible to suppress a gap between the apical surface 32 of the doctor blade 17 and the web 12 in 2 $\mu$m or less, it is possible to make the thickness of a coating layer in a moist state after scraping-off by the doctor blade 17 be ultrathin, that is, 2 $\mu$m or less. In addition, the doctor blade 17 is composed of, for example, a hard body such as a super alloy, fine ceramics, alumina A-150, or zirconia, or a member whose surface portion is coated with these materials, and its surface is treated so that surface roughness $R_{max}$ may be 0.5 $\mu$m or less, and preferably, 0.2 $\mu$m or less.

The pressure distribution adjusting device 20 adjusts the pressure distribution in a web width direction that presses the web 12 against the doctor blade 17, for which a roller inclination type, doctor blade inclination type, or back pressure type device can be used suitably.

Figure 3:
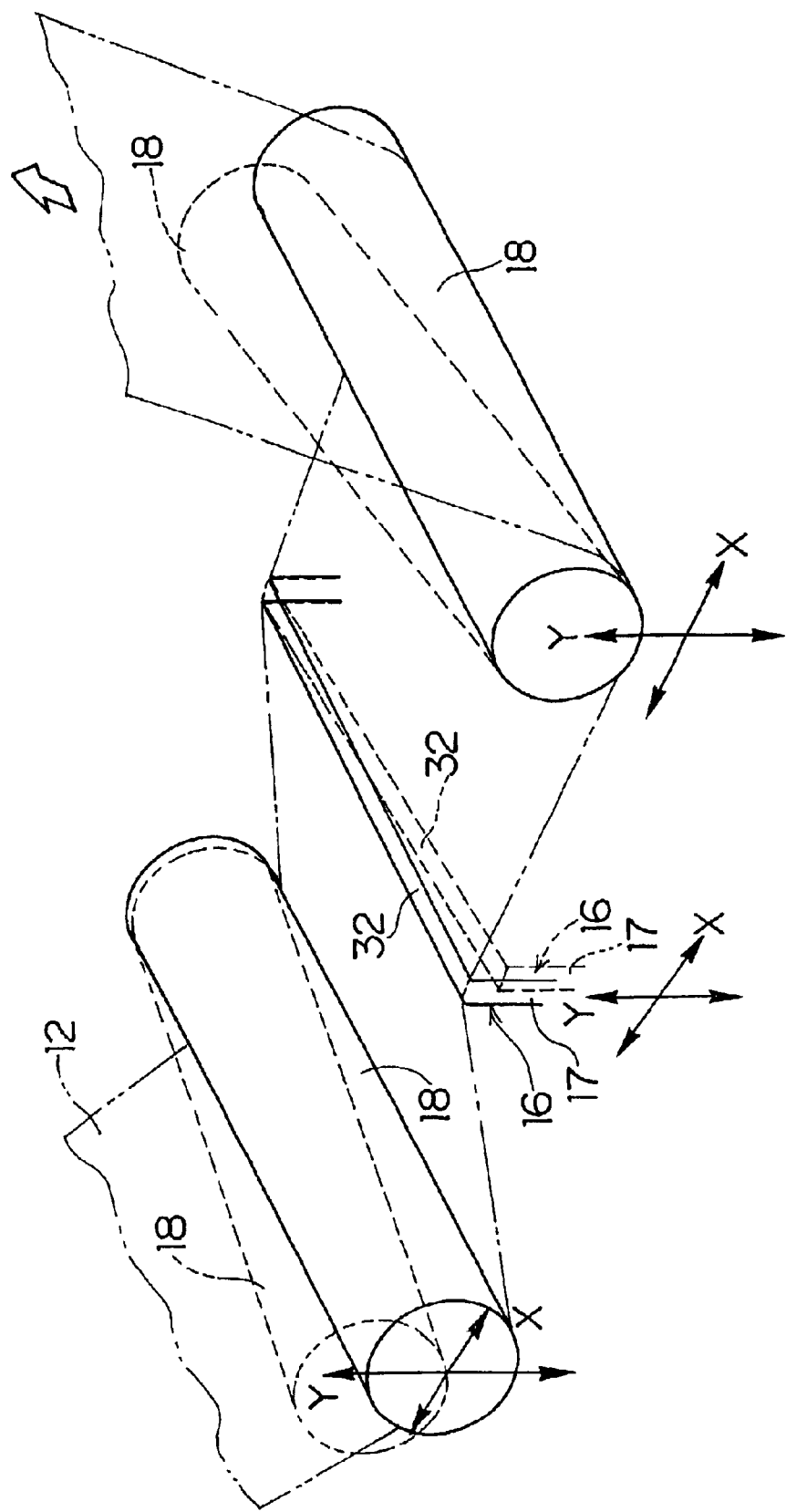
FIG. 3 is an explanatory diagram showing roller inclination type and doctor blade inclination type devices among pressure distribution adjusting devices.

FIG. 3 shows an example of roller inclination type pressure distribution adjusting devices that are installed in upstream and downstream sides of the doctor blade 17 in the web traveling direction, and shows a case of using the support rollers 18 and 18 as rollers (refer to FIG. 1).

Figure 4:
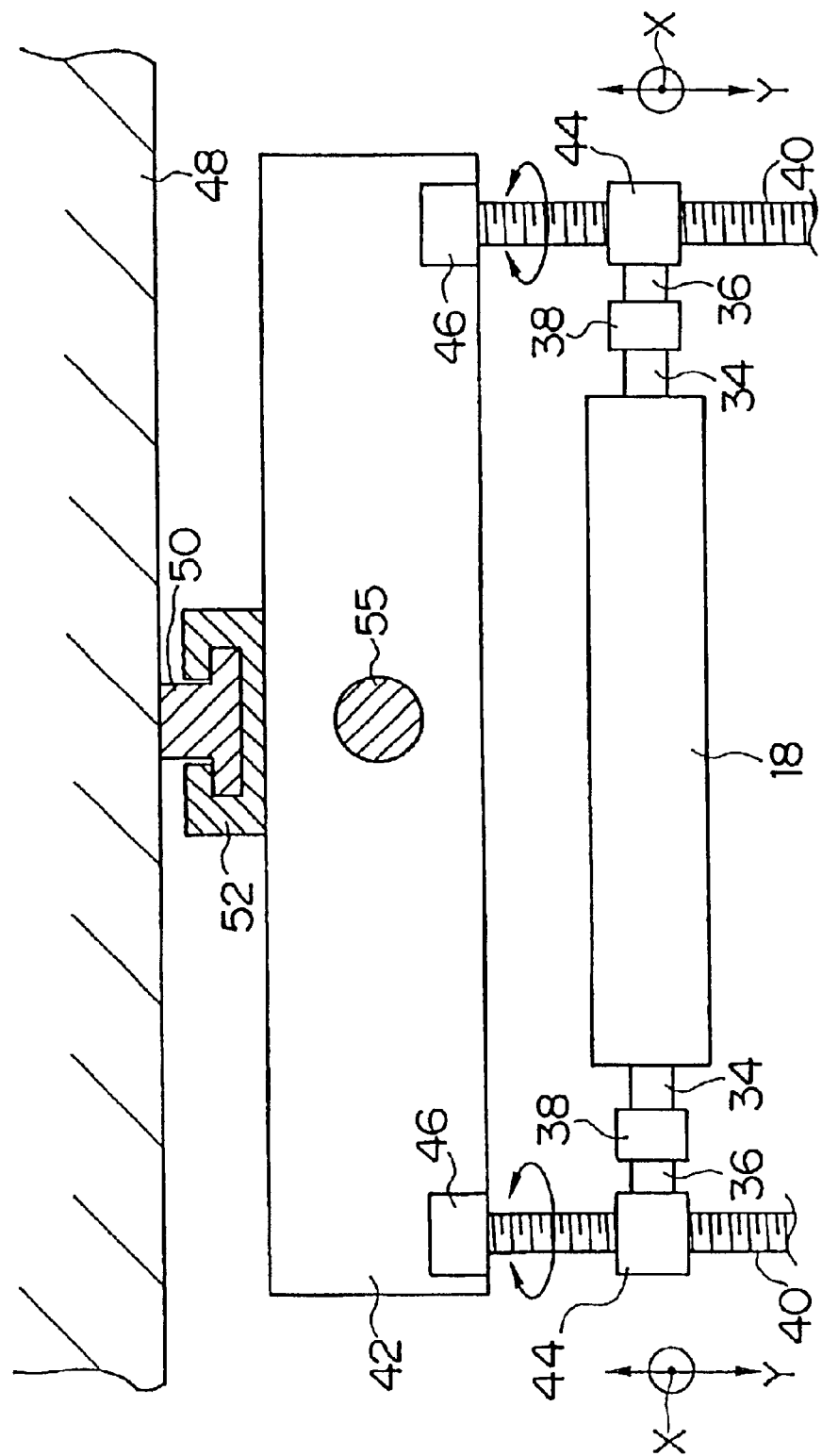
FIG. 4 is an explanatory diagram showing an example of an inclination mechanism of the roller inclination type pressure distribution adjusting device.

As shown in FIG. 4, in the inclination mechanism of inclining the support roller 18, rotation shafts 34 and 34 in both ends of the support roller 18 are supported by bearings 38 and 38 respectively, and the bearings 38 and 38 are supported by nut members 44 and 44 respectively through universal joints 36 and 36. The nut members 44 and 44 are slidably supported in the Y-axis direction respectively by guide members not shown in the figure while being screwed to a Y-axis lead screw 40 arranged in the Y-axis direction. Since a reversible motor 46 with a built-in decelerator is connected in an end of the Y-axis lead screw 40, the Y-axis lead screw 40 rotates by driving this motor 46. Owing to this, by making feeds of a couple of Y-axis lead screws 40 and 40 mutually differ, each support roller 18 inclines from a state shown by a solid line in FIG. 3 to a state shown by a doted line. Hence, the distribution of pressure in the web width direction under which the support roller 18 presses the web 12 against the doctor blade 17 is generated. FIG. 3 shows a case that the support rollers 18 in the upstream and downstream sides of the doctor blade 17 are inclined so as to become mutually reverse.

Not only the motors 46 and 46 are fixed to both ends of a movable body 42, but also the movable body 42 is slidably hung through a linear bearing 52 from a rail 50 installed in the X-axis direction under a hanging member 48. Moreover, the movable body 42 is screwed to an X-axis lead screw 55 arranged in the X-axis direction. Since a reversible motor with a built-in decelerator that is not shown is connected in an end of this X-axis lead screw 55, the X-axis lead screw 55 rotates by driving this motor 46 for the moving body 42 to move in the X-axis direction. Owing to this, the support roller 18 moves in the X-axis direction in FIG. 3. The inclination of the support roller 18 in the Y-axis direction caused by this couple of Y axis lead screws 40 and the movement of the support roller 18 in the X-axis direction caused by the X-axis lead screw 55 adjust the coating thickness distribution in the web width direction to every detail. In addition, the inclination mechanism of the support roller 18 is not limited to the above-mentioned mechanism, but other mechanisms are acceptable so long as they can finely adjust an inclination angle of the support roller 18. Moreover, this is not limited to the use of both the Y axis lead screw 40 and X-axis lead screw 55, but it is acceptable to adjust the coating thickness distribution only by not the Y-axis lead screw 40.

As shown in FIG. 5, when expander rollers 56 are used as rollers used for the roller inclination type devices, it is possible not to linearly incline the rollers in the web width direction, but to curvilinearly incline the rollers as shown by the doted lines. Owing to this, it is possible not to adjust the distribution of linear pressure from one edge to another edge in the web width direction, but to adjust the distribution of curvilinear pressure.

FIG. 6 shows an example of the doctor blade inclination type pressure distribution-adjusting device 20.

As shown in FIG. 6, one edge of the doctor blade 17 in the web width direction is rotatably supported by a shaft 58, and both ends of the shaft 58 are supported by to posts 62 and 62 installed on a movable body 60. The height of the post 62 is sufficient so long as it is the height of enabling a swing of the doctor blade 17 in the Y-axis direction with separating the doctor blade 17 from the movable body 60. Moreover, in another end of the doctor blade 17, a nut member 66 is installed through a universal joint 64, and a Y-axis lead screw 68 is screwed to this nut member 66. Then, one edge of the Y-axis lead screw 68 is connected to a reversible motor 70 with a built-in decelerator that is supported by the movable body 60. Hence, since the doctor blade 17 swings around the shaft 58 by rotating the Y-axis lead screw 68, the doctor blade 17 inclines in the Y-axis direction. Therefore, the distribution of pressure in the web width direction by which the web 12 is pressed by the doctor blade 17 and support roller 18 is generated.

Moreover, not only the movable body 60 is supported through linear bearings 74 and 74 by a pair of parallel rails 72 and 72 arranged in the X-axis direction, but also the -axis lead screw 78 is screwed to the nut member 76 provided under the movable body 60. Then, one edge of the X-axis lead screw 78 is connected to a reversible motor 82 with a built-in decelerator that is fixed to a base 80. Owing to this, the doctor blade 17 moves in the X-axis direction with being guided by the rails 72 by rotating the X-axis lead screw 78. The inclination of the doctor blade 17 in the Y-axis direction caused by this Y-axis lead screw 68 and the movement of the doctor blade 17 in the X-axis direction caused by the X-axis lead screw 78 adjust the pressure distribution in the web width direction to every detail. In addition, the doctor blade inclination type inclination mechanism is not limited to the above-mentioned mechanism, but other mechanisms are acceptable so long as they can finely adjust an inclination angle of the doctor blade 17 in the web width direction.

FIGS. 7(*a*) and 7(*b*) show an example of the pressure distribution adjusting device 20 in the case of using air discharge pressure in the back pressure type device as pressure.

As shown in FIGS. 7(*a*) and 7(*b*), a longitudinal jet nozzle 84 that faces the apical surface 32 of the doctor blade 17 in an opposite side of the doctor blade 17 across the web 12 is provided in the web width direction. As shown in FIG. 7(*b*), this jet nozzle 84 is partitioned into a lot of jets 86, 86 . . . in the width direction of the web 12, and each jet 86 is connected to each air piping 90 with a valve 88. Owing to this, the discharge pressure of the air blown out from each jet 86 differs from others by adjusting the opening of each valve 88. Hence, it is possible to adjust the pressure distribution in the web width direction by spraying air on the back of the web 12 (the side not coated) with this jet nozzle 84. For example, when the discharge pressure of the air blown out from the jets 86 is made to become smaller as going from the left side in FIG. 7(*b*) to the right side, the pressure is distributed so that the pressure in the left side in the web width direction may grow, and the pressure in the right side may become small. In addition, the material for the back-pressure type pressure-generating device is not limited to air, but other gases can be used. Furthermore, other material is acceptable so long as it can finely adjust the pressure distribution in the web width direction.

According to the coating apparatus 10 of the present invention constituted as mentioned above, a pressure distribution adjusting device 20 that adjusts the pressure distribution in the web width direction is installed fort the pressure pressing the presses web 12 against the doctor blade 17. Hence, it is possible to intentionally adjust the scraping-off quantity of the coating liquid in the web width direction. Owing to this, it is possible to perform scraping-off of the coating liquid according to the thickness distribution of the web 12 itself, the single-edged slack of the web 12, and the like. For example, when web thickness in one edge in the web width direction is thick and web thickness in another edge is thin, the coating layer thickness in the thick edge of the web 12 becomes thinner than the coating layer thickness in the thin edge if uniform pressure in the web width direction is applied. Then, in this case, by using the pressure distribution-adjusting device 20, the pressure in the thick edge of the web 12 is reduced to reduce the scraping-off quantity, and the pressure in the thin edge is enlarged to increase the scraping-off quantity. Hence, it is possible to scrape off the coating liquid according to the thickness distribution of the web 12. Owing to this, it is possible to obtain an ultrathin layer with uniform thickness on the web 12.

In addition, when single-edged slack in one edge in the web width direction is larger and single-edged slack in another edge is small, the coating layer thickness in the edge where the single-edged slack is large becomes thicker than the coating layer thickness in the edge, where the single-edged slack is small, if uniform pressure in the web width direction is applied. In this case, by using the pressure distribution adjusting device 20, it is possible to scrape off the coating liquid such that the single-edged slack should influence by enlarging the pressure in the edge where the single-edged slack is large than the pressure in the edge where the single-edged slack is small. Owing to this, it is possible to obtain an ultrathin layer with uniform thickness on the web 12.

In this case, it is preferable to adjust the pressure distribution in the web width direction by the pressure distribution-adjusting device 20 so that the coating thickness distribution of a coating layer in the web width direction after scraping-off by the doctor blade 17 may become 20% or less. Moreover, as a form of the above-described pressure distribution adjusting device 20, as described above, it is possible to suitably use the roller inclination type device, doctor blade inclination type device, and a back pressure type device, but it is also good to combine these.

By the way, in such a scraping-off type coating apparatus, the coating liquid that was scraped off and recovered once touched the air between the precoating apparatus 14 and doctor blade 17, and hence, a solvent in the coating liquid has volatilized for liquid physical properties such as viscosity and concentration of solid components to change. To recycle the coating liquid whose viscosity changed as it is adversely influences liquid quantity scraped off by the doctor blade 17, or, the final thickness of the coating film on the doctor blade 17. Hence, it is not possible to recycle the coating liquid unless the liquid preparation for the liquid physical properties such as the viscosity and concentration of solid components has been performed. Hence, it is preferable that the coating apparatus is a coating apparatus (hereinafter, this is called a "non-exposure-to-air type coating apparatus") where the coating liquid applied to the web 12 is not exposed to the air between from the applying the coating liquid on the web 12 to the scraping-off of the excess of the coating liquid.

Figure 8:
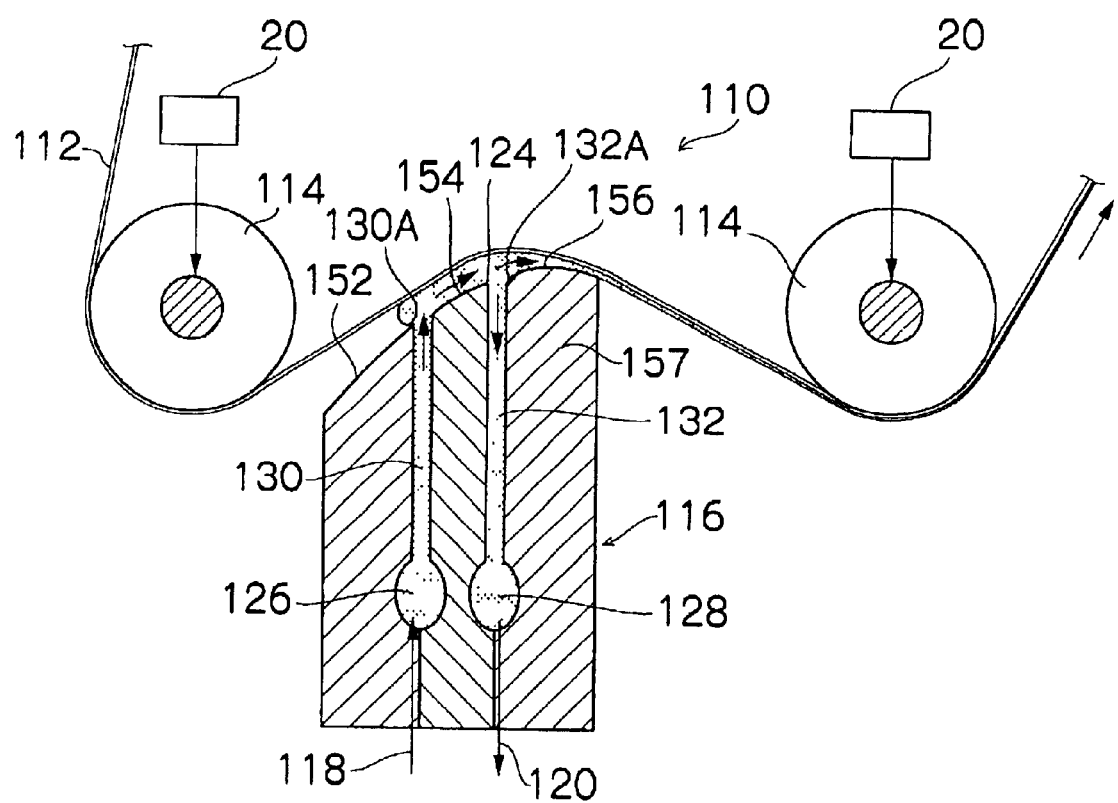
FIG. 8 is a structural diagram showing a coating apparatus that is another form of the first embodiment of the present invention and is formed by building a pressure distribution adjusting device in a non-exposure-to-air type coating apparatus.

FIG. 8 is an example of building a roller inclination type pressure distribution adjusting device 20 in the non-exposure-to-air type coating apparatus where the precoating apparatus 14 and doctor blade 17 are constituted as one coating head.

As shown in FIG. 8, a non-exposure-to-air type coating apparatus 110 mainly comprises a support roller 114 supporting the traveling of the web 112, a coating head 116, a supply line 118 that supplies the coating liquid, which is more excessive than the desired coating quantity to be applied on the web 112, to coating head 116, a recovery line 120 recovering the excess of the coating liquid, and a pressure distribution adjusting device 20 adjusting the distribution of pressure in a web width direction that presses the web 112 against the coating head 116.

In the coating head 116, a couple of cylindrical pocket sections 126,128 comprising a pocket section 126 for coating and a pocket section 128 for recovery is formed in parallel to the web width direction. Furthermore, the pocket section 126 for coating is connected to the supply line 118, and the pocket section 128 for recovering is connected to the recovery line 120. Moreover, in the coating head 116, a slit 130 for coating that has a discharge opening 130A in a lip face 124, and a slit 132 for recovery that has a recovering opening 132A in a downstream side of the discharge opening 130A in view of a traveling direction of the web 112 are formed. Furthermore, the slit 130 for coating communicates with the pocket section 126 for coating, and the slit 132 for recovering communicates with the pocket section 128 for recovery. Then, the coating liquid that is excessive than desired coating quantity to be applied on the web 112 is supplied from the supply line 118 to the pocket section 126 for coating of the coating head 116. In addition, a surplus of the coating liquid recovered to the pocket section 128 for recovery by the slit 132 for recovery is discharged from the coating head 116 by the recovery line 120.

A couple of support rollers 114 is provided in upstream and downstream sides in the web traveling direction with making the coating head 116 as a border while being arranged in a position that is lower than a top of the coating head 116. Owing to this, the continuously traveling web 112 is made to be close to the lip face 124 of the coating head 116 with pressure. Then, the roller inclination type pressure distribution-adjusting device 20 is provided in each of this couple of support rollers 114. Since an inclination mechanism that inclines the support roller 114 is similar to that in FIG. 4, its description will be omitted.

In the non-exposure-to-air type coating apparatus 110 constituted in this manner, a block 157, where a lip face 156 for recovery is formed, among a back lip face 152, a doctor lip face 154, and a lip face 156 for recovery that constitute the lip face 24 plays a role of the doctor blade 17. That is, the coating liquid that is excessively discharged from the discharge opening 130A and thickly applied on the web 112 arrives at the recovering opening 132A of the slit 132 for recovery in connection with the web 112. Then, a part of the thick coating, that is, the excess of the coating liquid is scraped off by the lip face 156 for recovery. Then, by building the roller type pressure distribution adjusting device 20 in the non-exposure-to-air type coating apparatus 110 like this and adjusting the distribution of pressure in the width direction of the web 112 against the lip face 156 for recovery, it is possible to intentionally adjust the scraping-off quantity of the coating liquid in the web width direction. Owing to this, it is possible to perform scraping-off of the coating liquid according to the thickness distribution of the web 112 itself, the single-edged slack of the web 112, and the like.

Moreover, by using this non-exposure-to-air type coating apparatus 110, not only the apparatus can be simplified, but also the solvent doesn't volatilize from the coating liquid, and hence, the recovered coating liquid can be recycled. Moreover, if flow meters (not shown) are installed in the supply line 118 and recovery line 120 respectively, a coating flow rate can be managed as a differential between flow rates. In addition, if a suction pump (not shown) is installed in the recovery line 120 and the coating liquid scraped off through the recovery slit 132 is sucked by the suction pump, coating thickness can be accurately adjusted.

Figure 7A:
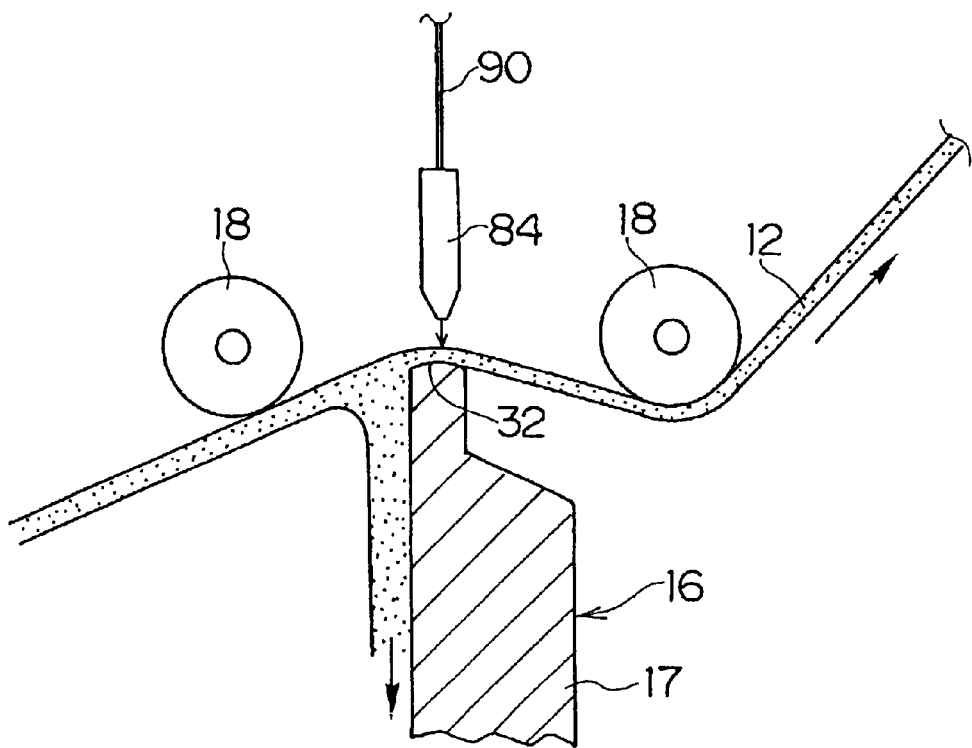
FIGS. 7(a) and 7(b) are explanatory diagrams showing a mechanism of a back pressure type pressure distribution adjusting device using air pressure.
Figure 7B:
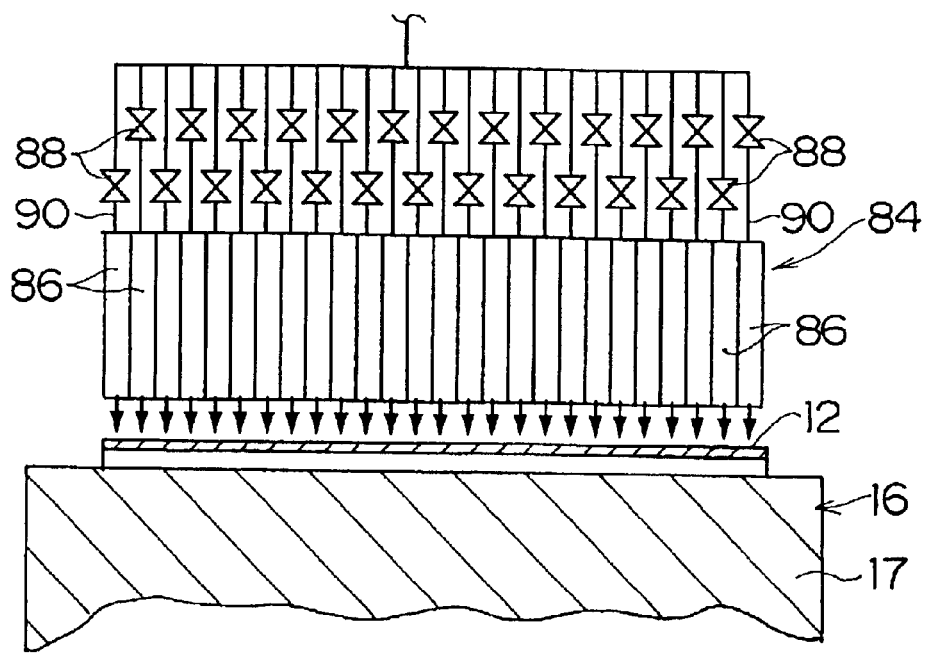

When the expander rollers 56 are used as shown in FIG. 5 as rollers used for the roller inclination type devices in FIG. 8, it is possible not to linearly incline the rollers in the web width direction, but to curvilinearly incline them as shown by doted lines. Moreover, when the doctor blade inclination type pressure distribution-adjusting device 20 shown in FIG. 6 is built in the non-exposure-to-air type coating apparatus 110, it is sufficient only to incline the coating head 116. Moreover, when the back pressure type pressure distribution adjusting device 20 shown in FIGS. 7(a) and 7(b) is built in the non-exposure-to-air type coating apparatus 110, it is sufficient only to press the lip face 156 for recovery with the air blown out from a lot of jets 86, 86 . . . arranged in the width direction of the web 112.

Embodiment 2

Next, the second embodiment of the present invention will be described with assigning the same reference numerals to the same members as those in the first embodiment.

Figure 9:
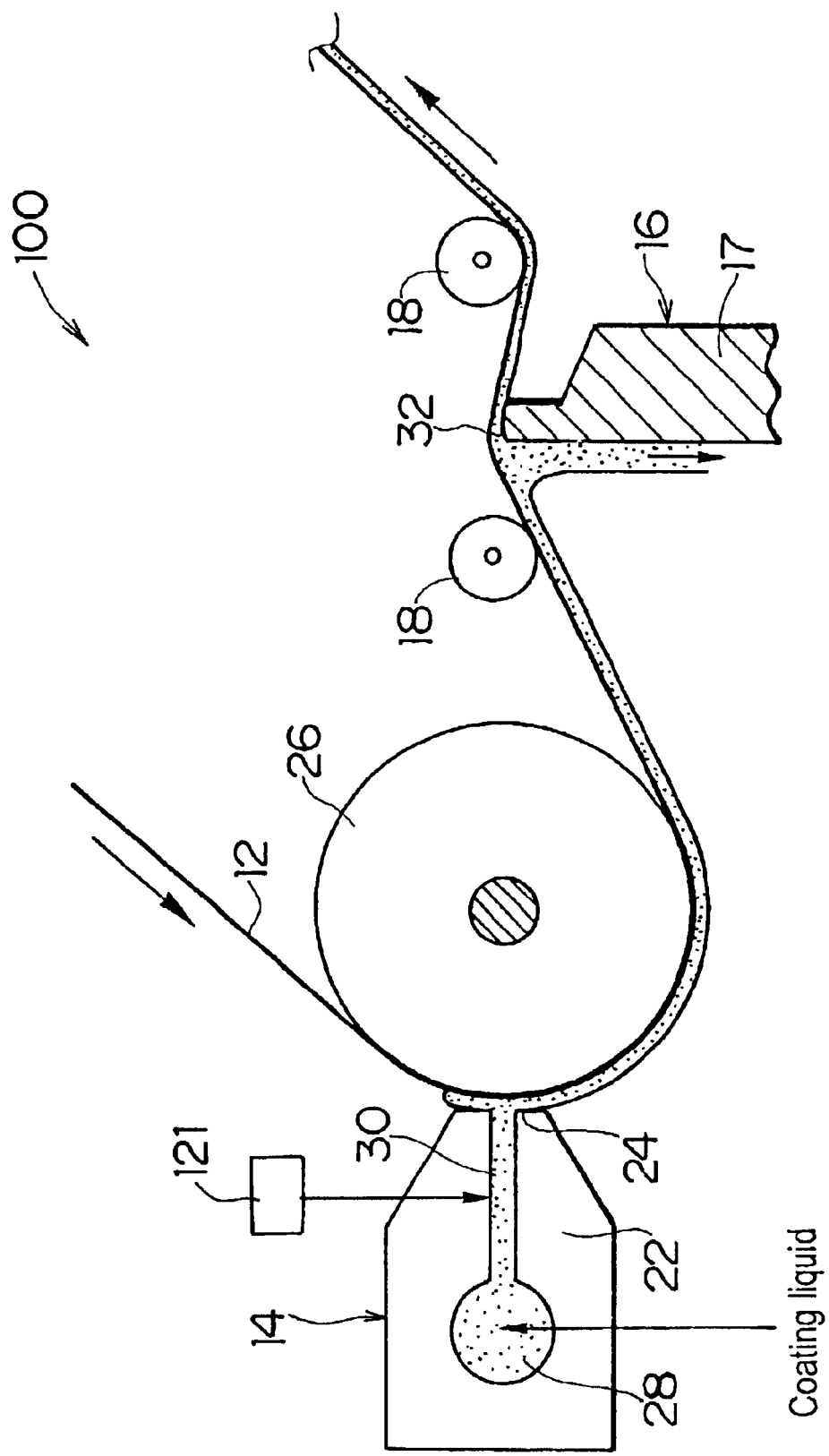
FIG. 9 is a structural diagram that is constituted of a backed-up extrusion type precoating apparatus, a doctor blade type scraping-off member, and a slit adjustment type coating thickness distribution adjusting device among coating apparatuses where a coating method according to a second embodiment of the present invention is applied.

As shown in FIG. 9, a coating apparatus 100 where a coating method of the present invention is applied mainly comprises: a precoating apparatus 14 applying coating liquid excessive than the desired coating quantity on a web 12; a scraping-off member (applicator) 16 that scraps off an excess of the coating liquid excessively applied; support rollers 18 and 18 that gives pressure with pressing the web 12 against the scraping-off member 16; and a pressure distribution adjusting device 121 that adjusts the coating thickness distribution in a web width direction before scraping off the excess of the coating liquid by the scraping-off member 16.

The coating apparatus 100 is constituted by using the backed-up extrusion type coating head 22 as the precoating apparatus 14, the doctor blade 17 as the scraping-off member 16 that scraps off the excess of the coating liquid, and the slit adjustment type coating thickness distribution adjusting device 20, which adjusts the slit width of the coating head 22, as the coating thickness distribution adjusting device 121. In the case of the backed-up extrusion type head, the backup roller 26 that supports the web 12 with accessing the lip face 24 in a top of the coating head 22 is arranged with facing the head.

Since the arrangement of the precoating apparatus 14 and doctor blade 17 is similar as described in the first embodiment, its description will be omitted. Moreover, the doctor blade 17 is similar as described in FIG. 2.

Figure 10:
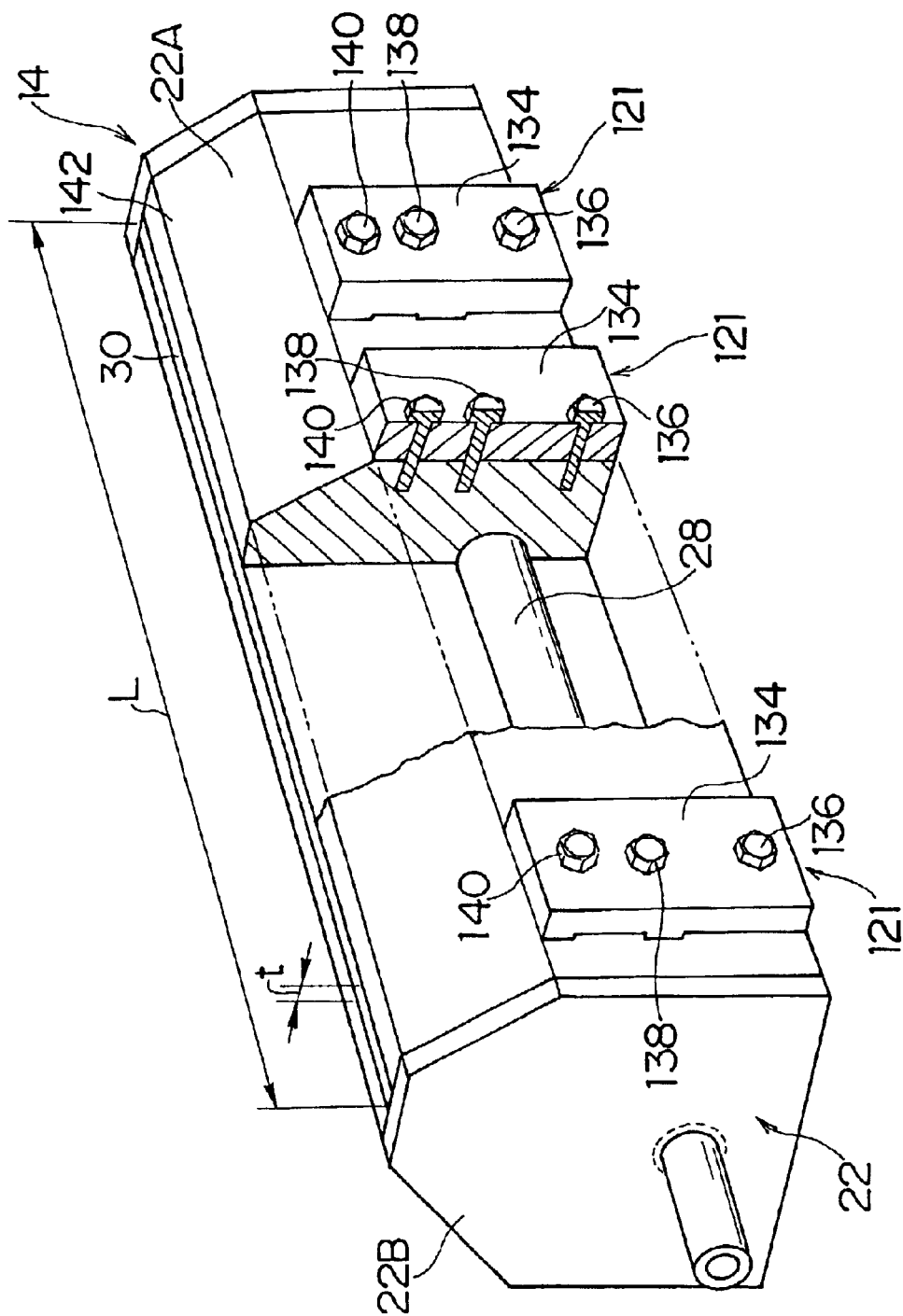
FIG. 10 is a partially exploded perspective view of a slit adjustment type coating thickness distribution adjusting device.
Figure 11:
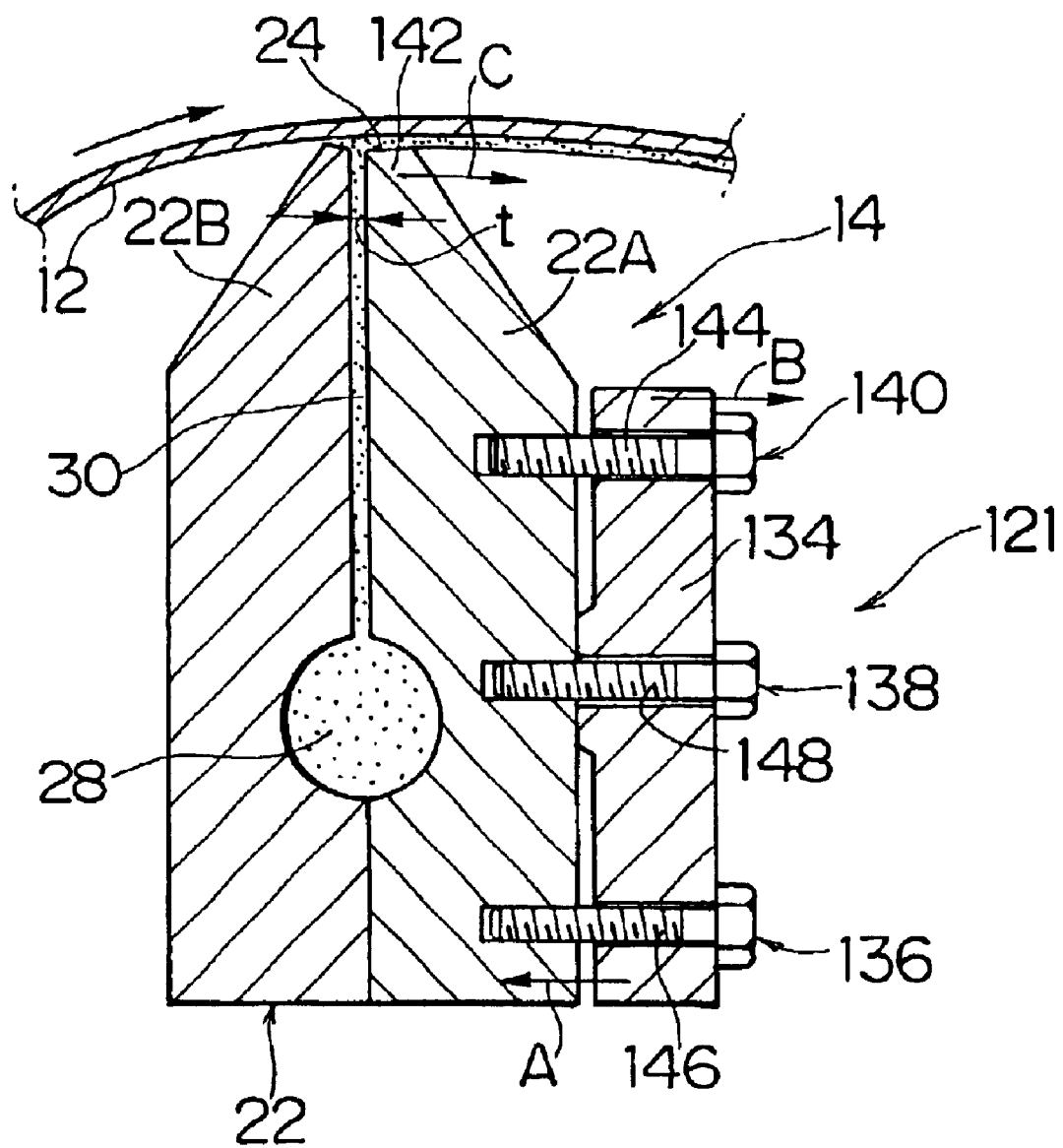
FIG. 11 is a sectional view of the slit adjustment type coating thickness distribution adjusting device.

The slit adjustment type coating thickness distribution adjusting device 121, as shown in FIG. 10, mainly comprises a yoke 134, an energizing screw 136 installed in the yoke 134, a fulcrum screw 138, and a fixed screw 140. The yoke 134, as shown in FIG. 11, is mounted with projecting from an outside wall of the coating head 22, and is fixed to the coating head 22 with the fixed screw 140 in an operating section 144 that is the nearest to an end section 142 of the coating head 22. Moreover, in regard to an energizing section 146 that is the farthest from the end section 142, the energizing screw 136 is provided, and a fulcrum section 148 that is in an intermediate position between the operating section 144 and energizing section 146 is supported with the fulcrum screw 138. Then, by giving a force to the operating section 144 by adjusting the screwing quantity of the energizing screw 136 against the coating head 22, the opening width t of the slit 30 is adjusted. For example, when the operation of adjusting the screwing quantity of the energizing screw 136 is performed so that the energization section 146 may approach the outside wall of the coating head 22 (direction shown by an arrow A), the principle of leverage acts with making the fulcrum section 148 a fulcrum. Hence, a force is applied to operating section 144 in the direction shown by an arrow B. Owing to this, a portion near to a top of a block 22A, where the yoke 134 is installed, among blocks 22A and 22B dividably constituting the coating head 22 is pulled in the direction shown by the arrow B. Hence, correspondingly, the end section 142 moves in the direction (direction of arrow C) based on the direction of arrow B. As a result, the opening width t of the slit 30 is expanded. Hence, it is possible to adjust slit width distribution in the direction of slit width (L) (this is the same as the web width direction) by individually adjusting the coating thickness distribution adjusting devices 20 that are installed respectively in right and left edge sections and a central section of the outside wall of the coating head 22. Owing to this, the coating thickness distribution in the web width direction before the excess of the coating liquid is scraped off by the doctor blade 17 is adjusted.

Figure 12:
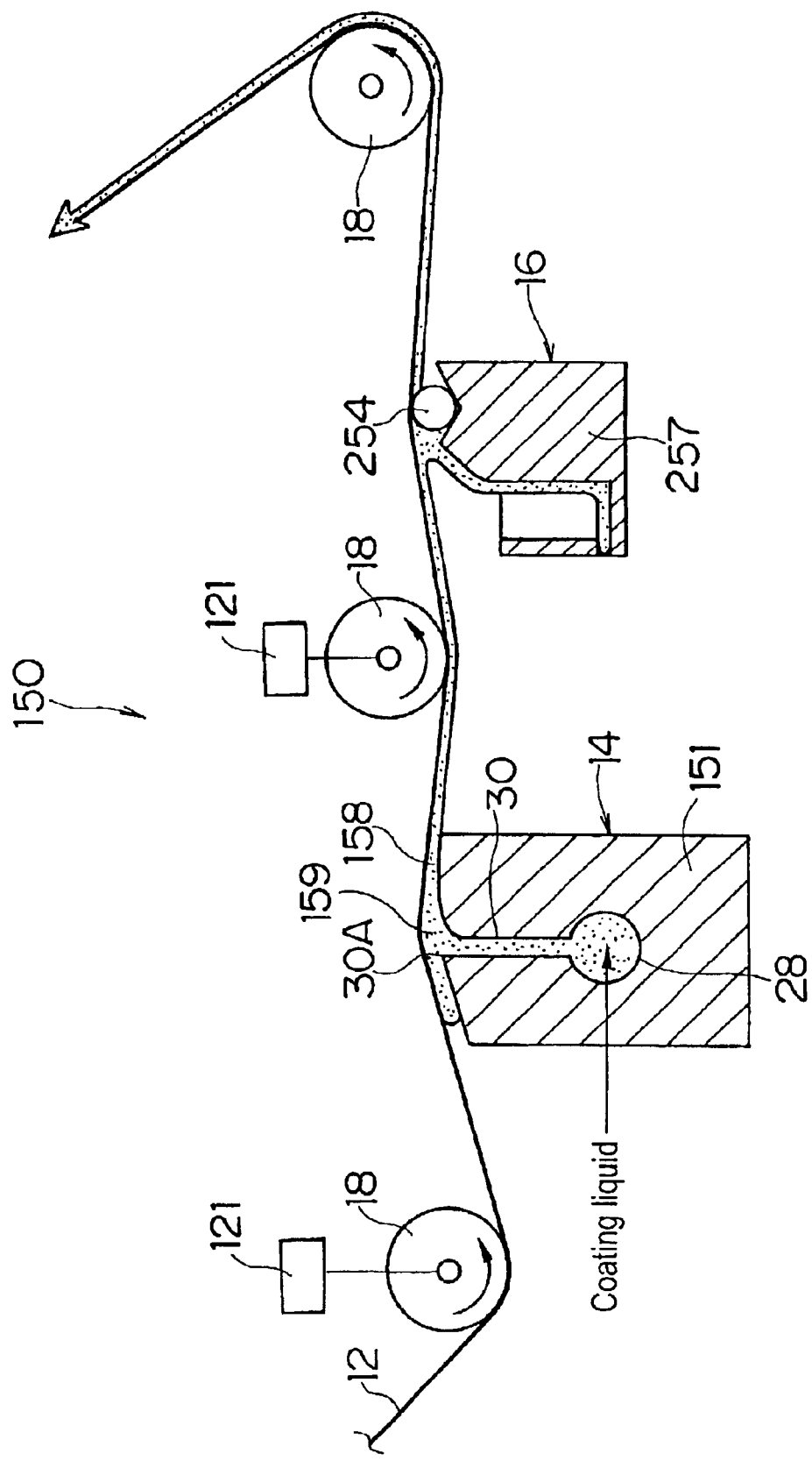
FIG. 12 is a structural diagram that is constituted of a web pressurizing extrusion type precoating apparatus, a rod type scraping-off member, and a pressure type coating thickness distribution adjusting device among coating apparatuses where a coating method according to the second embodiment of the present invention.

The coating apparatus 150 in FIG. 12 is constituted by using a web pressurizing extrusion type coating head 151 as the precoating apparatus 14, a rod 254 as the scraping-off member 16 that scraps off the excess of the coating liquid, and a support roller inclination type coating thickness distribution adjusting device 121, which inclines at least one of support rollers 18 in upstream and downstream sides of the coating head 151, as the coating thickness distribution adjusting device 121. In addition, it is also possible to constitute the precoating apparatus 14 in FIGS. 9 and 12 with exchanging the scraping-off member 16 for the doctor blade 17 and rod 254.

The web pressurizing extrusion type apparatus in FIG. 12 continuously discharges the coating liquid, supplied in the pocket section 28 of the coating head 151, from the discharge opening 30A of the slit 30 that communicates with the pocket section 28 with pressing the web 12, traveling in the direction shown by an arrow with being placed under the support roller 18, against the head apical surface 158. Owing to this, excessive coating liquid is applied on the web 12 through the beads 159 of the coating liquid formed between the web 12 and head apical surface 158. The coating liquid excessively applied is scraped off by the rod type scraping-off member 16.

The rod type scraping-off member 16 is constituted in the state that a rod support member 257 supports the cylindrical rod 254 that is provided in parallel to the width direction of the web 12, and the traveling web 12 contacts to the support roller 18 with having a predetermined lap angle formed with the rod 254. Owing to this, the excess of the coating liquid excessively applied on the web 12 by the precoating apparatus 14 is scraped off by the rod 254 to be measured to the desired coating liquid quantity. In this case, it is no matter whether the rod 254 rotates in the same direction as the traveling direction of the web 12 when contacting to the web 12. Furthermore, it is also acceptable to rotate the rod 254 in the direction opposite to the traveling direction of the web 12 by connecting a rotation drive source (not shown) to the rod 254. As the rod 254 used here, it is possible to use a flat rod whose surface is flat, a wire rod around which a wire is wound thickly, a grooved rod where a groove is formed in the circumferential direction of a surface of the rod base, or the like. Moreover, in regard to the rod 254, since the wear-out of the rod surface is promoted by contacting with inorganic particles such as abrasives included in the coating liquid when the excess of the coating liquid is scraped off from the web 12, it is preferable that rod material is cemented carbide material having Vickers hardness ($H_v$) of 1000 or more, and preferably, 2000 or more. It is also possible to use cemented carbide or the like similarly to the doctor blade for the flat type rod, and surface roughness in that case is preferable to be surface-finished in the roughness of 0.5 $\mu$m or less, and preferably, 0.2 $\mu$m or less ($R_{max}$). Moreover, the diameter of the rod 154 is not limited in particular though it is almost in 1 mm to 20 mm.

Figure 13:
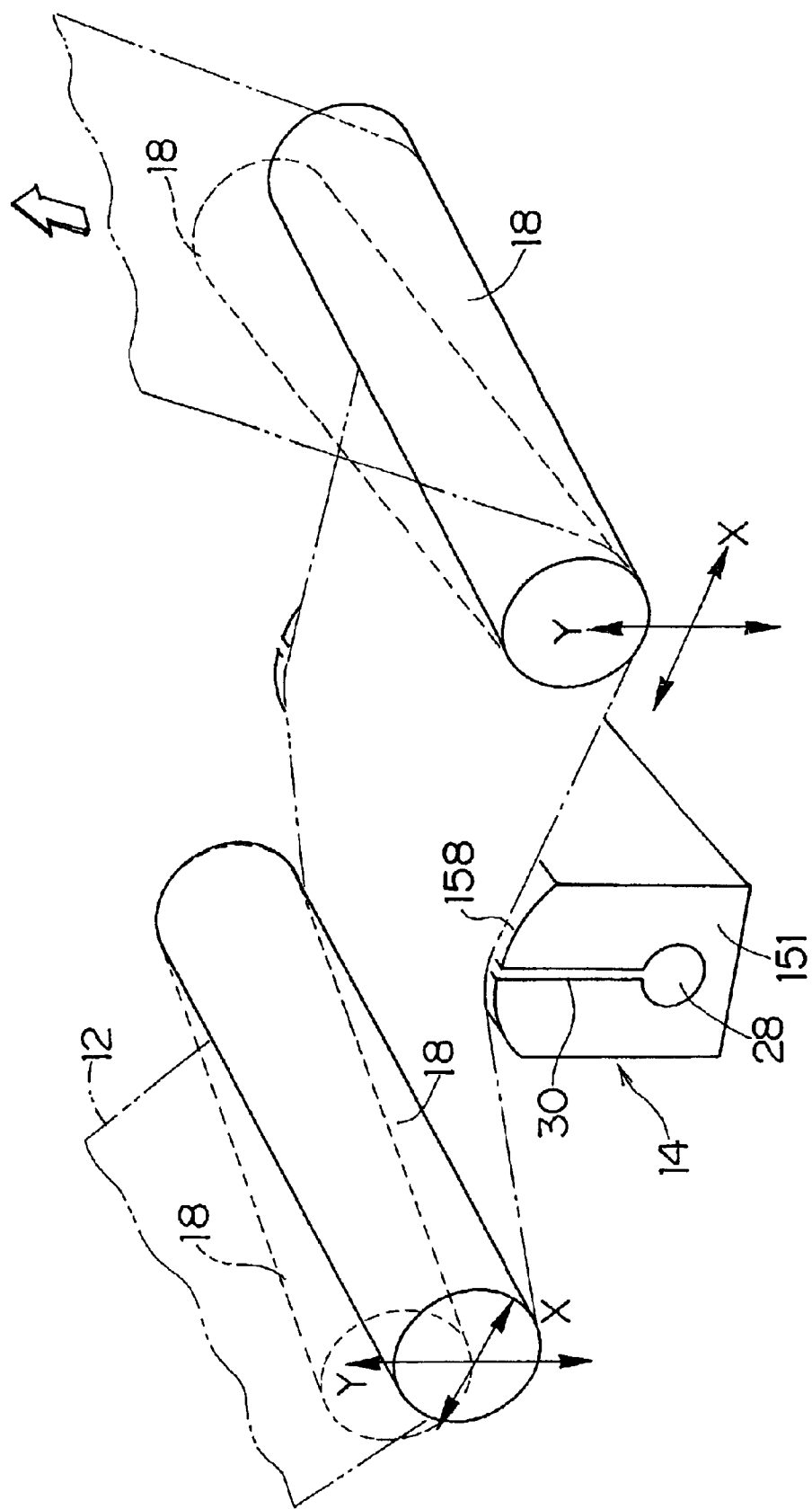
FIG. 13 is an explanatory diagram showing a support roller inclination type coating thickness distribution adjusting device.

The support roller inclination type coating thickness distribution adjusting device 121, as shown in FIGS. 12 and 13, adjusts the coating thickness distribution in the web width direction at the time of coating by inclining at least one of support rollers 18, arranged in upstream and downstream sides of the precoating apparatus 14, in the web width direction. As an inclination mechanism that inclines the support roller 18, a mechanism having the structure in FIG. 4 can be used. That is, by making feeds of a couple of Y-axis lead screws 40 mutually differ, each support roller 18 inclines from a state shown by a solid line in FIG. 13 to a state shown by a dotted line. Hence, since the distribution of pressure in the web width direction that presses the web 12 by the coating head 152 and support roller 18 is generated, it is possible to adjust the coating thickness distribution in the web width direction that is caused by the applying from the coating head 22 to the web 12. FIG. 13 shows a case that the support rollers 18 in the upstream and downstream sides of the coating head 152 are inclined so as to become mutually reverse. In addition, the inclination mechanism of the support roller 18 is not limited to the above-mentioned mechanism, but other mechanisms are acceptable so long as they can finely adjust an inclination angle of the support roller 18. Moreover, this is not limited to the use of both the Y axis lead screw 40 and X-axis lead screw 55, but it is acceptable to adjust the coating thickness distribution only by the Y-axis lead screw 40.

In addition, when expander rollers are used as rollers used for the roller inclination type devices, it is possible not to linearly incline the rollers in the web width direction, but to curvilinearly incline the rollers as shown by the doted lines. Owing to this, it is possible not to adjust the distribution of linear pressure from one edge to another edge in the web width direction, but to adjust the distribution of curvilinear pressure. Hence, it is possible to curvilinearly adjust coating thickness distribution in the web width direction.

According to the coating apparatuses 100 and 150 according to the present invention that are constituted as the above, by providing the coating thickness distribution adjusting device 121 in the precoating apparatus 14 itself or separately from the precoating apparatus 14, it is possible to adjust the coating thickness distribution in the web width direction before the excessive coating liquid is scraped off by the scraping-off member 16. Then, the present invention uses this coating thickness distribution-adjusting device 121 to adjust the coating thickness distribution in the web width direction to become 20% or less before the excess of the coating liquid is scraped off by the scraping-off member 16. Owing to this, with maintaining features of the scraping-off type coating apparatus obtaining an ultrathin coating layer, it is possible to remarkably reduce the thickness distribution of the final coating layer in the web width direction. Hence, this is effective in particular as a coating method of obtaining the ultrathin magnetic layer, which is unprecedented and is 2 $\mu$m or less in the moist state, like those of magnetic recording media in recent years.

EXAMPLES

The test result obtained by examining how coating thickness distribution in the web width direction before the scraping-off of the excess of the coating liquid by the scraping-off member influenced the thickness distribution of a final coating layer in the web width direction after the scraping-off of the coating liquid by the scraping-off member will be described.

Test 1—Example 1 and Comparative Example 1

Figure 14:
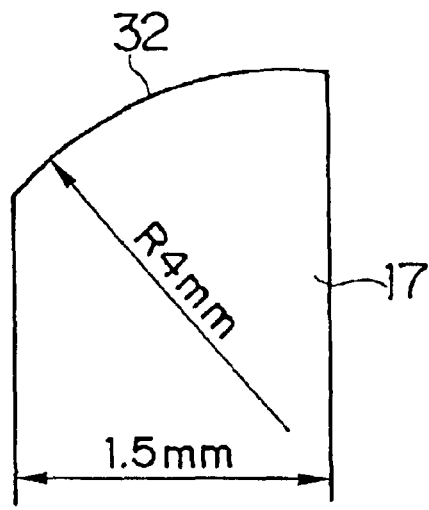
FIG. 14 a side view of a doctor blade used in test 1 of an example in the second embodiment of present invention.

A gravure coater was used as a precoating apparatus, and a doctor blade, which is shown in FIG. 14 and had an apical surface with a radius of curvature of R4 mm and blade thickness of 1.5 mm, was used as a scraping-off member. As coating conditions, coating liquid A shown in Table 1 was applied at the coating speed of 100 m/minute on a web made of PET (polyethylene terephthalate) material at 600 mm wide and 100 $\mu$m thick so that coating thickness to be precoated might become 20 $\mu$m. Next, an excess of the coating liquid was scraped off by the doctor blade to make final film thickness become 2 $\mu$m in a moist (moist) state. Then, the thickness distribution of a coating layer in a web width direction (hereinafter, it is called "precoat coating thickness distribution") by precoating, and the thickness distribution of a final coating layer in the web width direction after the scraping-off by the doctor blade (hereinafter, it is called "final film thickness distribution") were measured with a light transmission type online thickness distribution measuring instrument. Thereafter, each thickness distribution ("range %" that is a value obtained by dividing the difference between the maximum value and minimum value of thickness by an average of the thickness) was examined.

As a gravure coater in the first example in Table 4, a coater that was adjusted so that the precoat coating thickness distribution might become 20% or less was used. In addition, as a gravure coater in a first comparative example, a coater that was adjusted so that the precoat coating thickness distribution might exceed 20% was used.

Test 2—Examples 2 to 4 and Comparative Examples 2 and 3

Figure 15:
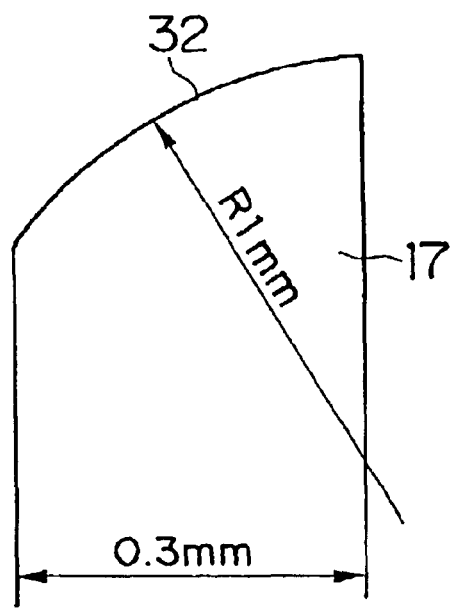
FIG. 15 a side view of a doctor blade used in test 2 of an example in the second embodiment of present invention.

As a precoating apparatus, a backed-up extrusion type coating head (shown as "backup type die" in Table 4) was used. In addition, and a doctor blade, which is shown in FIG. 15 and had an apical surface with a radius of curvature of R1 mm and blade thickness of 0.3 mm, was used as a scraping-off member. As coating conditions, coating liquid A shown in Table 1 was applied at the coating speed of 200 m/minute on a web made of PET (polyethylene terephthalate) material at 1000 mm wide and 10 μm thick so that coating thickness to be precoated might become 30 μm. Next, an excess of the coating liquid was scraped off by the doctor blade to make final film thickness become 1 μm in a moist (moist) state. Then, the thickness distribution of a coating layer in a web width direction (hereinafter, it is called "precoat coating thickness distribution") by precoating, and the thickness distribution of a final coating layer in the web width direction after the scraping-off by the doctor blade (hereinafter, it is called "final film thickness distribution") were measured with a light transmission type online thickness distribution measuring instrument. Thereafter, each thickness distribution ("range %" that is a value obtained by dividing the difference between the maximum value and minimum value of thickness by an average of the thickness) was examined.

In the second to the fourth examples in Table 4, the slit width of the coating head was adjusted by a coating thickness distribution adjusting device so that the precoat coating thickness distribution might become 20% or less. In addition, in second and third comparative examples, the slit width was adjusted so that the precoat coating thickness distribution might exceed 20%.

Test 3—Examples 5 to 7 and Comparative Example 4

Figure 16:
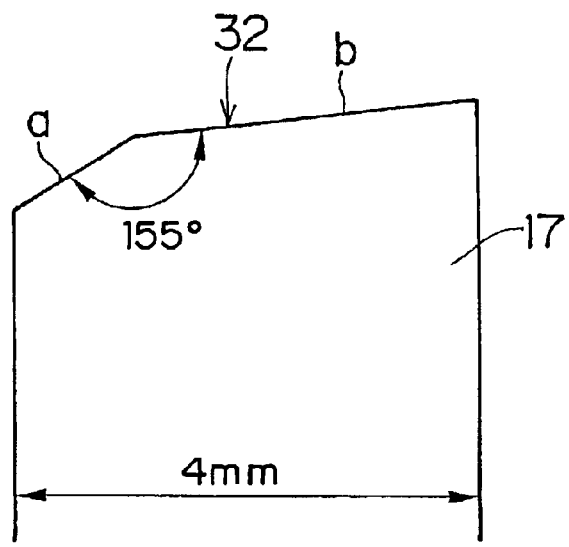
FIG. 16 a side view of a doctor blade used in test 3 of an example in the second embodiment of present invention.

As a precoating apparatus, a supporting-member-pressurizing extrusion type coating head (shown as "pressurized die" in Table 4) was used. In addition, a doctor blade, which is shown in FIG. 16 and had an apical surface, where an angle formed by an upstream plane a and a downstream plane b in the web traveling direction was 155° and blade thickness of 4 mm, was used as a scraping-off member. As coating conditions, coating liquid A shown in Table 1 was applied at the coating speed of 400 m/minute on a web made of aramid material at 300 mm wide and 4 μm thick so that precoat coating thickness might become 10 μm. Next, an excess of the coating liquid was scraped off by the doctor blade to make final film thickness become 0.5 μm in a moist (moist) state. Then, the thickness distribution of a coating layer in a web width direction (hereinafter, it is called "precoat coating thickness distribution") by precoating, and the thickness distribution of a final coating layer in the web width direction after the scraping-off by the doctor blade (hereinafter, it is called "final film thickness distribution") were measured with a light transmission type online thickness distribution measuring instrument. Thereafter, each thickness distribution ("range %" that is a value obtained by dividing the difference between the maximum value and minimum value of thickness by an average of the thickness) was examined.

In the fifth to the seventh examples in Table 4, the slit width of the coating head was adjusted by a coating thickness distribution adjusting device so that the precoat coating thickness distribution might become 20% or less. In addition, in a fourth comparative example, the slit width was adjusted so that the precoat coating thickness distribution might exceed 20%.

Test 4—Examples 8 to 10 and Comparative Example 5

Figure 17:
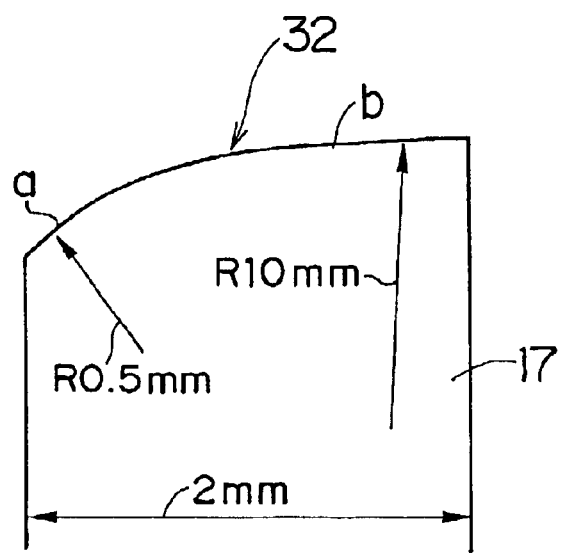
FIG. 17 a side view of a doctor blade used in test 4 of an example in the second embodiment of present invention.

As a precoating apparatus, a supporting-member-pressurizing extrusion type coating head (shown as "pressurized die" in Table 4) was used. In addition, a doctor blade, which is shown in FIG. 17 and had an apical surface, where a radius of curvature of an upstream plane a in the web traveling direction was R0.5 mm and a radius of curvature of a downstream plane b was R10 mm and blade thickness of 2 mm, was used as a scraping-off member. As coating conditions, coating liquid C shown in Table 3 was applied at the coating speed of 400 m/min on a web made of PEN (polyethylene naphthalate) material, whose surface was covered beforehand by a 2-μm-thick dry film made of coating liquid B shown in Table 2, at 1000 mm wide by 5 μm thick so that precoat coating thickness might become 10 μm. Next, an excess of the coating liquid was scraped off by the doctor blade to make final film thickness become 0.5 μm in a moist (moist) state. Then, the thickness distribution of a coating layer in a web width direction (hereinafter, it is called "precoat coating thickness distribution") by precoating, and the thickness distribution of a final coating layer in the web width direction after the scraping-off by the doctor blade (hereinafter, it is called "final film thickness distribution") were measured with a light transmission type online thickness distribution measuring instrument. Thereafter, each thickness distribution ("range %" that is a value obtained by dividing the difference between the maximum value and minimum value of thickness by an average of the thickness) was examined.

In the eighth to the tenth examples in Table 4, the slit width of the coating head was adjusted by a coating thickness distribution adjusting device so that the precoat coating thickness distribution might become 20% or less. In addition, in the fifth comparative example, the slit width was adjusted so that the precoat coating thickness distribution might exceed 20%.

Test 5—Example 11 and Comparative Example 6

As a precoating apparatus, a supporting-member-pressurizing extrusion type coating head (shown as "pressurized die" in Table 4) was used. In addition, a flat rod made of cemented carbide with a diameter of 2 mm was used as a scraping-off member. As coating conditions, coating liquid C shown in Table 3 was applied at the coating speed of 400 m/minute on a web made of PEN (polyethylene naphthalate) material, whose surface was covered beforehand by a 2-μm-thick dry film made of coating liquid B shown in Table 2, at 1000 mm wide and 5 μm thick so that precoat coating thickness might become 20 μm. Next, an excess of the coating liquid was scraped off by the flat rod to make final film thickness become 0.8 μm in a moist (moist) state. Then, the thickness distribution of a coating layer in a web width direction (hereinafter, it is called "precoat coating thickness distribution") by precoating, and the thickness distribution of a final coating layer in the web width direction after the scraping-off by the flat rod (hereinafter, it is called "final film thickness distribution") were measured with a light transmission type online thickness distribution measuring instrument. Thereafter, each thickness distribution ("range %" that is a value obtained by dividing the difference between the maximum value and minimum value of thickness by an average of the thickness) was examined.

In the eleventh example in Table 4, the slit width of the coating head was adjusted by a coating thickness distribution adjusting device so that the precoat coating thickness distribution might become 20% or less. In addition, in the sixth comparative example, the slit width was adjusted so that the precoat coating thickness distribution might exceed 20%.

TABLE 1

| Composition of coating liquid A | Part by weight |
| --- | --- |
| Ferromagnetic fine metal powder | 100 |
| Vinyl chloride copolymer (MR110 made by ZEON Corporation) | 12 |
| Polyurethane resin (UR8200 made by Toyobo Co., Ltd.) | 3 |
| Alpha alumina (HIT55 made by Sumitomo Chemical Co., Ltd.) | 10 |
| Carbon black (#55 made by Asahi Carbon Co., Ltd.) | 5 |
| Phenylphosphonic acid | 3 |
| Butylstearate | 10 |
| Butoxy ethyl stearate | 5 |
| Isohexadecyl stearate | 3 |
| Stearic acid | 2 |
| Methyl ethyl ketone | 180 |
| Cyclohexane | 180 |

TABLE 2

| Composition of coating liquid B | Part by weight |
| --- | --- |
| Non-magnetic powder (TiO$_2$: crystalline rutile, average primary particle diameter of 0.035 μm, specific surface area of 40 m$^2$/g by BET method, pH 7, TiO$_2$ content of 90% or more, and DBP oil absorption of 27 to 38 g/100 g, and finishing agent Al$_2$O$_3$: 8 w/t %) | 80 |
| Carbon black (Conductex Sc-U made by Colombian Carbon Co.) | 20 |
| Vinyl chloride copolymer (MR110 made by ZEON Corporation) | 12 |
| Polyurethane resin (UR8200 made by Toyobo Co., Ltd.) | 5 |
| Phenylphosphonic acid | 4 |
| Butylstearate | 1 |
| Stearic acid | 3 |
| Methyl ethyl ketone/cyclohexane (8-to-2 mixed solvent) | 250 |

TABLE 3

| Composition of coating liquid C | Part by weight |
| --- | --- |
| Barium ferrite magnetic powder | 100 |
| Vinyl chloride copolymer (MR555 made by ZEON Corporation) | 5 |
| Polyurethane resin (UR8200 made by Toyobo Co., Ltd.) | 3 |
| Alpha alumina (HIT55 made by Sumitomo Chemical Co. Ltd., particle size of 0.2 μm) | 10 |
| Carbon black (#55 made by Asahi carbon Co., Ltd., average primary particle diameter of 0.075 μm, specific surface area of 35 m$^2$/g by BET method, DBP oil absorption of 81 ml/100 g, pH 7.7, and volatile components of 1.0%) | 1 |
| Phenylphosphonic acid | 2 |
| Butylstearate | 10 |
| Butoxy ethyl stearate | 5 |
| Isohexadecyl stearate | 3 |
| Stearic acid | 2 |
| Methyl ethyl ketone | 125 |
| Cyclohexane | 125 |

After each component is kneaded by a kneader, each coating liquid in Tables 1 to 3 was prepared by distributing each component for four hours by using a sand mill, adding poly isocyanate of 10 parts by weight to the obtained dispersion liquid, further adding cyclohexane of 40 parts by weight, and filtering the liquid by a filter having an average aperture of 1 μm.

The result of the first to the fifth tests is shown in Table 4. Among items in Table 4, as a criterion of "Judgment", since there is no problem in practical use when final film thickness distribution is 10% or less, a case where the test result was 10% or less is shown by B that is a pass, and a case where the test result exceeds 10% is shown by F that is a failure.

TABLE 4

|  | Type of precoating apparatus | Type of scraping-off member | Distribution of precoat coating-thickness (range %) | Distribution of final film thickness (range %) | Judgment |
| --- | --- | --- | --- | --- | --- |
| Comparative example 1 | Gravure coater | Doctor blade | 24 | 22 | F |
| Example 1 | Gravure coater | Doctor blade | 18 | 10 | B |
| Comparative example 2 | Backup type die | Doctor blade | 30 | 27 | F |
| Comparative example 3 | Backup type die | Doctor blade | 25 | 24 | F |

TABLE 4-continued

| | Type of precoating apparatus | Type of scraping-off member | Distribution of precoat coating-thickness (range %) | Distribution of final film thickness (range %) | Judgment |
|---|---|---|---|---|---|
| Example 2 | Backup type die | Doctor blade | 20 | 10 | B |
| Example 3 | Backup type die | Doctor blade | 15 | 9 | B |
| Example 4 | Backup type die | Doctor blade | 10 | 6 | B |
| Comparative example 4 | Pressurized die | Doctor blade | 25 | 22 | F |
| Example 5 | Pressurized die | Doctor blade | 20 | 9 | B |
| Example 6 | Pressurized die | Doctor blade | 15 | 6 | B |
| Example 7 | Pressurized die | Doctor blade | 10 | 4 | B |
| Comparative example 5 | Pressurized die | Doctor blade | 25 | 22 | F |
| Example 8 | Pressurized die | Doctor blade | 20 | 9 | B |
| Example 9 | Pressurized die | Doctor blade | 15 | 6 | B |
| Example 10 | Pressurized die | Doctor blade | 10 | 4 | B |
| Comparative example 6 | Pressurized die | Flat rod | 25 | 24 | F |
| Example 11 | Pressurized die | Flat rod | 15 | 9 | B |

As seen from the result in Table 4, in the cases of the first to the eleventh examples according to the present invention where the precoat coating thickness distribution in the web width direction before the scraping-off of the excess of the coating liquid performed by the scraping-off member was made to be 20% or less, regardless of types of the precoating apparatuses and scraping-off members, it was possible to make the final film thickness distribution be 10% or less, and hence, samples were passed as products.

On the contrary, in the cases where the precoat coating thickness distribution in the web width direction before the scraping-off exceeded 20%, regardless of types of the precoating apparatuses and scraping-off members, the final film thickness distribution exceeds 10%, and hence, samples were rejected as products.

Moreover, what can be said from the examples and the comparative examples is that the final film thickness distribution decreases in proportion with the decreasing of the precoat coating thickness distribution in the web width direction before the scraping-off of the excess of coating liquid performed by the scraping-off member. This result means that the coating thickness distribution in the web width direction before the scraping-off greatly influences the thickness distribution of the final coating layer in the web width direction after the scraping-off.

Embodiment 3

Next, the third embodiment of the present invention will be described with assigning the same reference numerals to the same members as those in the first and second embodiments.

Figure 18:
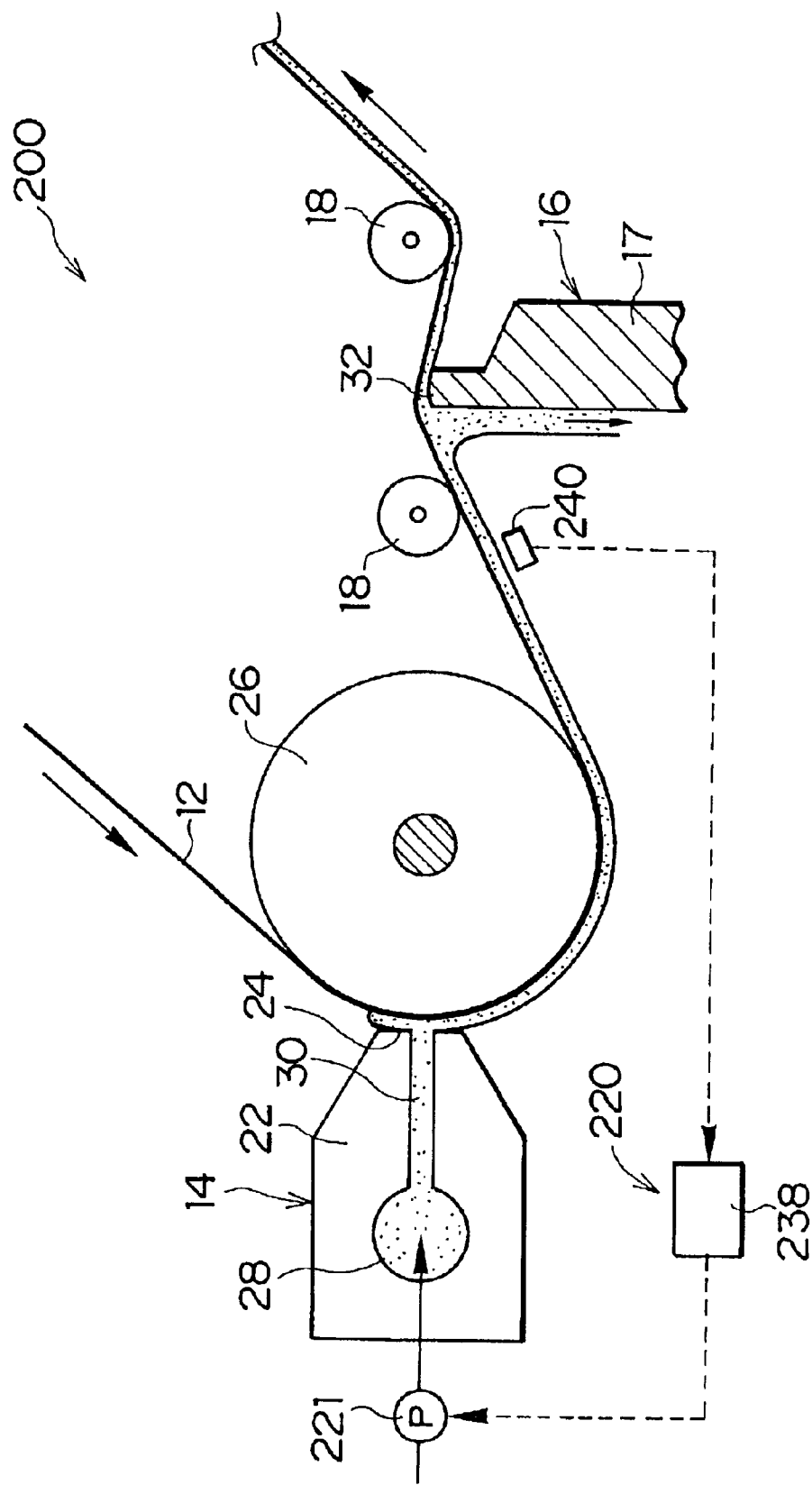
FIG. 18 is a structural diagram that is constituted of a backed-up extrusion type precoating apparatus, a doctor blade type scraping-off member, and a variance suppressing device among coating apparatuses where a scraping off type coating method in the third embodiment of the present invention is applied.

FIG. 18 is a conceptual drawing showing the entire configuration of a scraping-off type coating apparatus where a coating method according to the present invention is applied.

A coating apparatus 200 mainly comprises: a precoating apparatus 14 applying coating liquid excessive than the desired coating quantity on a web 12; a scraping-off member (applicator) 16 that scraps off an excess of the coating liquid excessively applied; support rollers 18 and 18 that gives pressure between the web 12 and the scraping-off member 16; and a variance suppressing device 220 that suppresses a factor of thickness variance so as to obtain a coating layer where the thickness variance in a web traveling direction after the scraping-off.

The coating apparatus 200 in FIG. 18 is a post-measurement system of coating apparatus in the case where the backed-up extrusion type coating head 22 is used as the precoating apparatus 14, and the doctor blade 17 is used as the scraping-off member 16. In the case of the backed-up extrusion type head, the backup roller 26 that supports the web 12 with accessing the lip face 24 in a top of the coating head 22 is arranged with facing the head.

Since the structure of the coating head 22 of the precoating apparatus 14 and the arrangement of the doctor blade 17 are similar as described in the first embodiment, their description will be omitted. Moreover, the geometry of an apical surface and the material of the doctor blade 17 are similar as described in FIG. 2. Then, the coating liquid supplied to the pocket section 28 of the coating head 22 by a solution-sending pump 221 is expanded in the web width direction in the pocket section 28, rises in the slit 30, is discharged from a slit discharge opening, and is excessively applied than the desired coating liquid quantity on the web while forming beads between the lip face 24 and web 12 that continuously travels with being supported by the backup roller 26. The coating liquid excessively applied is scraped off by the doctor blade 17 arranged in a downstream side of the precoating apparatus 14.

Figure 19:
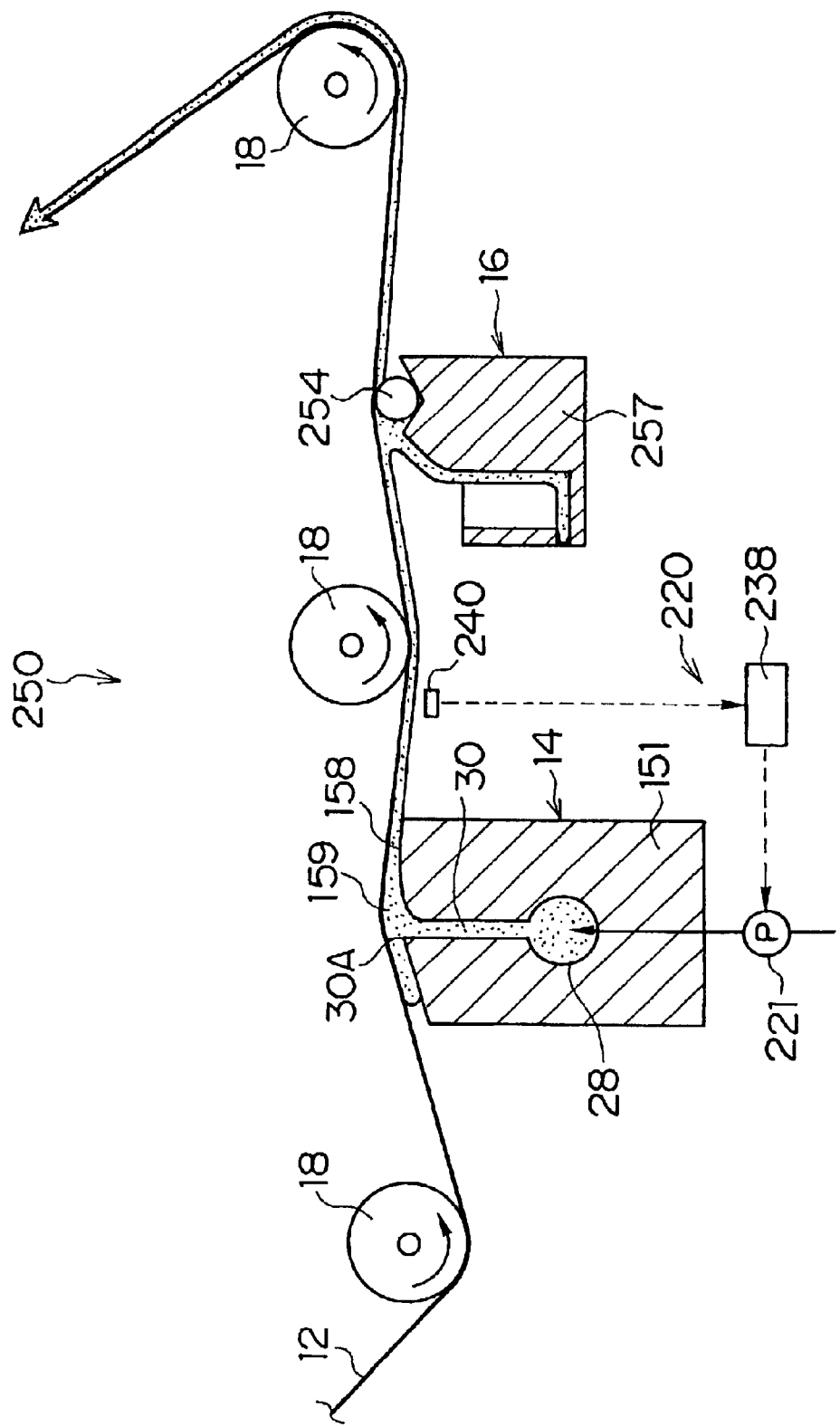
FIG. 19 is a structural diagram that is constituted of a pressure extrusion type precoating apparatus, a rod type scraping-off member, and a variance suppressing device among coating apparatuses where a scraping off type coating method in the third embodiment of the present invention is applied.

A coating apparatus 250 in FIG. 19 is a post-measurement system of coating apparatus in the case where the pressurizing extrusion type coating head 151 is used as the precoating apparatus 14, and a rod 254 is used as the scraping-off member 16, and is similar to that in FIG. 12. This pressurizing extrusion type apparatus continuously discharges the coating liquid, supplied in the pocket section 28 of the coating head 151 by the solution-sending pump 221, from the discharge opening 30A of the slit 30 that communicates with the pocket section 28, on the web 12 continuously traveling in the direction shown by an arrow with being placed under the support roller 18. Owing to this, excessive coating liquid is applied on the web 12 through the beads 159 of the coating liquid formed between the web 12 and head apical surface 158. The coating liquid excessively applied is scraped off by the rod type scraping-off member 16.

Since the rod type scraping-off member 16 has the similar structure described in FIG. 12, its description will be omitted. Owing to this rod type scraping-off member 16, the excess of the coating liquid excessively applied on the web 12 is scraped off by the rod 254 to be measured to the desired coating liquid quantity, and it is possible to obtain an ultrathin coating layer.

In order to maintain and improve the property of the ultrathin coating layer obtained by the coating apparatus 200 and 250 shown in FIGS. 18 and 19, it is important to obtain a coating layer with uniform coating thickness. In particular, in order to improve the property of an ultrathin magnetic layer that is unprecedented and is 2 μm or less thick in a moist state, it is important to suppress the coating thickness variance of a final coating layer in the web traveling direction after the scraping-off of the excess of coating liquid performed by the scraping-off member 16 to 20% or less.

In order to make the coating thickness variance of a final coating layer in the web traveling direction be 20% or less, in addition to the improvement of scraping-off technology in the scraping-off member 16, the followings are important: (1) To make the coating thickness variance in the web traveling direction before scraping-off the excess of coating liquid by the scraping-off member 16 be 20% or less, (2) To make the traveling speed variance of the web 12 be 20% or less, (3) To make the tension variance in a traveling direction of the web 12 in a web portion, where pressure is given between with the scraping-off member 16, be 10% or less, and (4) To make the viscosity variance of coating liquid be 20% or less. Hereafter, an example of the variance suppressing device 220 that suppresses these variance factors will be described.

As the variance suppressing device 220, which suppresses the coating thickness variance, in the above-mentioned item (1), in the case of the extrusion type precoating apparatus 14 shown in FIG. 18 or 19, it is possible to suitably use the variance suppressing device 220 comprising a measuring sensor 240 that measures the thickness of the coating layer applied by the precoating apparatus 14, and a controller 238 that controls the rotating speed of the solution-sending pump 221 that supplies the coating liquid to the pocket section 28 of the recoating apparatus 14 on the basis of the measurements of the measuring sensor 240. That is, the controller 238 controls the rotating speed of the solution-sending pump 221 on the basis of the measurements of the measuring sensor 240 so that the coating thickness variance in the web traveling direction before the scraping-off of the excess of coating liquid performed by the scraping-off member 16 may become 20% or less. In addition, in the case of the coating for which the precoating apparatus 14 uses a roller like a gravure coater, it is necessary to make uneven coating thickness, caused by the rotation cycle of the roller become 20% or less.

Figure 20:
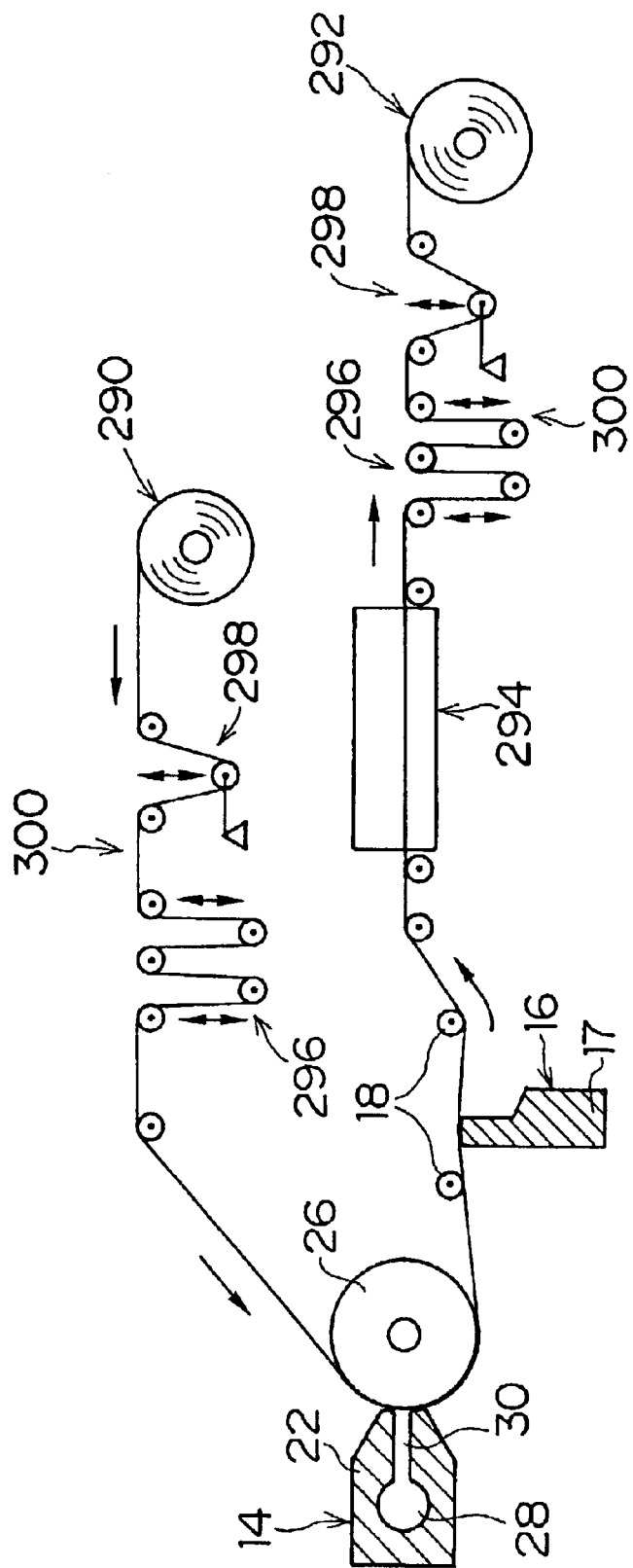
FIG. 20 is an explanatory diagram showing a mechanism of the variance suppressing device that suppresses traveling speed variance and tension variance of a web.
Figure 21:
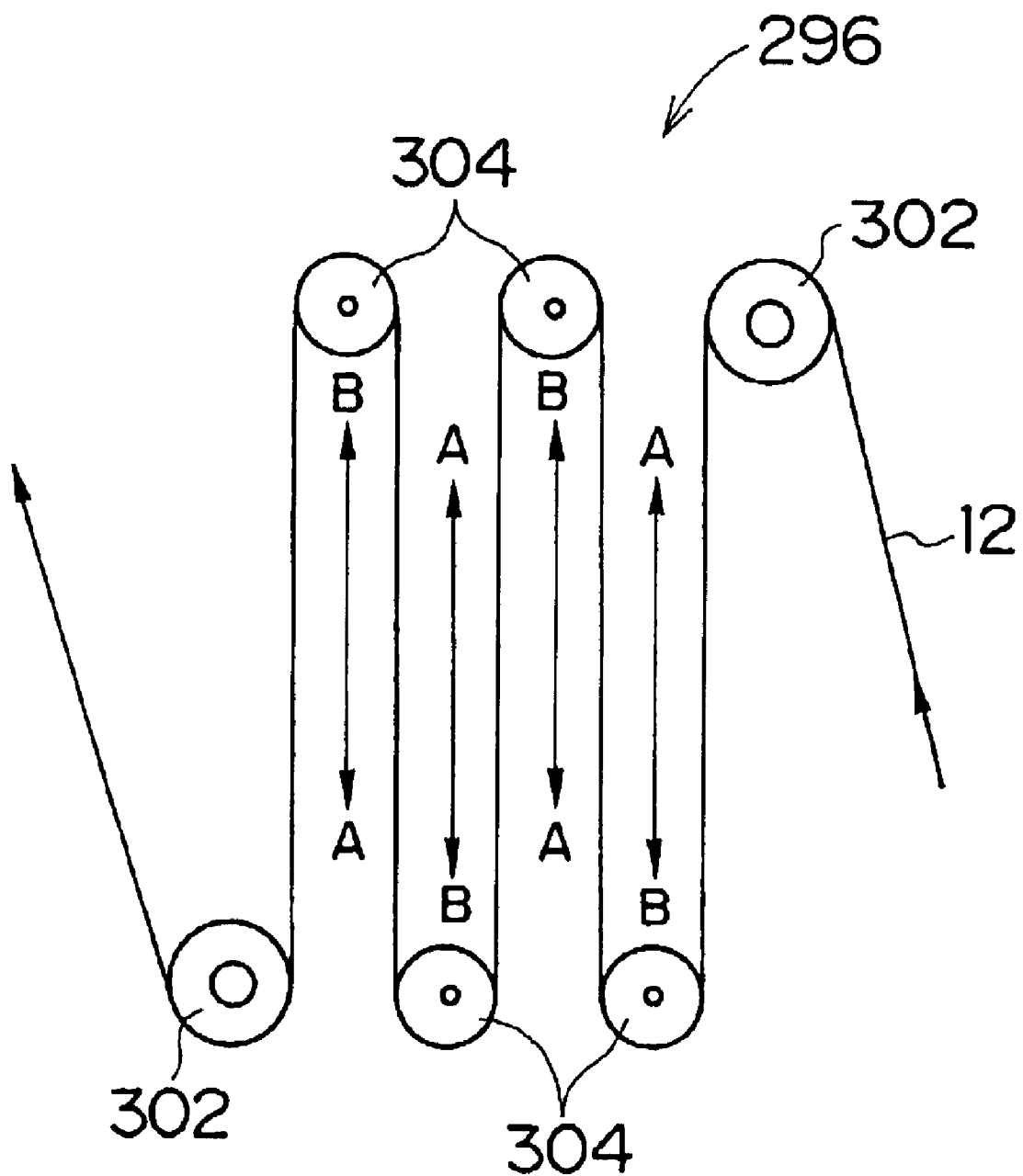
FIG. 21 is an explanatory diagram showing a reservoir apparatus.

As the web speed variance and web tension variance suppressing device 220 in the above-mentioned items (2) and (3), as shown in FIG. 20, it is possible to suitably use an web speed and tension regulating mechanism 300 formed by combining a reservoir device 296 and a dancer roller 298 in an upstream side of the precoating apparatus 14 in a web traveling path from delivery from a delivery machine 290 for the web 12 to winding-up to a winder 292, and a downstream of a dryer 294 that dries the coating layer formed by the scraping-off member 16. The reservoir device 296, as shown in FIG. 21, is constituted by arranging a plurality of moving rollers 304, which can be moved in an A–B direction, between path rollers 302 fixedly arranged. Then, since the distance between the moving rollers 304 facing each other becomes long when the moving roller 304 moves in a B direction, the traveling line of the web 12 becomes long. In addition, since the distance between the moving rollers 304 facing each other becomes short when the moving roller 304 moves in an A direction, the traveling line of the web 12 becomes short. Owing to this, this absorbs the variance of the traveling speed of the web 12 and makes the web 12 travel at constant traveling speed. Moreover, it suppresses the tension variance in the traveling direction of the web 12 in an web portion, where pressure is given between with the scraping-off member 16, to make tension in the traveling direction of the web 12 constantly maintained by combining the dancer roller devices 298 with the reservoir device 296. In FIG. 20, though a couple of dancer rollers 298 is installed in the upstream side of the precoating apparatus 14 and the downstream side of the dryer 294, another dancer roller 298 can be further installed in the vicinity of the scraping-off member 16 if a suppressing effect of the tension variance of the web 12 is not enough.

As the variance suppressing device 220, which suppresses the viscosity variance of coating liquid, in the above-mentioned item (4), though it is not shown in a figure in particular, it is possible to use, for example, a mechanism of keeping temperature of the precoating apparatus 14 or adjusting temperature in a clean room where the coating apparatus 200 or 250 is arranged.

In addition, each variance suppressing device 220 in the above-described items (1) to (4) is not limited to the above-described mechanism, but other mechanisms are acceptable so long as they are mechanisms that can make the coating thickness variance in the web traveling direction before scraping-off be 20% or less, can make the traveling speed variance of the web 12 be 20% or less, can make tension variance in the web traveling direction in a web portion, where pressure is given betweenwith the scraping-off member 16, be 10% or less, or can make the viscosity variance of coating liquid be 20% or less.

By the way, in such a scraping-off type coating apparatus, the coating liquid that was scraped off and recovered once touched the air between the precoating apparatus 14 and doctor blade 17, and hence, a solvent in the coating liquid has volatilized for liquid physical properties such as viscosity and concentration of solid components to change. To recycle the coating liquid whose viscosity changed as it is adversely influences liquid quantity scraped off by the doctor blade 17, or, the final thickness of the coating film on the doctor blade 17. Hence, it is not possible to recycle the coating liquid unless the liquid preparation for the liquid physical properties such as the viscosity and concentration of solid components has been performed. Hence, it is preferable that the coating apparatus is a coating apparatus (hereinafter, this is called a "non-exposure-to-air type coating apparatus") where the coating liquid applied to the web 12 is not exposed to the air between from the applying the coating liquid on the web 12 to the scraping-off of the excess of the coating liquid.

Figure 23:
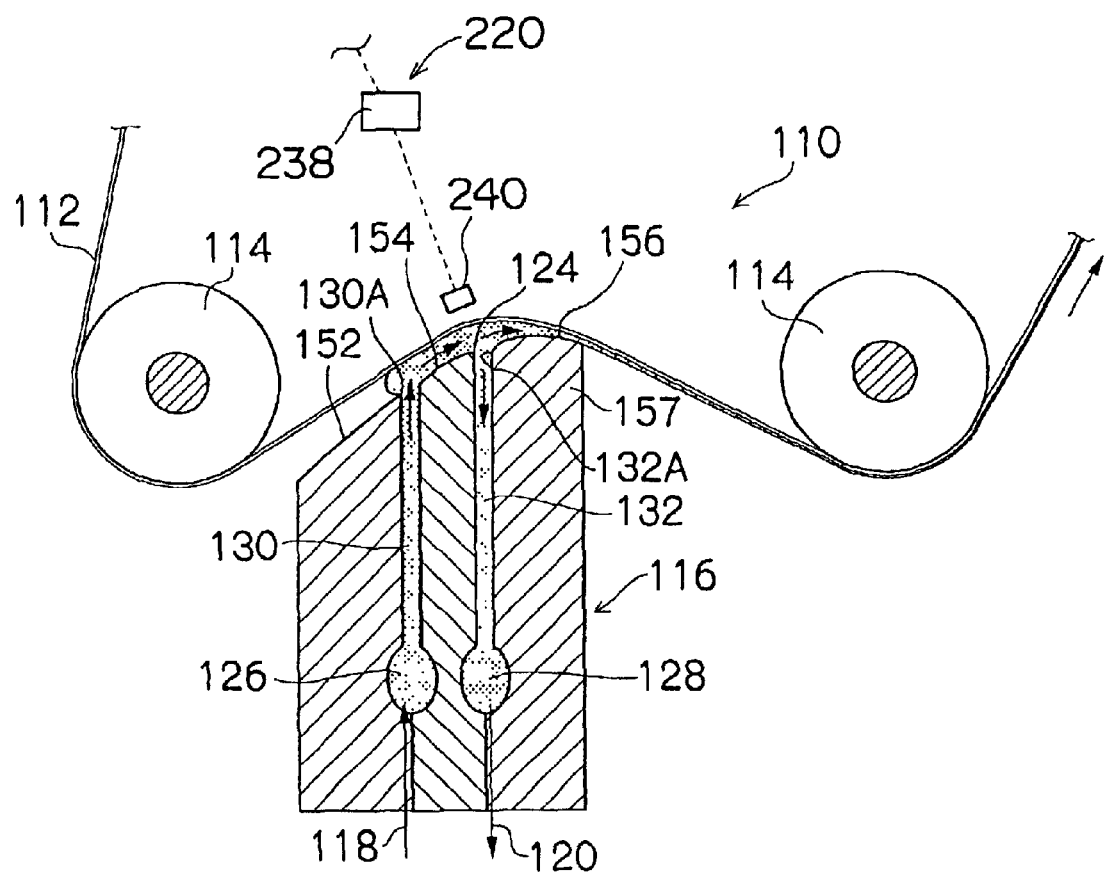
FIG. 23 is a structural diagram showing a coating apparatus that is another form of the third embodiment of the present invention and is formed by building a variance suppressing device in a non-exposure-to-air type coating apparatus.

FIG. 23 shows an example of building the variance suppressing device 220 into a non-exposure-to-air type coating apparatus constituted by integrating the precoating apparatus 14 and doctor blade 17 into one coating head, and is similar to the above except changing the pressure distribution adjusting device 20, shown in FIG. 8, into the variance suppressing device 220. The variance suppressing device 20 in FIG. 23 is a part of the variance suppressing device 20 that makes the thickness variance in the web traveling direction before the scraping-off of the excess of coating liquid by the lip face 156 for recovery be 20% or less. Then, by making the coating thickness variance of the coating layer in the web traveling direction after the scraping-off of the excess of coating liquid by the lip face 156 for recovery by incorporating the variance suppressing device 220 in the non-exposure-to-air type coating apparatus 110 like this, it is possible to obtain the ultrathin coating film with uniform coating thickness.

As the variance suppressing device 220 built in the non-exposure-to-air type coating apparatus 110, besides the variance suppressing device 20 making the thickness variance in the web traveling direction before the scraping-off the excess of coating liquid by the above-described lip face 156 for recovery be 20% or less, it is possible to use any one of the variance suppressing device 220 making the traveling speed variance of the web 12 be 20% or less, the variance suppressing device 20 making the tension variance in the web traveling direction in a part of the web 12 where pressure is given betweenwith the lip face 156 for recovery be 10% or less, and the variance suppressing device 20 making the viscosity variance of coating liquid be 20% or less, or these variance suppressing devices 220 can be combined. In the case of the variance suppressing device 20 making the thickness variance in the web traveling direction before the scraping-off the excess of coating liquid by the above-described lip face 156 for recovery be 20% or less, as shown in FIG. 23, it is recommendable to arrange the measuring sensor 40 between the discharge opening 130 and covering opening 132A.

EXAMPLES

The test result of examining how the coating thickness variance in the web traveling direction before scraping-off an excess of coating liquid by the scraping-off member, the web traveling speed variance, the tension variance in the web traveling direction in a web portion (a scraping-off position) where pressure is given between with the scraping-off member, and the viscosity variance of coating liquid influence the thickness variance of the final coating layer in the longitudinal direction (the same as the web traveling direction) after the scraping-off by the scraping-off member will be described.
Tests 1 to 6

Figure 22:
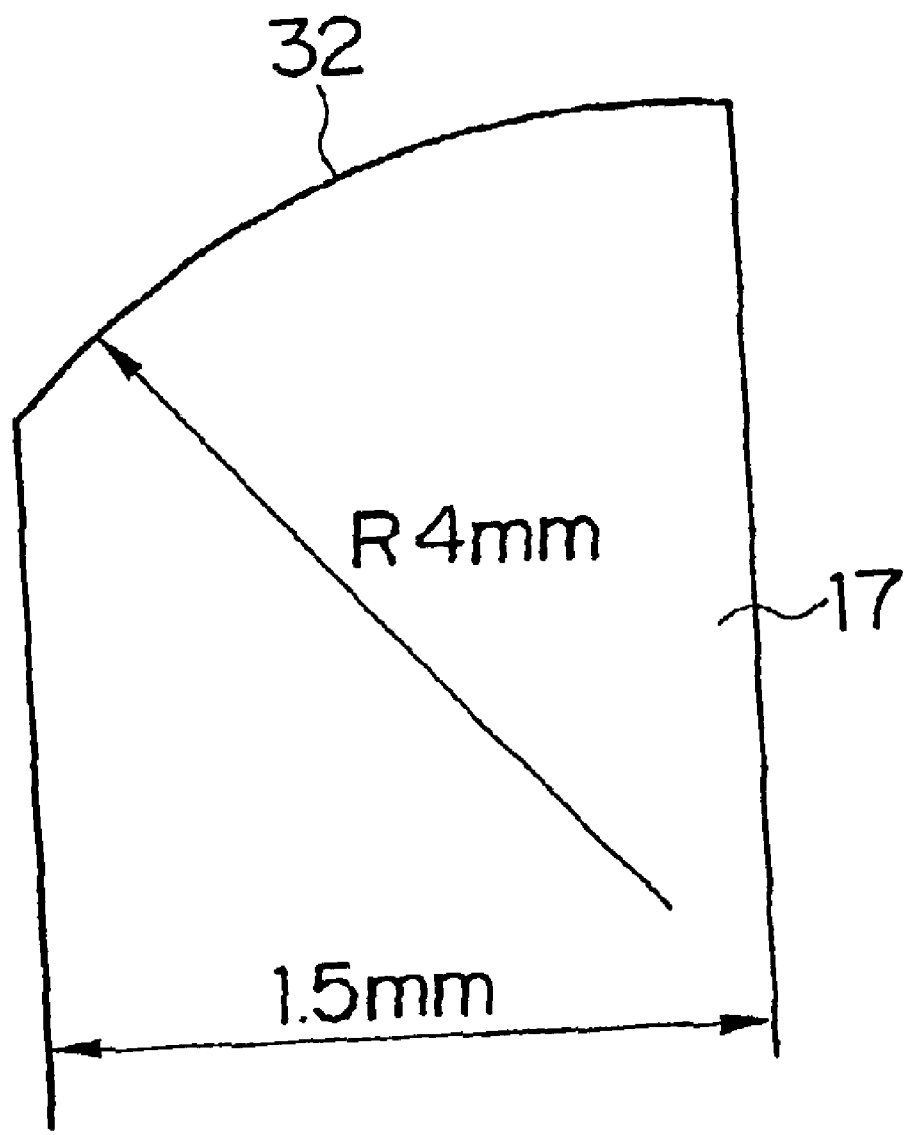
FIG. 22 is a side view of a doctor blade used in the third embodiment of present invention.

As a precoating apparatus, a backed-up extrusion type coating head was used. In addition, a doctor blade, which is shown in FIG. 22 and had an apical surface with a radius of curvature of R4 mm and blade thickness of 1.5 mm, was used as a scraping-off member. As coating conditions, coating liquid A shown in Table 5 was applied at the coating speed of 200 mm/minute on a web made of PEN (polyethylene naphthalate) material at 1000 mm wide and 10 $\mu$m thick so that an average tension in the web traveling direction be 100 kgf/width and precoat coating thickness might become 30 $\mu$m. Next, an excess of the coating liquid was scraped off by the doctor blade to make final film thickness become 1 $\mu$m in a moist (moist) state. Then, the thickness variance of a coating layer in a web traveling direction (hereinafter, it is called "precoat coating thickness variance") by precoating, and the thickness variance of a final coating layer in the web traveling direction after the scraping-off by the doctor blade (hereinafter, it is called "final film thickness variance") were measured with a light transmission type online thickness distribution measuring instrument. Thereafter, each thickness variance ("range %" that is a value obtained by dividing the difference between the maximum value and minimum value of thickness by an average of the thickness) was examined.

Test 1 is a case that satisfies item (1) among the following items that are achievement conditions for achieving 20% or less of "final thickness variance": (1) To make the web traveling speed variance be 20% or less, (2) To make the web tension variance be 10% or less, and (3) To make the precoat thickness variance be 20% or less.

Test 2 is a case where the traveling speed variance was reduced from 14% in test 1 to 9%, and other achievement conditions were made to be the same as those in test 1.

Test 3 is a case where the traveling speed variance was further reduced from 9% in test 2 to 5%, and other achievement conditions were made to be the same as those in test 1.

Test 4 is a case where the tension variance was reduced from 16% in test 3 to 9%, and other achievement conditions were made to be the same as those in test 3.

Test 5 is a case where the precoat coating thickness variance was reduced from 24% in test 4 to 19%, and other achievement conditions were made to be the same as those in test 4.

Test 6 is a case where not only the tension variance was further reduced from 9% in tests 4 and 5 to 6%, but also the precoat coating thickness variance was further reduced from 19% in test 5 to 8%, and other achievement conditions were made to be the same as those in test 5.

As a criterion of the judgment in tests 1 to 6, even if the thickness of the coating layer after the scraping-off by the scraping-off member was 2 $\mu$m or less, which was ultrathin, in a moist state, samples of 20% or less of "final thickness" were ranked B (accepted), and particularly excellent samples among the accepted samples were ranked A.

TABLE 5

| Composition of coating liquid A | Part by weight |
| --- | --- |
| Ferromagnetic fine metal powder | 100 |
| Vinyl chloride copolymer (MR110 made by ZEON Corporation) | 12 |
| Polyurethane resin (UR8200 made by Toyobo Co., Ltd.) | 3 |
| Alpha alumina (HIT55 made by Sumitomo Chemical Co., Ltd.) | 10 |
| Carbon black (#55 made by Asahi Carbon Co., Ltd.) | 5 |
| Phenylphosphonic acid | 3 |
| Butylstearate | 10 |
| Butoxy ethyl stearate | 5 |
| Isohexadecyl stearate | 3 |
| Stearic acid | 2 |
| Methyl ethyl ketone | 180 |
| Cyclohexane | 180 |

After respective components are kneaded by a kneader, each coating liquid in Table 5 was prepared by distributing each component for four hours by using a sand mill, adding poly isocyanate of 10 parts by weight to the obtained dispersion liquid, further adding cyclohexane of 40 parts by weight, and filtering the liquid by a filter having an average aperture of 1 $\mu$m.

The test result is shown in Table 6.

TABLE 6

|  | Variance of traveling speed (%) | Variance of tension (%) | Variance of precoat thickness (%) | Variance of final thickness (%) | Evaluation |
| --- | --- | --- | --- | --- | --- |
| Test 1 | 14 | 16 | 24 | 23 | F |
| Test 2 | 9 | 16 | 24 | 19 | B |
| Test 3 | 5 | 16 | 24 | 17 | A |

TABLE 6-continued

|        | Variance of traveling speed (%) | Variance of tension (%) | Variance of precoat thickness (%) | Variance of final thickness (%) | Evaluation |
|--------|---------------------------------|-------------------------|-----------------------------------|--------------------------------|------------|
| Test 4 | 5 | 9 | 24 | 15 | A |
| Test 5 | 5 | 9 | 19 | 12 | A |
| Test 6 | 5 | 6 | 8  | 6  | A |

As seen from the result in Table 6, as the following achievement conditions are reduced, "Final thickness variance" becomes small to get good result: (1) Web traveling speed variance, (2) Web tension variance, and (3) Precoat thickness variance. This means that these achievement conditions greatly influence the thickness variance in the web traveling direction.

Moreover, as seen from the comparison between test 1, and tests 2 and 3, when only the traveling speed variance satisfies the achievement condition among the above-described three achievement conditions, the final thickness variance exceeds 20% unless the traveling speed variance of 20% or less that is an upper limit of the achievement condition is easily satisfied like tests 2 and 3. Hence, it is further preferable to satisfy all of these three achievement conditions.

Tests 7 to 9

As a precoating apparatus, a supporting-member-pressurizing extrusion type coating head was used. In addition, a flat rod made of cemented carbide with a diameter of 2 mm was used as a scraping-off member. As coating conditions, coating liquid C shown in Table 8 was applied at the coating speed of 200 m/minute on a web made of PEN (polyethylene naphthalate) material, whose surface was covered beforehand by a 2-μm-thick dry film made of coating liquid B shown in Table 7, at 1000 mm wide and 5 μm thick so that traveling speed variance be 5%, precoat coating thickness be 20 μm, and precoat thickness variance be 8%. Next, an excess of the coating liquid was scraped off by the flat rod to make final film thickness become 0.8 μm in a moist (moist) state. The tension variance in the scraping off portion at this time was made to be 6%. Moreover, the liquid that scraped off by the flat rod was recycled as the coating liquid for precoating. When recycling, the viscosity of the scraped-off liquid was measured, and by adding cyclohexane, the viscosity was adjusted to become 20 poise ±1 poise. However, three kinds of intervals when the viscosity adjustment in that case was performed were made to be two hours, one hour, and 30 minutes.

Then, the thickness distribution of a coating layer in a web traveling direction (hereinafter, it is called "precoat coating thickness distribution") by precoating, and the thickness distribution of a final coating layer in the web traveling direction after the scraping-off by the doctor blade (hereinafter, it is called "final film thickness distribution") were measured with a light transmission type online thickness distribution measuring instrument. Thereafter, each thickness variance ("range %" that is a value obtained by dividing the difference between the maximum value and minimum value of thickness by an average of the thickness) was examined.

Test 7 is a case where the viscosity adjustment time of the scraped-off liquid was made to be two hours when all the following achievement conditions are satisfied:

(1) To make the web traveling speed variance be 20% or less, (2) To make the web tension variance be 10% or less, and (3) To make the precoat thickness variance be 20% or less.

Test 8 is a case where the viscosity adjustment time of the scraped-off liquid was made to be two hours, and others were similar to those in test 7.

Test 9 is a case where the viscosity adjustment time of the scraped-off liquid was made to be 30 minutes, and others were similar to those in test 7.

TABLE 7

| Composition of coating liquid B | Part by weight |
|---|---|
| Non-magnetic powder (TiO$_2$: crystalline rutile, average primary particle diameter of 0.035 μm, specific surface area of 40 m$^2$/g by BET method, pH 7, TiO$_2$ content of 90% or more, and DBP oil absorption of 27 to 38 g/100 g, and finishing agent Al$_2$O$_3$: 8 w/t %) | 80 |
| Carbon black (Conductex Sc-U made by Colombian Carbon Co.) | 20 |
| Vinyl chloride copolymer (MR110 made by ZEON Corporation) | 12 |
| Polyurethane resin (UR8200 made by Toyobo Co., Ltd.) | 5 |
| Phenylphosphonic acid | 4 |
| Butylstearate | 1 |
| Stearic acid | 3 |
| Methyl ethyl ketone/cyclohexane (8-to-2 mixed solvent) | 250 |

TABLE 8

| Composition of coating liquid C | Part by weight |
|---|---|
| Barium fertile magnetic powder | 100 |
| Vinyl chloride copolymer (MR555 made by ZEON Corporation) | 5 |
| Polyurethane resin (UR8200 made by Toyobo Co., Ltd.) | 3 |
| Alpha alumina (HIT55 made by Sumitomo Chemical Co. Ltd., particle size of 0.2 μm) | 10 |
| Carbon black (#55 made by Asahi carbon Co., Ltd., average primary particle diameter of 0.075 μm, specific surface area of 35 m$^2$/g by BET method, DBP oil absorption of 81 ml/100 g, pH 7.7, and volatile components of 1.0%) | 1 |
| Phenylphosphonic acid | 2 |
| Butylstearate | 10 |
| Butoxy ethyl stearate | 5 |
| Isohexadecyl stearate | 3 |
| Stearic acid | 2 |
| Methyl ethyl ketone | 125 |
| Cyclohexane | 125 |

After each component is kneaded by a kneader, each coating liquid in Tables 7 and 8 was prepared by distributing each component for four hours by using a sand mill, adding poly isocyanate of 10 parts by weight to the obtained dispersion liquid, further adding cyclohexane of 40 parts by weight, and filtering the liquid by a filter having an average aperture of 1 μm.

The test result is shown in Table 9. The criterion in tests 7 to 9 is similar to that in tests 1 to 6.

TABLE 9

| | Adjustment interval of viscosity adjustment | Variance of viscosity (%) | Variance of final thickness (%) | Evaluation |
|---|---|---|---|---|
| Test 7 | every two hours | 24 | 18 | B |
| Test 8 | every one hour | 18 | 14 | A |
| Test 9 | every 30 minutes | 10 | 6 | A |

As seen from tests 7 to 9 in Table 9, as the adjustment interval when the viscosity adjustment of the scraped-off liquid is performed is shortened, the viscosity variance of the recycled coating liquid becomes small, and as the viscosity variance becomes small, "final film thickness variation" becomes small. This means not only that "final film thickness variation" is influenced by the magnitude of the viscosity variance, but also that it is preferable to shorten the viscosity adjustment interval so as to recycle the scraped-off liquid.

Specifically, when the adjustment interval becomes two hours like test 7, the viscosity variance becomes 24%, and hence, the viscosity variance of 20% or less that is the upper limit is not satisfied. However, in test 7, since all of the traveling speed variance of the web, the tension variance, and the precoat thickness variation that were other conditions were satisfied, "final film thickness variation" became 18% to be a pass.

Moreover, "final film thickness variation" became 14% in test 8 with 18% of viscosity variance to be A, while "final film thickness variation" became 6% in test 9 with 10% of viscosity variance to be better result.

Embodiment 4

Next, the fourth embodiment of the present invention will be described with assigning the same reference numerals to the same members as those in the first to third embodiments.

Figure 24:
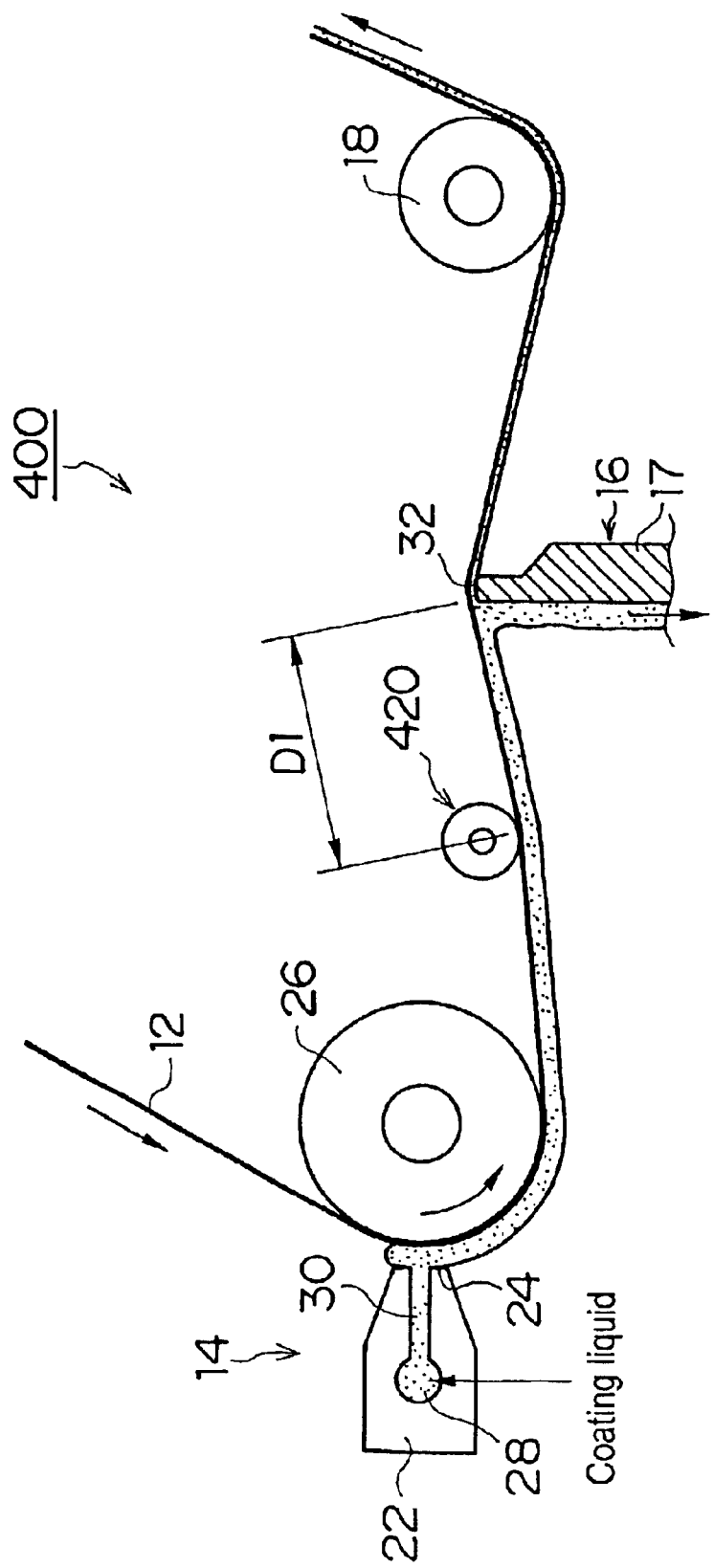
FIG. 24 is a conceptual drawing showing the entire configuration of a coating apparatus where a coating method according to the fourth embodiment of the present invention is applied.

FIG. 24 is a conceptual drawing showing the entire configuration of a scraping-off type coating apparatus 400 where a coating method according to the present invention is applied.

As shown in FIG. 24, the coating apparatus 400 mainly comprises: a precoating apparatus 14 applying coating liquid more than the desired coating quantity on a web 12 traveling continuously; a doctor blade 17 as a scraping-off member 16 that scraps off an excess of coating liquid; and an expander roller 420 that prevents a crimp of the web 12 in a position of the doctor blade 17. In addition, though a backed-up extrusion type coating head will be exemplified as the precoating apparatus 14, the present invention is not limited to this. But, with providing each support roller in upstream and downstream sides of the precoating apparatus 14, it is possible to use an extrusion type, roll coater type, gravure coater type, roll coater plus doctor type, or slide coater type coating head, or the like, which pressurizes the web to press the web 12 against the precoating apparatus 14. In addition, since the arrangement of the precoating apparatus 14 and doctor blade 17 is similar as described in the first embodiment, its description will be omitted.

Then, coating liquid supplied to the pocket section 28 of the coating head 22 rises in the slit 30 after being expanded in a width direction of the web 12 in the pocket section 28, and is discharged from a slit discharge opening. The discharged coating liquid is excessively applied to the web 12 with forming beads between web 12 and the lip face 24 continuously traveling with being supported by the backup roller 26. The doctor blade 17 is arranged so as to be approximately orthogonal to the traveling direction of the web 12, and the expander roller 420 is provided in an upstream side of the doctor blade 17 and the support roller 18 is provided in a downstream side. The expander roller 420 and support rollers 18 are arranged in a position that is lower than an edge of the doctor blade 17. Owing to this, since the web 12 continuously traveling is pressed against an apical surface 32 of the doctor blade 17, an excess of the coating liquid applied to the web 12 is scraped off by the doctor blade 17.

The geometry of an apical surface 32 and the material of the doctor blade 17 are similar as described in FIG. 2.

Figure 25:
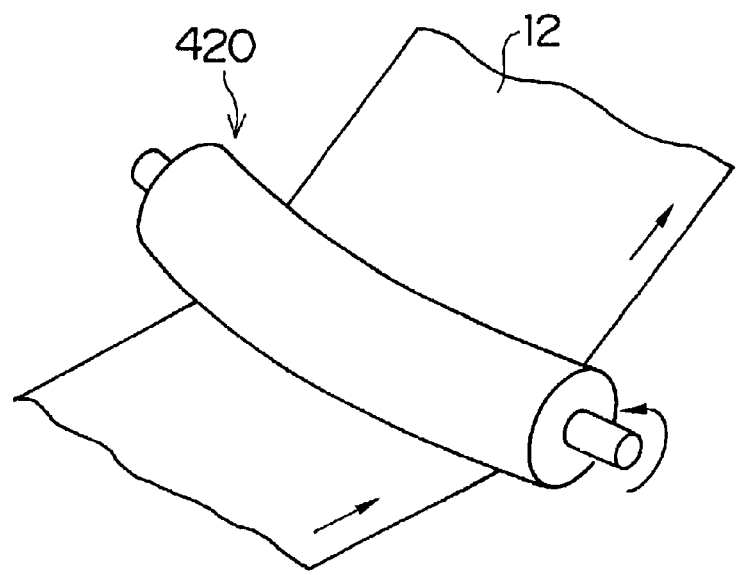
FIG. 25 is a perspective view showing crimp prevention by an expander roller.

The expander roller 420, as shown in FIG. 25, has the geometry of a central section curving downward. Since the web 12 wound around this expander roller 420 is given tension and is expanded in its width direction, a wrinkle, shrinkage, a crimp, and the like of the web 12 are removed.

Moreover, the expander roller 420, as shown in FIG. 24, is arranged in a position where distance D1 from an edge of the doctor blade 17 along the web 12 do not exceed 1000 mm. The crimp prevention effect by the expander roller 420 is effectively obtained within the range of 1000 mm from the expander roller 420 along the web 12. Hence, the web 12 from which the crimp is removed by the expander roller 420 is conveyed in a position of the doctor blade 17 as it is. That is, the crimp of the web 12 in the position of the doctor blade 17 can be prevented by the expander roller 420.

In this manner, according to the coating apparatus 400 of this embodiment, since the expander roller 420 is arranged in the position that is the upstream side of the doctor blade 17 and does not exceed 1000 mm for the distance D1, it is possible to prevent the crimp of the web 12 when the excess of coating liquid is scraped off by the doctor blade 17. Hence, even if ultrathin coating with thickness of 2 μm is performed, it is possible to perform uniform coating without uneven coating.

Figure 26:
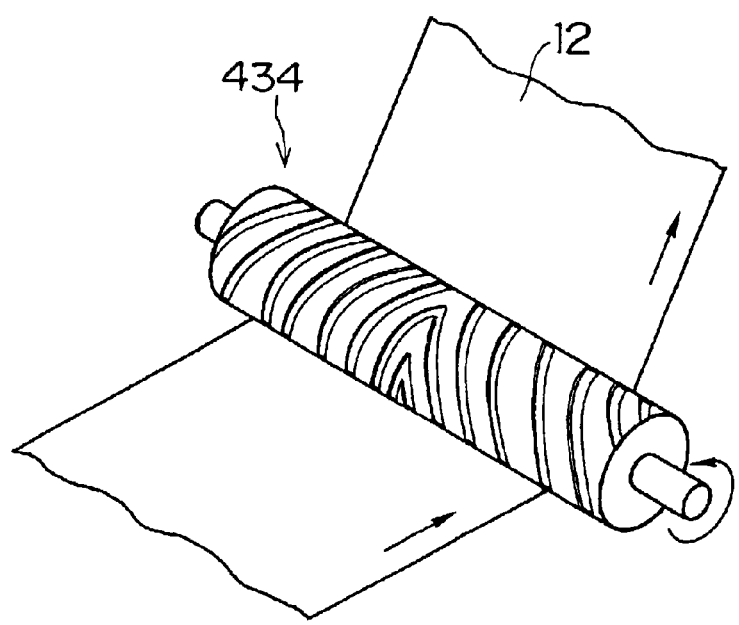
FIG. 26 is a perspective view showing crimp prevention by a grooved roller.

In addition, in the embodiment mentioned above, though the expander roller 420 is arranged in the upstream side of the doctor blade 17, it can be arranged in the downstream. This is because the crimp prevention effect of the expander roller 420 extends to the upstream side of the expander roller 420. In this case also, by arranging the expander roller 420 in the position that does not exceed 1000 mm from the edge of the doctor blade 17 along the web 12, it is possible to prevent the crimp in the position of the doctor blade 17. Moreover, in the embodiment mentioned above, though the expander roller 420 is used as a crimp prevention device, the present invention is not limited to this, but, for example, as shown in FIG. 26, a grooved roller 434 can be used. On a surface of the grooved roller 434 shown in FIG. 26, a plurality of V-shaped grooves extending in the traveling direction of the web 12 from a central section to both ends is formed. When this grooved roller 434 guides the web 12, both edges of the web 12 are pulled outside and tension is given in the width direction, and hence, the crimp of the web 12 can be removed. Moreover, when the grooved roller 434 is installed within 1000 mm from the edge of the doctor blade 17 in the traveling direction of the web 12, the crimp of the web 12 in the position of the doctor blade 17 can be prevented.

Figure 27:
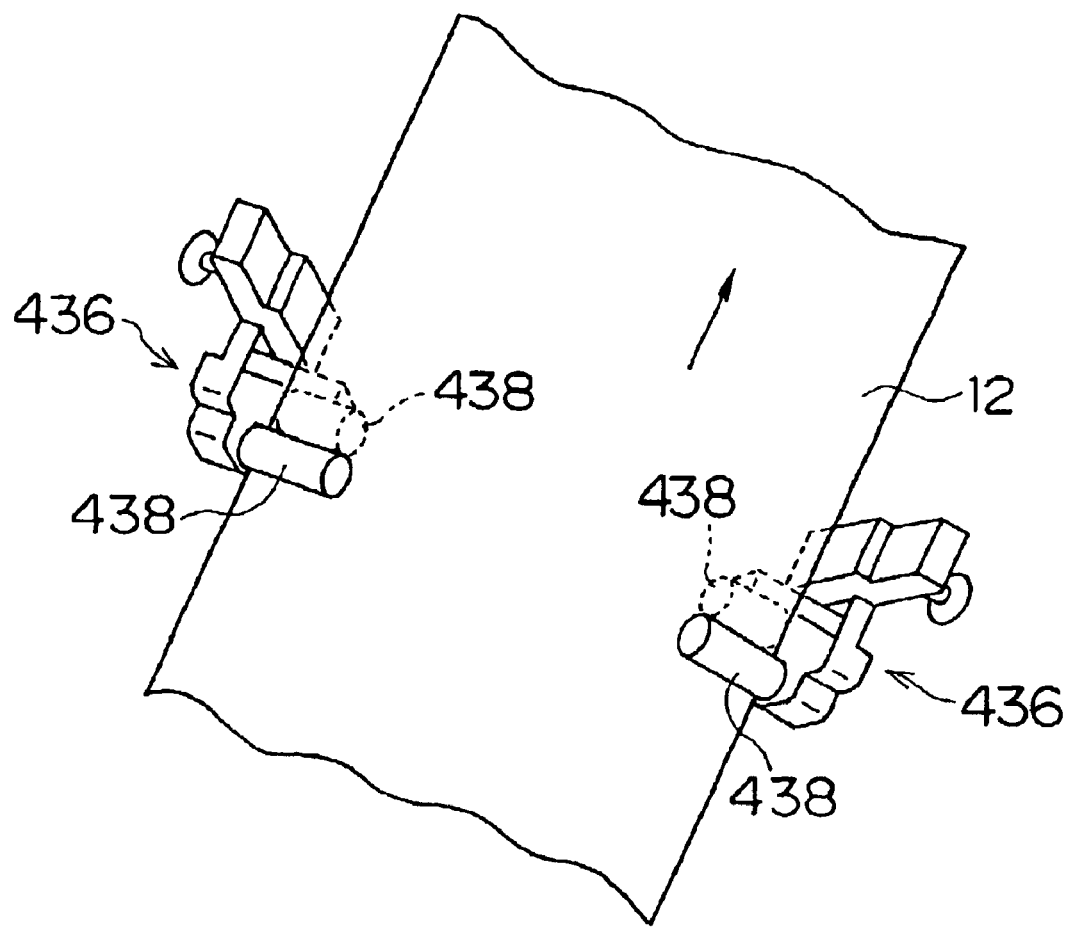
FIG. 27 is a perspective view showing crimp prevention by an edge guider.

Moreover, as other crimp prevention devices, as shown in FIG. 27, a couple of edge guiders 436 and 436 can be installed. The couple of edge guiders 436 and 436 guides the web 12 with sandwiching edges of the web 12 in the width direction with a couple of rollers 438 and 438 respectively. Owing to this, the crimp of web 12 can be removed by giving the tension in the width direction to web 12. Also in the case of using the edge guider 436, by installing the edge guider 436 within 1000 mm from the edge of the doctor blade 17 in the traveling direction of the web 12, the crimp of the web 12 in the position of the doctor blade 17 can be prevented.

In addition, it is also acceptable to make positions of crimp prevention devices such as the expander roller 420, grooved roller 434, and edge guider 436 adjustable along the web 12.

Figure 28:
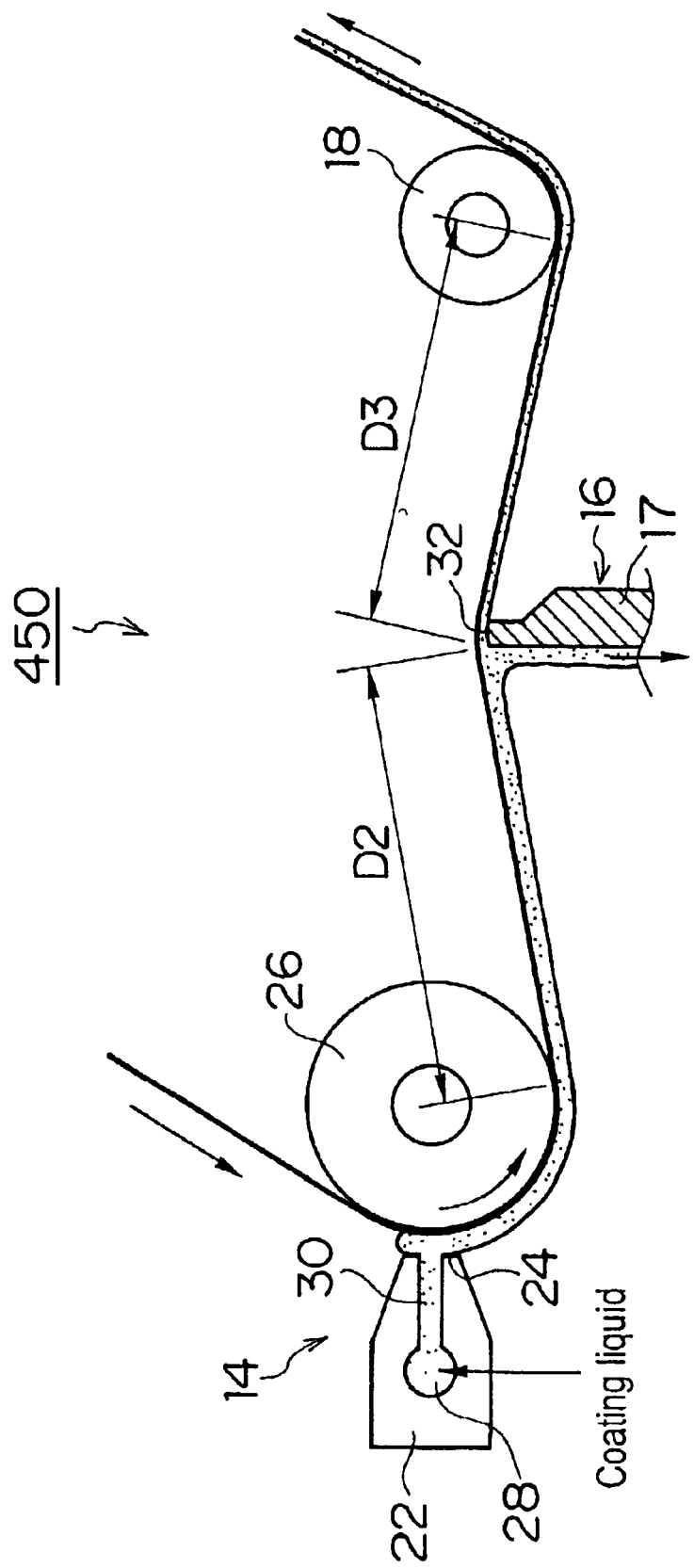
FIG. 28 is a conceptual drawing showing the entire configuration of another coating apparatus where a coating method according to the fourth embodiment of the present invention is applied.

FIG. 28 is a conceptual drawing that shows a coating apparatus 450 of a modified example of the present invention where the backup roller 26 also serves as a crimp prevention device.

The difference between the coating apparatus 450 shown in FIG. 28 and the coating apparatus 400 shown in FIG. 24 is that there is no expander roller 420, and, that the positional relation between the backup roller 26 and doctor blade 17 is restricted. That is, the coating apparatus 450 in FIG. 28 does not have the expander roller 420, and the doctor blade 17 is arranged so that distance D2 from the backup roller 26 along the web 12 may not exceed 200 mm. The backup roller 26 exhibits an effect of eliminating a crimp from the web 12 by winding the web 12, and the crimp prevention effect can be effectively obtained within a range up to 200 mm in the downstream side of the backup roller 26.

In this manner, since the present inventor paid attention to a fact that the backup roller 26 has an effect of eliminating the crimp of the web 12, the doctor blade 17 is installed in the vicinity of the backup roller 26 in the coating apparatus 450 in FIG. 28. Hence, the crimp of the web 12 in the position of the doctor blade 17 can be prevented. Owing to this, an ultrathin coating layer at 2 $\mu$m or less thick can be formed uniformly. Moreover, according to the coating apparatus 450, since it is sufficient only to adjust the relative position of the doctor blade 17 to the backup roller 26, it is not necessary to provide a crimp prevention device such as the expander roller 420.

In addition, though the backup roller 26 is used as a crimp prevention device in the coating apparatus in FIG. 28, the support roller 18 can be used as the crimp prevention device. That is, in the coating apparatus 450 in FIG. 28, it is also acceptable to set distance D3 between the support roller 18 and doctor blade 17 along the web 12 to a value not exceeding 200 mm. The support roller 18 exhibits an effect of eliminating a crimp from the web 12 being wound, and the crimp prevention effect can be effectively obtained within a range up to 200 mm in the upstream side of the support roller 18. Hence, by installing the doctor blade 17 within 200 mm from the support roller 18, the crimp of the web 12 in the position of the doctor blade 17 can be prevented, and uniform coating can be performed.

In addition, it becomes possible to perform more uniform coating by setting the distance D2 and D3 at the same time at 200 mm or less in the coating apparatus 450 shown in FIG. 28.

Moreover, when another support roller (not shown) is installed between the backup roller 26 and doctor blade 17, it is recommendable to make the distance from the support roller to the doctor blade along web 12 not exceed 200 mm. The reason for the effect of the crimp prevention of the support roller is that it reaches even within the range of the downstream 200 mm.

Figure 29:
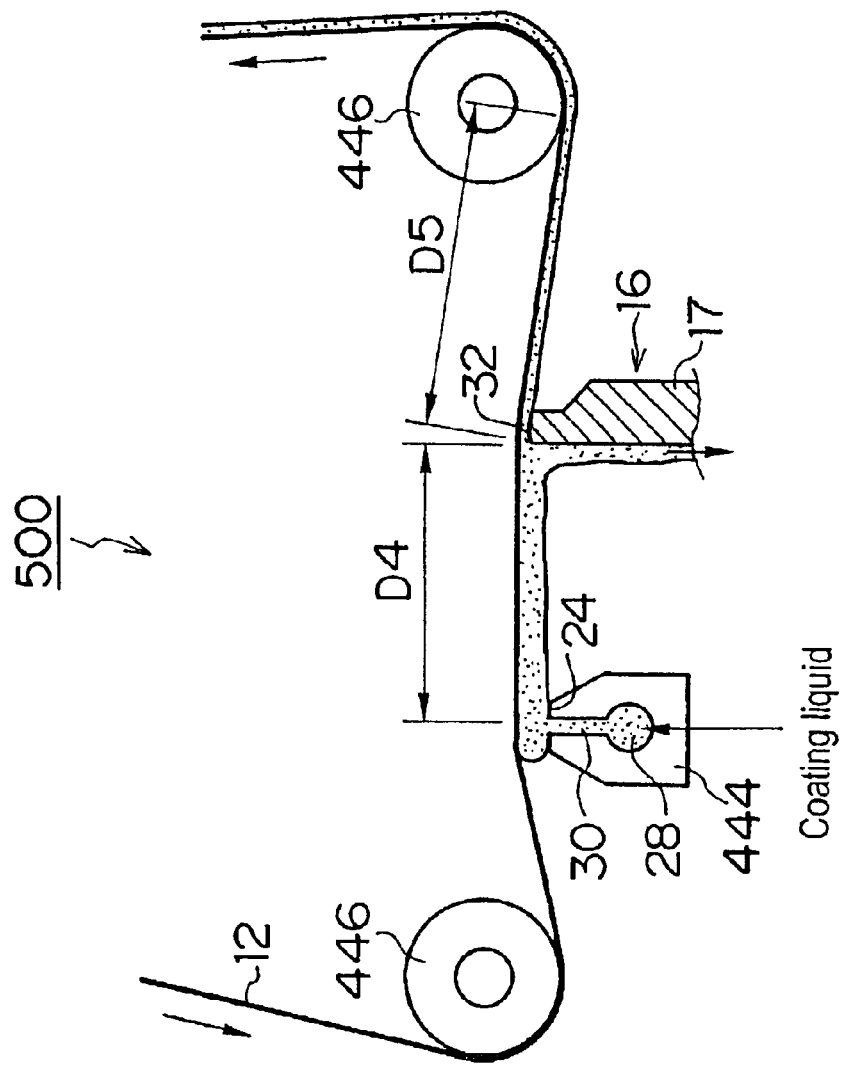
FIG. 29 is a conceptual drawing showing the entire configuration of still another coating apparatus where a coating method according to the fourth embodiment of the present invention is applied.

FIG. 29 is a conceptual drawing that shows a coating apparatus 500 of another modified example where the coating head 44 also serves as a crimp prevention device.

As shown in the figure, the coating apparatus 500 in FIG. 29 comprises a couple of support rollers 446 and 446, and a coating head 444 and the doctor blade 17 that are arranged between this couple of support rollers 446 and 446. The couple of support rollers 446 and 446 are arranged lower than an edge of the coating head 444 and the edge of the doctor blade 17. Hence, the lip face 24 in an edge of the coating head 444 and the apical surface 32 of the doctor blade 17 are relatively pressed against the continuously traveling web 12 that is wound around the couple of support roller 446 and 446. Owing to this, coating liquid is applied on the continuously traveling web 12, and after the coating liquid is exposed to the air, an excess is scraped off by the doctor blade 17.

Moreover, the doctor blade 17 is arranged so that distance D4 from the edge of the coating head 444 along the web 12 may not exceed 200 mm. The coating head 444 exhibits an effect of eliminating a crimp from the web 12 since being relatively pressed against the web 12, and the crimp prevention effect can be effectively obtained within a range up to 200 mm along the web 12. Hence, by installing the doctor blade 17 within 200 mm from the coating head 444, the crimp of the web 12 in the position of the doctor blade 17 can be prevented. Owing to this, it is possible to perform ultrathin and uniform coating without uneven coating.

In the coating apparatus 500 shown in FIG. 29, when distance D5 between the doctor blade 17 and support roller 446 along the web 12 is set at 200 mm or less, the crimp prevention effect by the support roller 446 is obtained, and hence, it is possible to perform more uniform coating.

Figure 30:
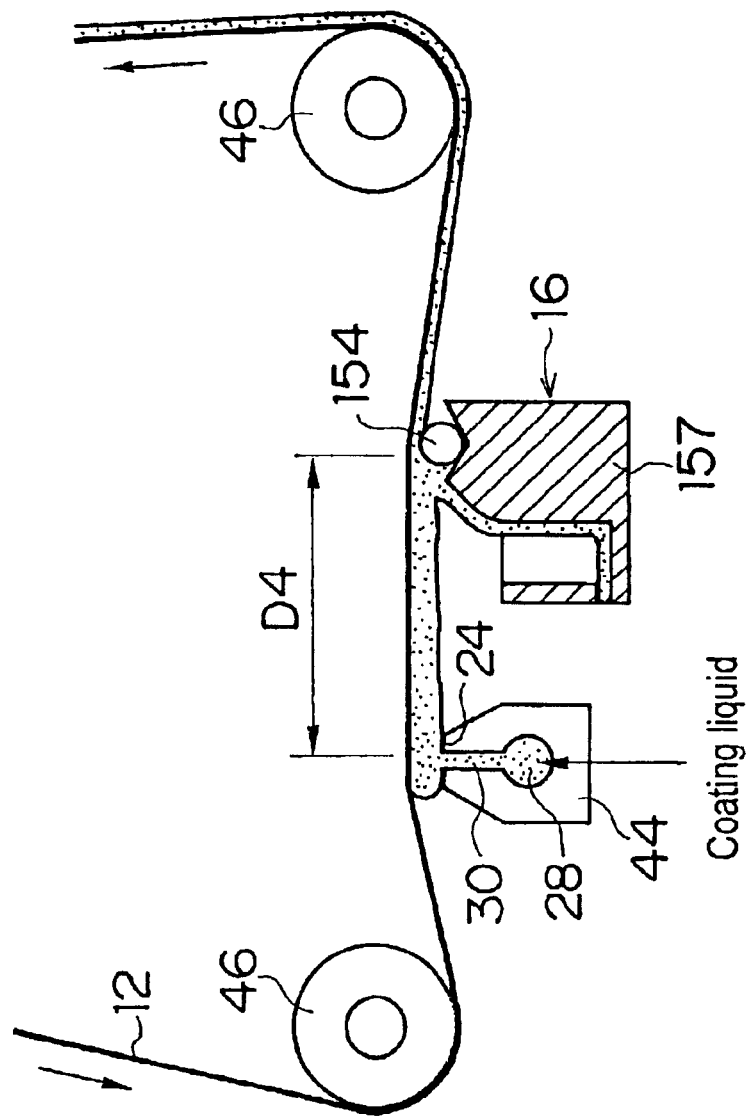
FIG. 30 is a conceptual drawing showing the entire configuration of a coating apparatus that is still another coating apparatus where a coating method according to the fourth embodiment of the present invention is applied and uses a rod type scraping-off member.
Figure 31:
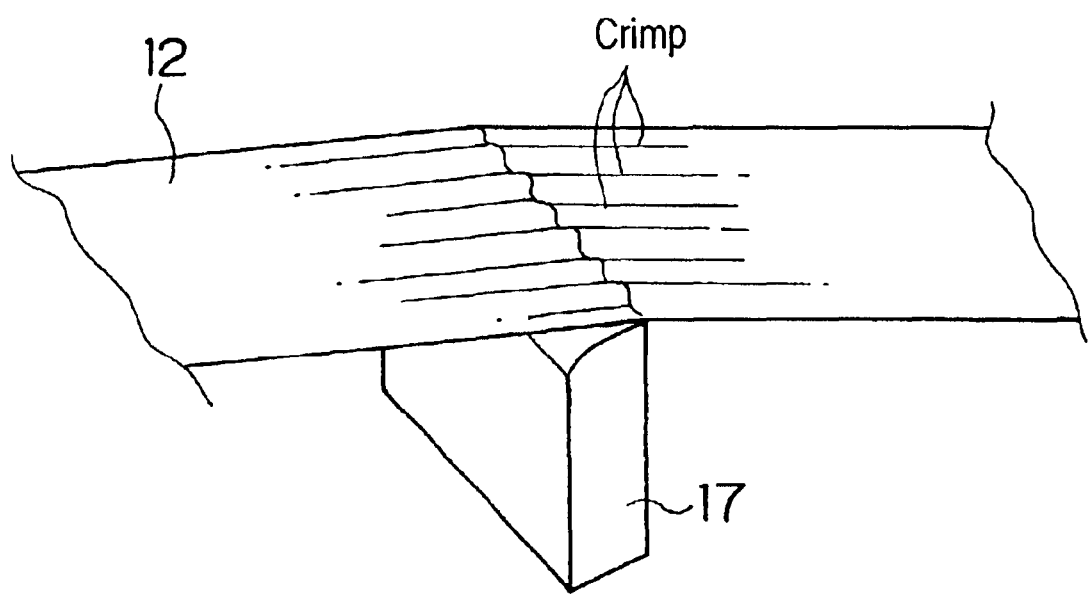
FIG. 31 is an explanatory diagram of crimp.

In addition, though the doctor blade 17 is used as a scraping-off member (applicator) scraping off and measuring the excessive coating liquid in the coating apparatuses in FIGS. 24, 28, and 29 mentioned above, the present invention is not limited to this. For example, FIG. 30 shows a coating apparatus using the rod type scraping-off member 16 instead of the doctor blade 17 in FIG. 29. The rod type scraping-off member 16 is the same as described in FIG. 12.

The coating apparatus shown in FIG. 30 can prevent the crimp of the web 12 in the position of the scraping-off member 16, and can perform ultrathin and uniform coating by making distance D4 between the rod type scraping-off member 16 and coating head 444 along the web 12 at a value that does not exceed 200 mm. In addition, since the rod type scraping-off member 16 has the similar structure described in FIG. 12, its description will be omitted.

In addition, the rod type scraping-off member 16 shown in FIG. 30 can be also applied to the coating apparatus 400 shown in FIG. 24, and to the coating apparatuses 450 and 500 shown in FIGS. 28 and 29. That is, by arranging the rod type scraping-off member 16 instead of the doctor blade 17 in FIG. 24 to make D1 be 1000 mm or less, or, by arranging the rod type scraping-off member 16 instead of the doctor blade 17 in FIG. 27 to make D2, D3, and D4 be 200 mm or less, it is possible to perform ultrathin and uniform coating.

By the way, in such a scraping-off type coating apparatus, the coating liquid that was scraped off and recovered once touched the air between the precoating apparatus 14 and doctor blade 17, and hence, a solvent in the coating liquid has volatilized for liquid physical properties such as viscosity and concentration of solid components to change. To recycle the coating liquid whose viscosity changed as it is adversely influences liquid quantity scraped off by the doctor blade 17, or, the final thickness of the coating film on the doctor blade 17. Hence, it is not possible to recycle the coating liquid unless the liquid preparation for the liquid physical properties such as the viscosity and concentration of solid components has been performed. Hence, it is preferable that the coating apparatus is a coating apparatus (hereinafter, this is called a "non-exposure-to-air type coating apparatus") where the coating liquid applied to the web 12 is not exposed to the air between from the applying the coating liquid on the web 12 to the scraping-off of the excess of the coating liquid.

Figure 32:
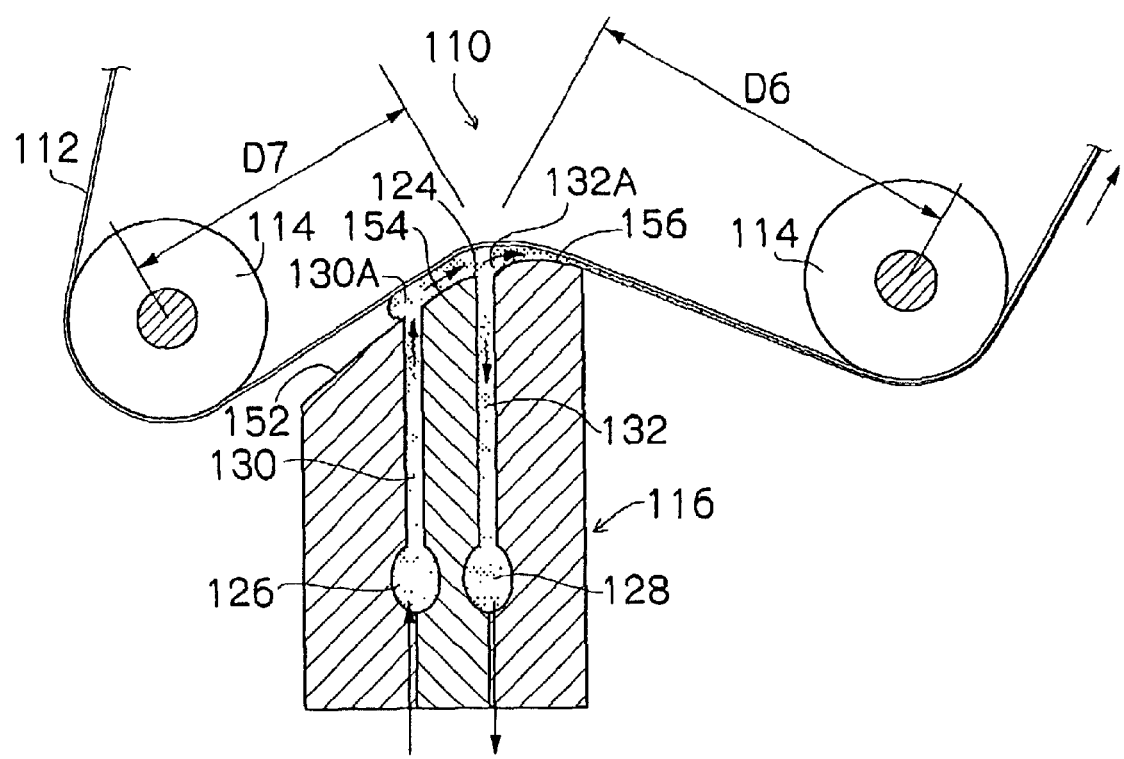
FIG. 32 is a structural diagram showing a coating apparatus that is another form of the fourth embodiment of the present invention and is formed by building a crimp prevention mechanism by support rollers in a non-exposure-to-air type coating apparatus.

FIG. 32 shows an apparatus where a support roller 114 is built in the non-exposure-to-air type coating apparatus, constituted by integrating the precoating apparatus 14 and doctor blade 17 as one coating head, as a device for the crimp prevention of the web 112, and shows the same basic configuration as that in FIG. 8 except that distance D6 between the recovery slit 132 and the support roller 114 in its downstream side along the web 12 is set not to exceed 200 mm. Hence, their description will be omitted.

In the non-exposure-to-air type coating apparatus 110 constituted in this manner, among a back lip face 152, a doctor lip face 154, and a recovery lip face 156 which constitute the lip face 24, a block 157, where the recovery lip face 156 is formed plays the role of the doctor blade 17. That is, the coating liquid that is excessively discharged from the discharge opening 130A and thickly applied on the web 112 arrives at the recovering opening 132A of the slit 132 for recovery in connection with the web 112. Then, a part of the thick coating, that is, the excess of the coating liquid is scraped off by the lip face 156 for recovery. In this case, since the distance D6 between the recovery slit 132 and support roller 114 in its downstream side along the web 12 is set it at a value that does not exceed 200 mm, the support roller 114 exhibits an effect of eliminating the crimp from the wound web 112, and the crimp prevention effect is effectively obtained within the range of 200 mm in the upstream side of the support roller 114. Hence, by installing the support roller 114 in the downstream side within 200 mm from the recovery slit 132 of the coating head 116, the crimp of the web 12 in the position of the recovery slit 132 can be prevented, and uniform coating can be performed. In addition to this setting of the distance D6, when distance D7 from the recovery slit 132 and support roller 114 in the upstream side is set at 200 mm or less, it is possible to perform more uniform coating. In addition, a crimp prevention device of the web 112 built in the non-exposure-to-air type coating apparatus 110 is not limited to the above-described support roller 114, but it is also acceptable to use the expander roller 20, grooved roller 34, or couple of edge guiders 36. When these crimp prevention devices are used, it is necessary to installs them within a range of not exceeding 1000 mm from the recovery slit 132 in the traveling direction of the web 112.

EXAMPLES

Table 10 shows examples and comparative examples in the coating apparatus shown in FIG. 28. In Table 10, a dye coater was used, and coating A was applied on a PET base at 600 mm wide and 100 μm thick at the coating speed of 100 m/min to become 20 μm thick in a moist state. Then, an excess of the coating was scraped by applicators such as a doctor blade, a smooth bar (flat type rod), and a wire bar (wire type rod), and the final film thickness was made to be 2 μm in a moist state. Table 10 shows coating surface condition at the time when distance D2 and D3 in FIG. 28 was changed. A doctor blade used is shown in FIG. 22 (i.e., a doctor blade with the thickness of 1.5 mm and a radius of curvature of 4 mm). Moreover, a smooth bar used was made of cemented carbide and had 1.5 mm dia., and a wire bar used was the outer diameter of 3 mm and the wiring diameter of 80 μm. In addition, criteria of the coating surface condition in Table 10 are A: Excellent, B: Good, C: No problem as a product, and F: Problem as a product. Moreover, coating A will be explained at the end in the explanation of the examples.

TABLE 10

| | Applicator | D2 (mm) | D3 (mm) | Coating surface condition |
|---|---|---|---|---|
| Example 1 | Doctor blade | 220 | 180 | C |
| Example 2 | Doctor blade | 180 | 220 | C |
| Example 3 | Doctor blade | 180 | 180 | B |
| Example 4 | Doctor blade | 90 | 90 | A |
| Example 5 | Flat bar | 180 | 180 | B |
| Example 6 | Wire bar | 180 | 180 | B |
| Comparative example 1 | Doctor blade | 220 | 220 | F |
| Comparative example 2 | Flat bar | 220 | 220 | F |
| Comparative example 3 | Wire bar | 220 | 220 | F |

As shown in Table 10, in a first comparative example where distance D2 and D3 was made to be 220 mm, uneven thickness was generated in its coating surface condition. On the contrary, in a first example where distance D2 was shortened to 180 mm, and a second example where distance D3 was shortened to 180 mm, their coating surface conditions were improved to the extent of no problem as a product. Moreover, in a third example, both distance D2 and D3 were shortened to 180 mm, and hence, an excellent coating surface condition was obtained. Moreover, in a fourth example where distance D2 and D3 was made to be 90 mm, an excellent coating surface condition was obtained.

Moreover, also in the case of using a flat bar or a wire bar as an applicator, a similar tendency was seen. That is, in the second and third comparative examples where distance D2 and D3 was made to be 220 mm, uneven coating was generated in their coating surface conditions, but in the fifth and sixth examples where distance D2 and D3 was made to be 180 mm, good coating surface conditions were obtained.

For this reason, in order to obtain an excellent coating surface condition, it is desirable to make at least one of distance D2 and D3 be 200 mm or less, preferably, to make both of distance D2 and D3 be 200 mm or less, or more preferably, to make both be 90 mm or less.

Table 11 shows examples and comparative examples in the coating apparatus shown in FIG. 29. In Table 11, a dye coater was used, and coating A was applied on a PEN base, having a surface where coating B was applied to be a 2-μm dry film, at 1000 mm wide and 5 μm thickness at the coating speed of 200 m/min to become 10 μm thick in a moist state. Then, an excess of the coating was scraped by applicators such as a doctor blade, a flat bar, and a wire bar, and the final film thickness was made to be 1 μm in a moist state. Table 11 shows the result of coating surface conditions at the time when distance D4 and D5 in FIG. 29 was changed. In Table 11, data of an twelfth example is the result of installing an expander roller in a position of 800 mm in an upstream side of the applicator, and data of a thirteenth example is the result of installing edge guiders in a position of 900 mm in a downstream side of the applicator. In addition, the doctor blade, flat bar, and wire bar used were the same ones as those used in the examples in Table 10. Moreover, coating B will be explained at the end in the explanation of the examples. The criteria of the coating surface conditions in Table 11 are the same as those in Table 10.

TABLE 11

|  | Applicator | D4 (mm) | D5 (mm) | Coating surface condition |
|---|---|---|---|---|
| Example 7 | Doctor blade | 180 | 180 | B |
| Example 8 | Doctor blade | 100 | 180 | B |
| Example 9 | Doctor blade | 100 | 100 | A |
| Example 10 | Flat bar | 180 | 180 | B |
| Example 11 | Wire bar | 180 | 180 | B |
| Example 12 | Doctor blade | 180 | 180 | A |
| Example 13 | Doctor blade | 180 | 180 | A |
| Comparative example 4 | Doctor blade | 220 | 180 | F |
| Comparative example 5 | Flat bar | 220 | 220 | F |
| Comparative example 6 | Wire bar | 220 | 220 | F |

As seen from Table 11, regardless of types of applicators, in fourth to sixth comparative examples where distance D4 was made to be 220 mm, coating thickness distribution was generated in their coating surface conditions, but, in seventh to thirteenth examples where distance D3 was made to be 180 mm or 100 mm, a good coating surface condition was obtained. In particular, in a ninth example where distance D5 as well as distance D4 was made to be 100 mm, excellent coating surface conditions were obtained. Moreover, even if distance D4 and D5 was made to be 180 mm, excellent coating surface conditions were obtained in the twelfth example where the expander roller was installed and the thirteenth example where the edge guiders were installed.

Hereafter, coating A and B used in the examples will be described.

After respective components of raw material shown in the following were mixed with a kneader, coating A and B was distributed respectively for four hours with a sand mill. Then, ten part of poly isocyanate was added to the obtained dispersion liquid, forty part of cyclohexanone was further added, the liquid was filtered by using a filter having an average aperture of 1 $\mu$m, and then, the coating liquid was prepared.

Respective components of raw material of coating A were made to be 100 parts of ferromagnetic fine metal powder, 12 parts of vinyl chloride copolymer (MR110 made by ZEON Corporation), 3 parts of polyurethane resin (UR8200 made by Toyobo Co., Ltd.), 10 parts of alpha alumina (HIT55 made by Sumitomo Chemical Co., Ltd.), 5 parts of carbon black (#55 made by Asahi Carbon Co., Ltd.), 3 parts of phenylphosphonic acid, 10 parts of butylstearate, 5 parts of butoxy ethyl stearate, 3 parts of isohexadecyl stearate, 2 parts of stearic acid, 180 parts of methyl ethyl ketone, and 180 parts of cyclohexanone.

Respective components of raw material of coating B were made to be 80 parts of non-magnetic powder (TiO$_2$: crystalline rutile, average primary particle diameter of 0.035 $\mu$m, specific surface area of 40 m$^2$/g by BET method, pH 7, TiO$_2$ content of 90% or more, and DBP oil absorption of 27 to 38 g/100 g, and finishing agent Al$_2$O$_3$: 8 w/t %), 20 parts of carbon black (Conductex Sc-U made by Colombian carbon co.), 12 parts of vinyl chloride copolymer (MR110 made by ZEON Corporation), 5 parts of polyurethane resin (UR8200 made by Toyobo Co., Ltd.), 4 parts of phenylphosphonic acid, 1 parts of butylstearate, 3 parts of stearic acid, 250 parts of methyl ethyl ketone/cyclohexane (8-to-2 mixed solvent).

Embodiment 5

Next, the fifth embodiment of the present invention will be described with assigning the same reference numerals to the same members as those in the first to fourth embodiments.

Figure 33:
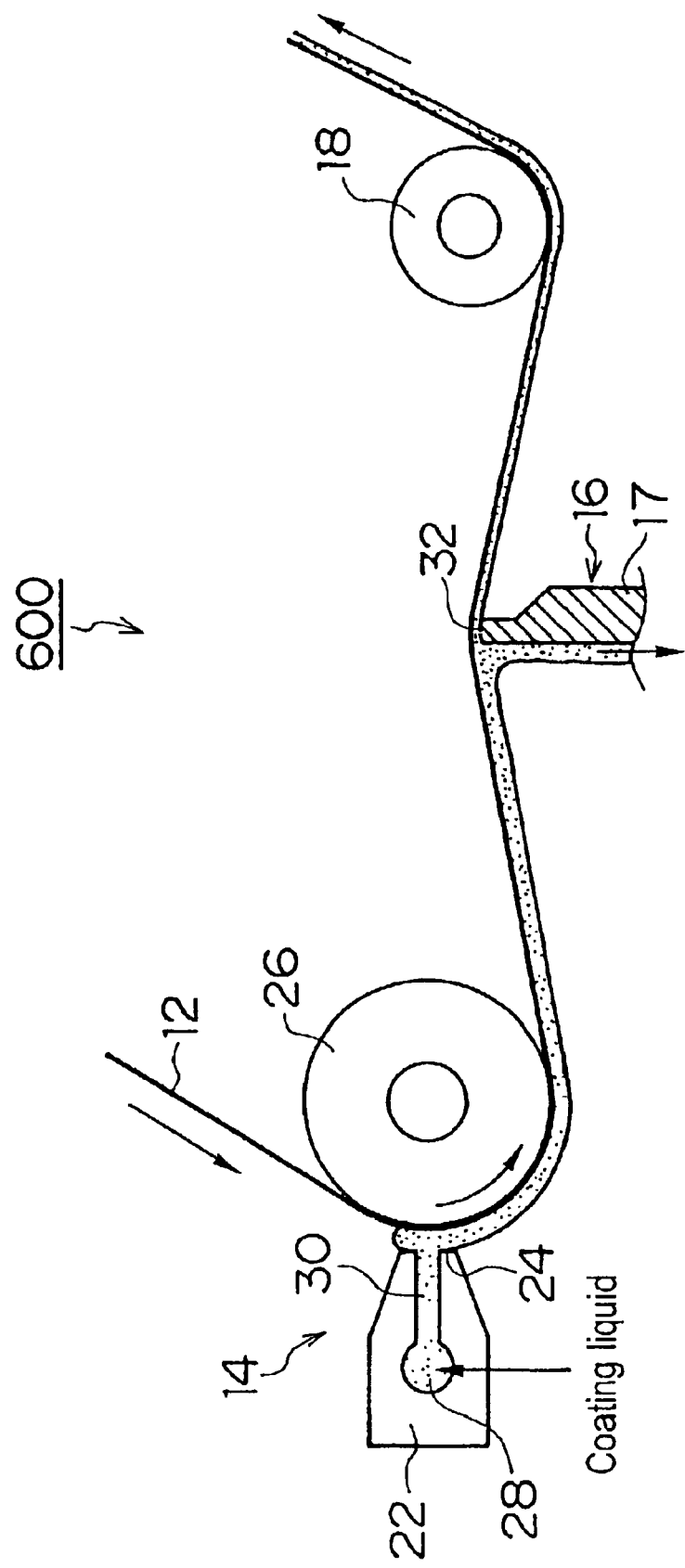
FIG. 33 is a conceptual drawing showing the entire configuration of a scraping-off type coating apparatus according to the fifth and the sixth embodiments of the present invention.

FIG. 33 is a conceptual drawing showing the entire configuration of a scraping-off type coating apparatus 600 according to the present invention.

As shown in FIG. 33, the coating apparatus 600 mainly comprises: a precoating apparatus 14 applying coating liquid more than the desired coating quantity on a web 12 traveling continuously; and a doctor blade 17 as a scraping-off member 16 that scraps off an excess of coating liquid. In addition, though a backed-up extrusion type coating head will be exemplified as the precoating apparatus 14, the present invention is not limited to this. But, with providing each support roller in upstream and downstream sides of the precoating apparatus 14, it is possible to use an extrusion type, roll coater type, gravure coater type, roll coater plus doctor type, or slide coater type coating head, or the like, which pressurizes the web to press the web 12 against the precoating apparatus 14. In addition, since the precoating apparatus 14 is similar as described in FIG. 1, its description will be omitted.

The doctor blade 17 is arranged so as to be approximately orthogonal to the traveling direction of the web 12, and the backup roller 26 is provided in an upstream side of the doctor blade 17 and the support roller 18 is provided in a downstream side. The backup roller 26 and support rollers 18 are arranged in a position that is lower than an edge of the doctor blade 17. Owing to this, since the web 12 continuously traveling is pressed against an apical surface 32 of the doctor blade 17, an excess of the coating liquid applied to the web 12 is scraped off by the doctor blade 17. The material and the like except the apical surface 32 of the doctor blade 17 are similar as described in FIG. 2.

Figure 34:
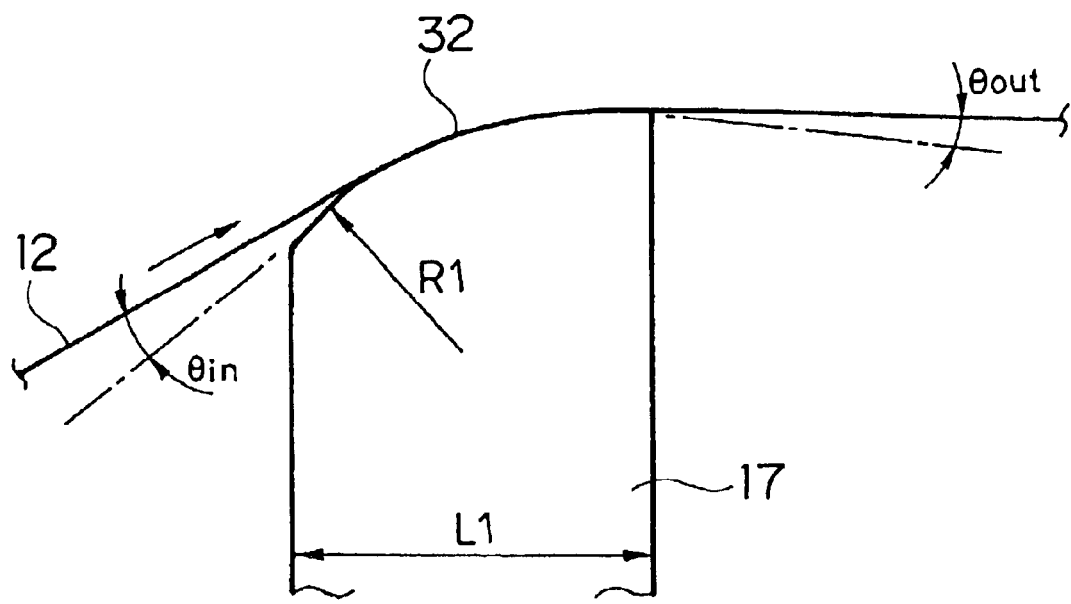
FIG. 34 is a side view showing an edge shape of a doctor blade.

In addition, as shown in FIG. 34, the apical surface 32 of the doctor blade 17 is curvilinearly formed, the web 12 is made to approach to this apical surface 32 with lapping within an incidence angle ($\theta_{IN}$) range of 0.5° to 2°, and a separation angle ($\theta_{OUT}$) is properly set. Owing to this, since it becomes possible to suppress a gap between the apical surface 32 of the doctor blade 17 and the web 12 in several $\mu$m or less, it is possible to make the thickness of a coating layer in a moist state after scraping-off by the doctor blade 17 be ultrathin, that is, 2 $\mu$m or less.

The apical surface 32 of the doctor blade 17 is a curved surface whose radius of curvature, R1 is, for example, 1 mm to 30 mm, and the center of the curved surface is formed in a position close to an side face of the web 12 in a downstream side in the traveling direction of the web 12.

Moreover, blade thickness L1 of the doctor blade 17 is formed within a range of 1 mm to 30 mm. An appropriate shearing force can be given to the aggregation of coating liquid by making the blade thickness L1 within such a range.

Next, the operation of the coating apparatus 10 constituted as described above will be explained.

Since the coating liquid applied on the web 12 by the precoating apparatus 14 is exposed to the air until being scraped off by the doctor blade 17, a part of the solvent is vaporized. At that time, in the case of coating liquid with strong cohesion, for example, coating liquid including ferromagnetic metal or barium ferrite magnetic material, a part of the coating liquid may cohere. This aggregation causes small unevenness that appears in the coating surface condition. Since this unevenness is very small, it did not become a problem for conventional coating thickness, but, when coating with 2 $\mu$m or less is performed in the moist state, it causes a trouble as face roughness. Therefore, a conventional coating apparatus was not able to smoothly form a coating layer of 2 $\mu$m or less in the moist state.

On the contrary, the coating apparatus 600 of this embodiment gives an appropriate shearing force to the aggregation of the coating liquid by making the blade thickness L1 of the doctor blade 17 within the range of 1 mm to 30 mm and unties the aggregation, and hence, a smooth coating surface condition can be obtained. That is, since time that the shearing force is given is short when the blade thickness L1 is 1 mm or less as before, it is not possible to sufficiently untie the aggregation of the coating liquid, and hence, the face roughness is generated. Oppositely, since the flow of the coating liquid between the apical surface 32 and web 12 deteriorates when the blade thickness L1 exceeds 30 mm, the coating liquid collects in doctor blade 17, and hence, uneven coating is caused. Hence, the coating apparatus 600 unties the aggregation of the coating liquid by making the blade thickness L1 of the doctor blade 17 within the range of 1 mm to 30 mm, and hence, it is possible to prevent uneven coating from arising while it is possible to obtain a smooth coating surface condition.

In this manner, the coating apparatus 600 of this embodiment sufficiently breaks the aggregation of the coating liquid by making the blade thickness L1 of the doctor blade 17 within the range of 1 mm to 30 mm, and hence, a smooth coating surface condition without unevenness can be obtained.

In addition, in order to give an appropriate shearing force to the aggregation of the coating liquid, it is important to make the blade thickness L1 be 1 mm to 30 mm, or more preferably, 3 mm to 30 mm, and the various geometry of a tip of the blade can be selected according to necessary coating performance.

Figure 35:
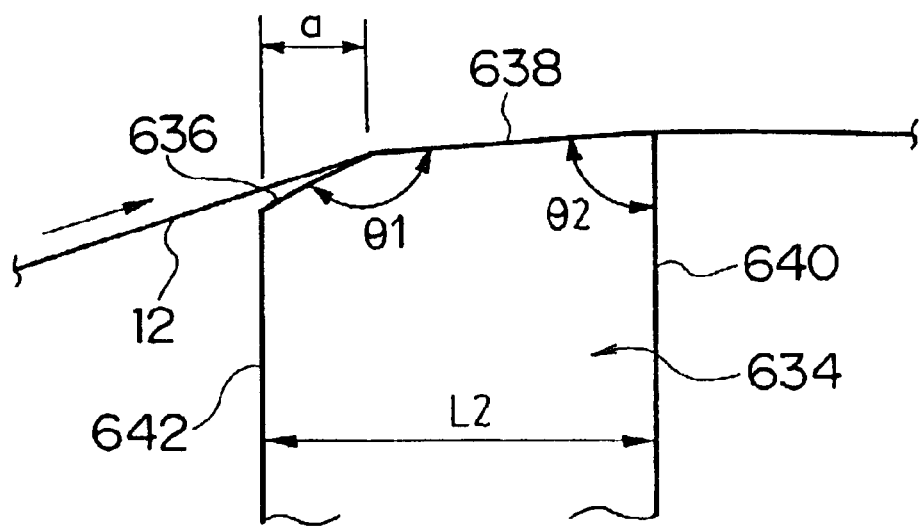
FIG. 35 is a side view showing an edge shape of a doctor blade different from that in FIG. 34.

FIG. 35 is another apical surface geometry of a doctor blade 634, which is formed by two planes 636 and 638 that are consecutively installed. An angle $\theta1$ that the two planes 636 and 638 form is formed at 180° or less, and an angle $\theta2$ formed by the plane 638 and a side face 640 in the downstream side is formed at an angle of 90° or fairly less. Moreover, the consecutively installed position of the plane 636 and plane 638 is provided in a position of distance a from a side face 642 in the upstream side.

In the doctor blade 34 formed as mentioned above, the inclination of the planes 636 and 638 gradually becomes small from the upstream side to the downstream side. That is, since the shearing force gradually grows from the upstream side to the downstream side, this is effective geometry for untying the aggregation of the coating liquid. In addition, in the apical surface geometry shown in FIG. 35, though the number of planes is two, it is also good to make the number be three or more, and in this case also, it is recommendable to make the inclination gradually become small from the upstream side to the downstream side.

Figure 36:
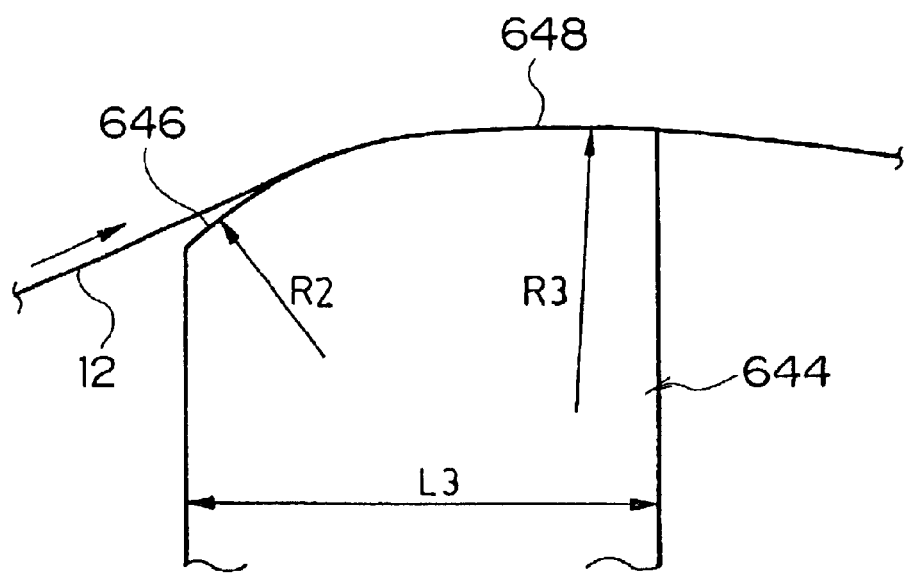
FIG. 36 is a side view showing an edge shape of a doctor blade different from that in FIG. 34.

An apical surface of a doctor blade 644 shown in FIG. 36 is formed by two curved surfaces 646 and 648 consecutively formed, and the curved surface 646 in the upstream side has a larger curvatures than that of the curved surfaces 648 in the downstream side. That is, a radius of curvature R2 of the curved surface 646 is formed smaller than a radius of curvature R3 of the curved surfaces 648.

In the doctor blade 644 formed in this manner, since the shearing force gradually grows from the upstream side to the downstream side, this is effective geometry for untying the aggregation of the coating liquid. In addition, in the apical surface geometry shown in FIG. 36, though the number of curved surfaces is two, it is also good to make the number be three or more, and in this case also, it is recommendable to make the curvature gradually become small from the upstream side to the downstream side.

Figure 37:
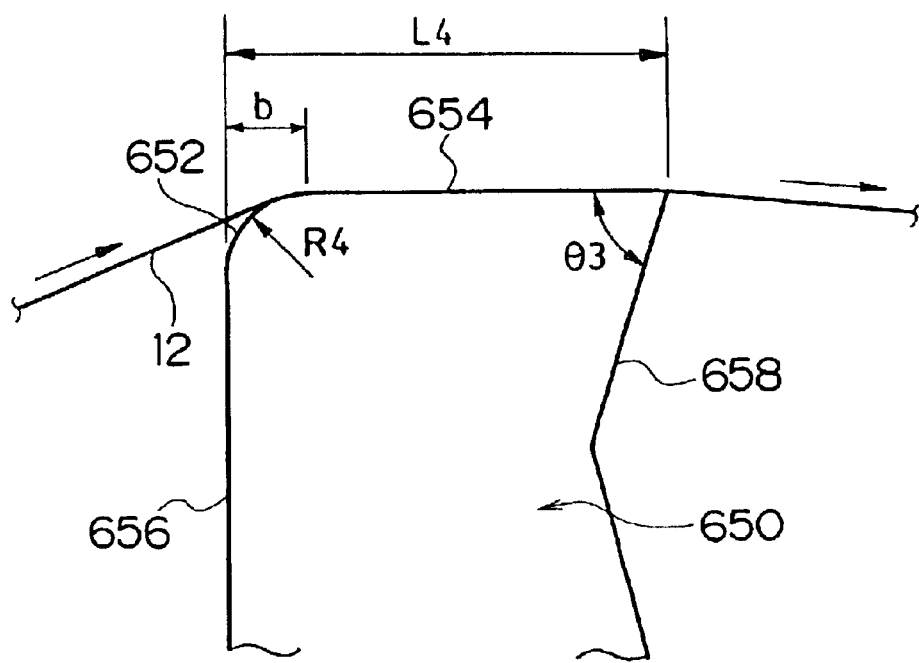
FIG. 37 is a side view showing an edge shape of a doctor blade different from that in FIG. 34.

An apical surface of a doctor blade 650 shown in FIG. 37 has the geometry of combining a curved surface 652 with a plane 654. That is, the geometry is a curved surface 652 by roundly chamfering an edge of the plane 654 in an upstream side in a position of distance b from the side face 656. Since an edge in the downstream side is formed so that an angle $\theta3$ may become an acute angle, this becomes the geometry that makes the coating liquid on the web 12 not easily run on the side face 658. Owing to this, it is possible to further reduce uneven coating at the time when the coating liquid is scraped off by the doctor blade 650. In addition, by winding a lower section of the side face 658 outward, it is possible to strengthen the doctor blade 650.

In the doctor blade 650 formed as mentioned above, not only the shearing force grows in a portion of the curved surface 652, but also an enough shearing force is given in a portion of the plane 654. Hence, this has the effective geometry for untying the aggregation of the coating liquid.

In this manner, since the doctor blades 634, 644, and 650 shown in FIGS. 35 to 37 have effective geometry for untying the aggregation of the coating liquid, it can be prevented that the coating surface gets rough.

In addition, also the doctor blades 634, 644, and 650 shown in FIGS. 35 to 37 can prevent face roughness and uneven coating by making the blade thickness L2, L3, and L4 be 1 mm to 30 mm, and can form an ultrathin and smooth coating layer.

By the way, in such a scraping-off type coating apparatus, the coating liquid that was scraped off and recovered once touched the air between the precoating apparatus 14 and doctor blade 17, and hence, a solvent in the coating liquid has volatilized for liquid physical properties such as viscosity and concentration of solid components to change. To recycle the coating liquid whose viscosity changed as it is adversely influences liquid quantity scraped off by the doctor blade 17, or, the final thickness of the coating film on the doctor blade 17. Hence, it is not possible to recycle the coating liquid unless the liquid preparation for the liquid physical properties such as the viscosity and concentration of solid components has been performed. Hence, it is preferable that the coating apparatus is a coating apparatus (hereinafter, this is called a "non-exposure-to-air type coating apparatus") where the coating liquid applied to the web 12 is not exposed to the air between from the applying the coating liquid on the web 12 to the scraping-off of the excess of the coating liquid.

Figure 38:
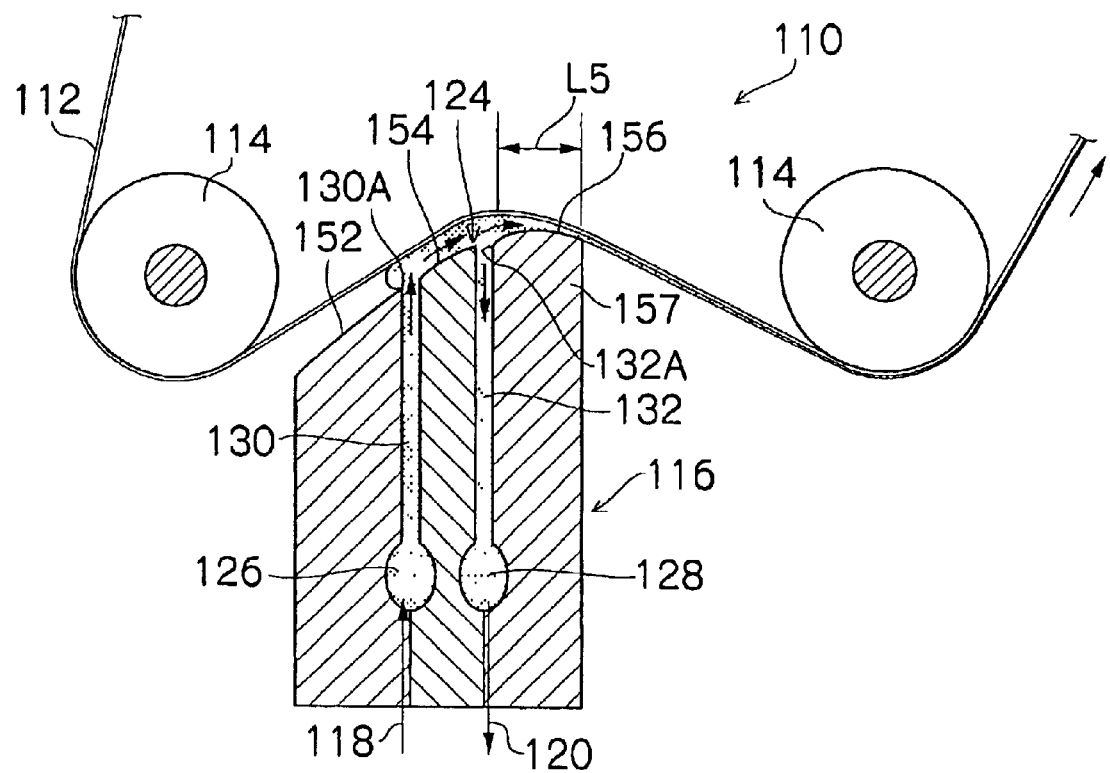
FIG. 38 is a structural diagram showing a non-exposure-to-air type coating apparatus that is another form of the fifth embodiment of the present invention.

FIG. 38 shows a non-exposure-to-air type coating apparatus where the precoating apparatus 14 and doctor blade 17 are constituted as one coating head.

As shown in FIG. 38, the non-exposure-to-air type coating apparatus 110 mainly comprises a support roller 114 supporting the traveling of the web 112, a coating head 116, a supply line 118 that supplies coating liquid, which is more than the desired coating quantity to be applied on the web 112, to coating head 116, and a recovery line 120 recovering the excess of the coating liquid. Since the non-exposure-to-air type coating apparatus 110 in FIG. 38 has the basic structure similar to that in FIG. 8 except that a block 157 constituting a coating head 116 is regarded as a portion that plays the role of a doctor blade and the blade thickness L5 of the block 157 is made within a range of 1 mm to 30 mm, its description will be omitted.

Then, the coating liquid that is excessive than desired coating quantity to be applied on the web 112 is supplied from the supply line 118 to the pocket section 126 for coating of the coating head 116. In addition, a surplus of the coating liquid recovered to the pocket section 128 for recovery by the slit 132 for recovery is discharged from the coating head 116 by the recovery line 120. A couple of support rollers 114 is provided in upstream and downstream sides in the web traveling direction with making the coating head 116 as a border while being arranged in a position that is lower than a top of the coating head 116. Owing to this, the continuously traveling web 112 is made to be close to the lip face 124 of the coating head 116 with pressure.

In the non-exposure-to-air type coating apparatus 110 constituted in this manner, a block 157, where a lip face 156 for recovery is formed, among a back lip face 152, a doctor lip face 154, and a lip face 156 for recovery that constitute the lip face 24 plays a role of the doctor blade 17. That is, the coating liquid that is excessively discharged from the discharge opening 130A and thickly applied on the web 112 arrives at the recovering opening 132A of the recovery slit 132 in connection with the web 112. Then, a part of the thick coating, that is, the excess of the coating liquid is scraped off by the recovery lip face 156. Hence, the non-exposure-to-air type coating apparatus 110 unties the aggregation of the coating liquid by making the blade thickness L5 of the block 157, where the recovery lip face 156 is formed, within the range of 1 mm to 30 mm, or preferably 3 mm to 30 mm, and hence, it is possible to prevent uneven coating from arising while it is possible to obtain a smooth coating surface condition. In this case, the various geometry of the recovery lip face 156 shown in FIGS. 34 to 37 can be selected according to necessary coating performance.

EXAMPLES

Tables 12–14 show the test result of examining the dependency of blade thickness of doctor blades on the surface roughness Ra of coating surfaces.

In a test according to Table 10, a dye coater was used as a precoat, and coating A was applied on a PEN base at 1000 mm wide and 10 μm thick at the coating speed of 200 m/min to become 30 μm thick in a moist state. Then, an excess of the coating A was scraped by the doctor blade 17 shown in FIG. 34, final film thickness was made to be 1 μm in a moist state. Table 12 shows the result of the test of changing the blade thickness L1 with fixing a radius of curvature R1 of the apical surface 32 of the doctor blade 17 to 15 mm.

In the test according to Table 12, coating C was applied on an aramid base at 300 mm wide by 4 μm thick at the coating speed of 400 m/min by using the supporting-member-pressurizing dye coater as a precoat to become 10 μm thick in a moist state. Then, an excess of the coating A was scraped by the doctor blade 634 shown in FIG. 35, final film thickness was made to be 0.5 μm in a moist state. Table 13 shows the result of the test of changing the blade thickness L2 with fixing an angle θ1 to 160°, an angle θ2 to 90°, and distance a to 0.5 mm.

In the test according to Table 14, coating C was applied on a PEN base, on a surface of which coat B was applied in a 2-μm dry film, at 1000 mm wide by 5 μm thick at the coating speed of 400 m/min by using the supporting-member-pressurizing dye coater as a precoat to become 10 μm thick in a moist state. Then, an excess of the coating C was scraped by the doctor blade 50 shown in FIG. 37, and final film thickness was made to be 0.5 μm in a moist state. Table 14 shows the result of the test of changing the blade thickness L4 with fixing a radius of curvature R4 of the doctor blade 650 to 2 mm, an angle θ3 to 70°, and distance b to 0.5 mm.

Moreover, coating A to C will be explained at the end in the explanation of the examples.

TABLE 12

| | Blade thickness L1 | Uneven coating | Coating surface roughness Ra | Judgment |
|---|---|---|---|---|
| Example 1 | 1.0 mm | No | 10.0 nm | B |
| Example 2 | 3.0 mm | No | 8.6 nm | A |
| Example 3 | 10.0 mm | No | 7.7 nm | A |
| Comparative example 1 | 0.8 mm | No | 24.4 nm | F |

TABLE 13

| | Blade thickness L2 | Uneven coating | Coating surface roughness Ra | Judgment |
|---|---|---|---|---|
| Example 4 | 1.0 mm | No | 9.8 nm | B |
| Example 5 | 3.0 mm | No | 8.3 nm | A |
| Example 6 | 10.0 mm | No | 7.9 nm | A |
| Example 7 | 30.0 mm | No | 8.0 nm | A |
| Comparative example 2 | 0.8 mm | No | 26.4 nm | F |
| Comparative example 3 | 40.0 mm | Yes | Unmeasurable | F |

TABLE 14

| | Blade thickness L4 | Uneven coating | Coating surface roughness Ra | Judgment |
|---|---|---|---|---|
| Example 8 | 1.0 mm | No | 9.4 nm | B |
| Example 9 | 3.0 mm | No | 7.3 nm | A |
| Example 10 | 10.0 mm | No | 6.4 nm | A |
| Example 11 | 30.0 mm | No | 6.1 nm | A |
| Comparative example 4 | 0.8 mm | No | 24.1 nm | F |
| Comparative example 5 | 40.0 mm | Yes | Unmeasurable | F |

As seen from Tables 12 to 14, though first, second, and fourth comparative examples whose blade thickness L1, L2, and L4 were smaller than 1 mm had no uneven coating, surface roughness Ra of the coating surfaces became more than 20 nm for face roughness to be observed. In addition, though third, and fifth comparative examples whose blade thickness L2, and L4 were larger than 30 mm had very small surface roughness of the coating surfaces, uneven coating arose. On the other hand, it was possible to obtain a good coating surface without uneven coating and surface roughness by making the blade thickness L1, L2, and L4 within 1 mm to 30 mm in first to eleventh examples.

In addition, as another test, coating A was applied on a PEN base, on a surface of which coating B was applied in a 0.8-μm dry film, at 1000 mm wide by 5 μm thick at the coating speed of 400 m/min by using the supporting-member-pressurizing dye coater as a precoat to become 10 μm thick in a moist state. Then, an excess of the coating A was scraped by the doctor blade 44 shown in FIG. 36, and final film thickness was made to be 1 μm in a moist state. Table 15 shows the result of the test of changing a radius of curvature R3 and the blade thickness L3 with fixing a radius of curvature R2 of the doctor blade 44 to 2 mm.

TABLE 15

| | R3 | Blade thickness L3 | Uneven coating | Coating surface roughness Ra | Judgment |
|---|---|---|---|---|---|
| Example 12 | 4 mm | 1.0 mm | No | 10.0 nm | B |
| Example 13 | 8 mm | 3.0 mm | No | 8.3 nm | A |
| Example 14 | 20 mm | 10.0 mm | No | 7.3 nm | A |
| Example 15 | 50 mm | 30.0 mm | No | 6.4 nm | A |
| Comparative example 6 | 3 mm | 0.8 mm | No | 27.1 nm | F |
| Comparative example 7 | 80 mm | 40.0 mm | Yes | Unmeasurable | F |

As seen from Table 15, also when the size of R3 was changed by changing the blade thickness L3, uneven coating and face roughness were caused according to the size of blade thickness L3. That is, in the sixth comparative examples where blade thickness L3 was smaller than 1 mm, surface roughness was generated, in the seventh comparative example where blade thickness L3 was larger than 30 mm, uneven coating was generated, but in the twelfth to fifteenth examples where blade thickness L3 was made to be within 1 mm to 30 mm, good coating surface conditions were obtained.

Next, coating A to C used in the examples will be described.

After respective components of raw material shown in the following were mixed with a kneader, coating A to C was distributed respectively for four hours with a sand mill. Then, ten parts of poly isocyanate was added to the obtained dispersion liquid, and then cyclohexanone was properly added for preparation such that viscosity at the shear rate of 1000 (l/s) became a predetermined value, the liquid was filtered by using a filter having an average aperture of 1 μm, and then, the coating liquid was obtained. Here, as a predetermined value of the viscosity, in the case of the coating A, B type viscosity was made to be 4 Pa·s and high shear viscosity was 10 mPa·s, in the case of the coating B, B type viscosity was made to be 0.1 Pa·s and high shear viscosity was 20 mPa·s, and in the case of the coating C, B type viscosity was made to be 1 Pa·s and high shear viscosity was 10 mPa·s. This high shearing viscosity is viscosity at the shear velocity of 40000 (l/s) with a Roto-visco viscosimeter.

Respective components of raw material of coating A were made to be, 100 parts of ferromagnetic fine metal powder, 12 parts of vinyl chloride copolymer (MR110 made by ZEON Corporation), 3 parts of polyurethane resin (UR8200 made by Toyobo Co., Ltd.), 10 parts of alpha alumina (HIT55 made by Sumitomo Chemical Co. Ltd.), 5 parts of carbon black (#55 made by Asahi Carbon Co., Ltd.), 3 parts of phenylphosphonic acid, 10 parts of butylstearate, 5 parts of butoxy ethyl stearate, 3 parts of isohexadecyl stearate, 2 parts of stearic acid, 180 parts of methyl ethyl ketone, and 180 parts of cyclohexanone.

Respective components of raw material of coating B were made to be 80 parts of non-magnetic powder (TiO$_2$: crystalline rutile, average primary particle diameter of 0.035 μm, specific surface area of 40 m$^2$/g by BET method, pH 7, TiO$_2$ content of 90% or more, and DBP oil absorption of 27 to 38 g/100 g, and finishing agent Al$_2$O$_3$: 8 w/t %), 20 parts of carbon black (Conductex Sc-U made by Colombian carbon co.), 12 parts of vinyl chloride copolymer (MR110 made by ZEON Corporation), 5 parts of polyurethane resin (UR8200 made by Toyobo Co., Ltd.), 4 parts of phenylphosphonic acid, 1 parts of butylstearate, 3 parts of stearic acid, 250 parts of methyl ethyl ketone/cyclohexane (8-to-2 mixed solvent).

Respective components of raw material of coating C were made to be, 100 parts of barium ferrite magnetic powder, 5 parts of vinyl chloride copolymer (MR555 made by ZEON Corporation), 3 parts of polyurethane resin (UR8200 made by Toyobo Co., Ltd.), 10 parts of alpha alumina (HIT55 made by Sumitomo Chemical Co. Ltd., particle size: 0.2 μm), 1 part of carbon black (#55 made by Asahi carbon Co., Ltd., average primary particle diameter of 0.075 micrometers, specific surface area of 35 m$^2$/g by BET method, DBP oil absorption of 81 ml/100 g, pH 7.7, and volatile components of 1.0%), 3 parts of phenylphosphonic acid, 10 parts of butylstearate, 5 parts of butoxy ethyl stearate, 3 parts of isohexadecyl stearate, 2 parts of stearic acid, 125 parts of methyl ethyl ketone, and 125 parts of cyclohexanone.

Embodiment 6

Next, the sixth embodiment of the present invention will be described with assigning the same reference numerals to the same members as those in the first to fifth embodiments.

A coating method of the sixth embodiment regulates a concentration of solid components in coating liquid. A coating apparatus where the method of the present invention is applied is similar to the coating apparatus 600 in FIG. 33, and the arrangement, geometry of the apical surface 32, and material of the doctor blade 17 are similar as described in FIGS. 2 and 14, and hence, their description will be omitted.

By the way, in the coating apparatus 600, a measure to make the concentration of solid components of the coating liquid on the web 12 be 80% or less in a position of the doctor blade 17 is implemented. Specifically, the concentration of solid components is made to be 80% or less by controlling solvent evaporate at predetermined quantity (preferably, 50% of initial solvent quantity) or less. Here, what are mentioned as the solid components are, for example, magnetic powder and metal oxide such as ferromagnetic fine metal powder, and hexaferrite powder; inorganic compounds such as metal carbonate, metal sulfate, metal nitride, and metal carbide; and binders such as thermoplastic resins, thermosetting resins, and reactive resins. Moreover, what are mentioned as the solvents are ketone systems such as acetone, methyl ethyl ketone, methyl isobutyl ketone, and cyclohexanone; alcohol systems such as methanol, ethanol, propanol, and butanol; esters such as methyl acetate, ethyl acetate, butyl acetate, ethyl lactates, and glycol monoethyl ether acetate; glycol ether systems such as ether, glycol dimethyl ethers, glycol monoethyl ether, and dioxane; tar systems such as benzene, toluenes, and xylenes (aromatic hydrocarbon); and methylene chloride, ethylene chloride, carbon tetrachloride, chloroform, ethylenechlorhydrine, dichlorobenzene, etc.

There are three types in rough classification as methods of controlling solvent evaporate: (1) Method of controlling solvent evaporate with adjusting evaporation time of a solvent, (2) Method of controlling solvent evaporate with adjusting temperature of coating liquid to be applied, and (3) Method of controlling solvent evaporate with adjusting temperature of web 12 to be coated. Hereafter, concrete examples of three types of methods will be explained.

(1) In the method of adjusting the evaporation time of a solvent, the precoating apparatus 14 and doctor blade 17 are arranged at a short interval so that the evaporation time may become 0.2 sec or less. In this manner, by shortening the evaporation time, since the solvent evaporate of coating liquid decreases, it is possible to suppress the concentration of solid components in coating liquid at 80% or less. In addition, if a mechanism that can adjust a position of the doctor blade 17 in the width direction of the web 12, it is possible to simply correspond a change of traveling speed of the web 12.

(2) In the method of controlling the temperature of the coating liquid, the temperature of the coating liquid is controlled at the temperature that is lower by predetermined temperature (preferably, 30° C.) from a boiling point of the lowest boiling point solvent in the coating liquid. For example, when the boiling point of a lowest boiling point solvent is 80° C., the temperature of the coating liquid is controlled at 50° C. In this manner, by applying the controlled coating liquid at low temperature from the precoating apparatus 14, the solvent evaporate decreases, and hence, it is possible to suppress a concentration of solid components at 80% or less. In addition, in order to control the temperature of the coating liquid, it is recommendable to install a heat exchanger (not shown) in a supply line supplying the coating liquid to the coating head 22 of the precoating apparatus 14, and to cool the coating liquid at fixed temperature with this heat exchanger.

(3) In the method of controlling the temperature of web 12, the temperature of web 12 in a position of the precoating apparatus 14 is controlled so that the temperature of web 12 may become temperature that is low by predetermined temperature (preferably, 30° C.) from the boiling point of the lowest boiling point solvent of the coating liquid. For example, when the boiling point of the lowest boiling point solvent is 80° C., the temperature of the coating liquid is controlled at 50° C. In this manner, by applying the coating liquid on the web 12 at low temperature, the solvent evaporate decreases, and hence, it is possible to suppress a concentration of solid components at 80% or less. In addition, as a method of making the web 12 at low temperature, it is recommendable to blow cold wind etc. to the continuously traveling web 12 in an upstream side of the precoating apparatus 14, or to store a web roll (not shown), where the web 12 supplied to the precoating apparatus 14 is wound, at predetermined temperature beforehand.

The above-described methods (1) to (3) can be adopted separately, or with combining a plurality of methods. Moreover, the method of controlling the solvent evaporate is not limited to the methods (1) to (3), but, for example, a cover (not shown) that covers the coating surface can be also installed along the coating surface of the web 12 from the position of the precoating apparatus 14 to the position of the doctor blade 17. Since the solvent that evaporates from the coating liquid on the web 12 does not diffuse easily by providing this cover, a concentration of the solvent rises near the web 12. Hence, since the evaporation of the solvent decreases, the concentration of solid components in the position of the doctor blade 17 can be suppressed at 80% or less. Moreover, as another method, components of the coating liquid supplied to the precoating apparatus 14 can be also prepared. For example, the coating liquid containing the lowest boiling point solvent that has a high boiling point can be prepared, or the coating liquid where the concentration of solid components is low beforehand can be prepared.

As described above, it is possible to make the concentration of solid components in the coating liquid in the position of the doctor blade 17 be 80% or less by controlling the solvent evaporate. When the concentration of solid components in the coating liquid is made to be 80% or less, the coating liquid flows smoothly between the apical surface 32 of the doctor blade 17 and the web 12, and hence, the solid components never causes a coating stripe. Hence, according to the coating apparatus 10 of this embodiment, it is possible to perform ultrathin and uniform coating without a coating stripe.

In addition, though the doctor blade 17 is used as a scraping-off member (applicator) scraping off and measuring the excessive coating liquid in the above-mentioned embodiment, the present invention is not limited to this, it is also acceptable to use a rod type scraping-off member (i.e., a flat type rod whose surface is flat, a wire type rod around which a wire is wound thickly, a grooved rod where a groove is formed in the circumferential direction on an outer surface, or the like) or the like.

EXAMPLES

Methyl ethyl ketone was added to the coating A to prepare the coating A at the predetermined concentration of solid components, and the coating A was applied on a PET base of 600 mm thick as a precoat by using the dye coater. Then, an excess of the coating A was scraped by the doctor blade shown in FIG. 14, final film thickness was made to be 1 $\mu$m in a moist state. The doctor blade shown in FIG. 14 is formed with having a radius of curvature of 4 mm for its apical surface and blade thickness of 1.5 mm, and is arranged with its left side face facing in the upstream side in the traveling direction of the web.

Table 16 shows the result of measuring with adjusting the temperature of the coating liquid at 35° C. and the temperature of the web at 25° C., and changing various parameters. In Table 16, the initial concentration is a concentration of solid components of the precoat liquid adjusted by adding methyl ketone to the coating A, and the middle concentration is a concentration of solid components of the applying in a scraping-off position. Moreover, the distance is distance from the precoat position to the scraping-off position. Moreover, it was determined that A was excellent, B was good, and F was remarkable scraping-off unevenness as the evaluation in Table 16.

Moreover, coating A will be explained at the end in the explanation of the examples.

TABLE 16

|  | Initial concentration | Thickness | Coating speed | Distance | Intermediate concentration | Coating surface condition |
| --- | --- | --- | --- | --- | --- | --- |
| Example 1 | 30% | 10 $\mu$m | 60 m/min | 20 cm | 75% | B |
| Example 2 | 30% | 10 $\mu$m | 240 m/min | 30 cm | 60% | B |
| Example 3 | 30% | 30 $\mu$m | 60 m/min | 30 cm | 53% | A |
| Example 4 | 20% | 10 $\mu$m | 60 m/min | 30 cm | 51% | B |
| Example 5 | 20% | 10 $\mu$m | 240 m/min | 30 cm | 32% | A |
| Example 6 | 10% | 10 $\mu$m | 60 m/min | 30 cm | 24% | B |

TABLE 16-continued

|  | Initial concentration | Thickness | Coating speed | Distance | Intermediate concentration | Coating surface condition |
|---|---|---|---|---|---|---|
| Example 7 | 10% | 10 μm | 240 m/min | 30 cm | 15% | A |
| Comparative example 1 | 30% | 10 μm | 60 m/min | 30 cm | 81% | F |

As shown in Table 16, when the coating was performed under the conditions of the first comparative example, the concentration of solid components at the time of scraping off became 81%, and the scraping-off unevenness was generated.

On the other hand, in the first example, by shorten the distance between the doctor blade and precoating apparatus to 20 cm, the intermediate concentration decreased to 75%, and a good coating surface condition was obtained. Moreover, in a second example, the concentration of solid components became 60% by increasing the coating speed to 240 m/min, and a good coating surface condition was obtained. In consideration of these in the evaporation time, the evaporation time was 0.3 sec in the first comparative example. On the other hand, it was 0.2 sec in the first example, and 0.075 sec in the second example. Hence, it can be seen that, when the evaporation time is made to be 0.2 sec or less, the intermediate concentration lowers to 80% or less, and a good coating surface condition is obtained.

In the third example, the intermediate concentration became 53% by increasing the precoat thickness to 30 μm, and an excellent coating surface condition could be obtained. This is conceivable that a relative ratio of the evaporation of the solvent decreases by increasing the precoat thickness, and hence, the intermediate concentration of solid components decreased greatly.

In the fourth example, since the initial concentration of solids of the precoat liquid was made to be 20% that was low, the intermediate concentration also decreased to 51%, and a good coating surface condition was obtained. In this manner, also by setting the initial concentration of solid components of the precoat liquid to be low, it is possible to lower the intermediate concentration, and to obtain a good coating surface condition.

Moreover, in the fifth example, since the coating speed was increased to 240 m/min faster than that in the fourth example, the concentration of solid components further decreased to 32%, and hence, an excellent coating surface condition was obtained.

In the sixth example, since the initial concentration of the solid components of the precoat liquid was further lowered to 10% than that in the fourth example, the intermediate concentration lowers to 24%, a good coating surface condition was obtained. Moreover, in a seventh example, since the coating speed was increased to 240 m/min faster than that in the sixth example. Moreover, since the intermediate concentration lowers further to 15%, an extremely good coating surface condition was obtained.

From the result in Table 16, by performing the shortening of evaporation time, increase of precoat thickness, and decrease of a concentration of solid components in precoat liquid, it is possible to lower the concentration of solid components in the scraping-off section, and a good coating surface condition can be obtained. Then, it can be seen that, in order to obtain a good coating surface condition, it is preferable to make the concentration of solid components in the scraping-off section be 80% or less.

Table 17 shows the influence of the coating liquid temperature and web temperature. In Table 17, a supporting-member-pressurizing dye coater was used, and coating B and C was applied on an aramid base with 4 μm thick and 600 mm wide, having a surface where coating D was applied to be a 2-μm dry film, at 1000 mm wide by 10 μm thick on a PEN base. In its downstream side, an excess of the coating was scraped off in a position apart 30 cm with φ1.5-flat bar made of cemented carbide, and the final film thickness was made to be 2 μm in a moist state. In Table 2, the meaning and criteria of the intermediate concentration and coated-face condition are the same as those in Table 16. Moreover, the coating B, C, and D will be explained at the end in the explanation of the examples.

TABLE 17

|  | Coating liquid | Coating liquid temperature | Web temperature | Intermediate concentration | Coating surface condition |
|---|---|---|---|---|---|
| Example 8 | Coating B | 40° C. | 20° C. | 41% | B |
| Example 9 | Coating B | 20° C. | 20° C. | 30% | A |
| Example 10 | Coating C | 20° C. | 20° C. | 55% | B |
| Example 11 | Coating B | 20° C. | 40° C. | 44% | B |
| Example 12 | Coating B | 20° C. | 50° C. | 63% | B |
| Comparative example 2 | Coating C | 30° C. | 20° C. | 83% | F |
| Comparative example 3 | Coating B | 20° C. | 60° C. | 82% | F |
| Comparative example 4 | Coating C | 20° C. | 30° C. | 85% | F |

As seen from Table 17, when the coating B was used, a good coating surface condition was obtained by setting the web temperature and coating liquid temperature to be low. That is, in the third comparative example where the web temperature was 60° C. that was high, scraping-off unevenness was generated. On the contrary, the eighth example where the coating liquid temperature was 40° C. that was low, and the eleventh and the twelfth examples where the web temperature was 40° C. and 50° C. that were low, good coating surface conditions were obtained. Moreover, in the tenth example where both the coating liquid temperature and web temperature were 20° C. that was low, an excellent coating surface condition was obtained. Owing to this, it can be seen that a good coating surface condition can be obtained by setting the coating liquid temperature and web temperature to be low.

On the other hand, when the coating C was used, a similar tendency was seen, and good coating surface conditions were obtained by setting the web temperature and coating liquid temperature to be low. That is, in a second comparative example where the coating liquid temperature was 30° C., and a fourth comparative example where the web temperature was 30° C., scraping-off unevenness was generated, but in the tenth example where both the coating liquid temperature and web temperature were 20° C. that was low, a good coating surface condition was obtained.

Moreover, from Table 2, it can be seen that the coating liquid temperature and web temperature at which good coating surface conditions are obtained are different according to the coating B and C. That is, in the case of the coating B, when the coating liquid temperature and web temperature were 50° C. or the like, excellent coating surface conditions were obtained, but on the contrary, in the case of the coating C, when 26° C. or less, good coating surface conditions were obtained. This is conceivable that this cause is the difference of the lowest boiling point solvents contained in the coating B and C. That is, the lowest boiling point solvent of the coating B is ethylmethyl ketone (boiling point: about 80° C.), and the lowest boiling point solvent of the coating C is acetone (boiling point: about 56° C.). Therefore, it is conceivable that it the intermediate concentration of solid components easily arises since the solvent of the coating C evaporates more easily than that of the coatings B. From the above-mentioned result, it can be seen that, in order to obtain a good coating surface condition, it is good to set the coating liquid temperature and web temperature according to the boiling point of the lowest boiling point solvent contained in the coating. Specifically, it can be seen that, in order to obtain a good excellent coating surface condition, it is good to make the coating liquid temperature and web temperature be values that are lower by 30° C. or more than the boiling point of the lowest boiling point solvent of the coating.

Next, the coating A to D will be described.

After respective components of raw material shown in the following were mixed with a kneader, the coating A and D was distributed respectively for four hours with a sand mill. Then, ten parts of poly isocyanate was added to the obtained dispersion liquid, the liquid was filtered by using a filter having an average aperture of 1 $\mu$m, and then, the coating liquid was prepared. Moreover, the coating B was prepared with adding methyl ethyl ketone of 180 g to the coating A and agitating them. The coating C was prepared with adding acetone of 180 g to the coating A and agitating them.

Respective components of raw material of coating A were made to be 100 parts of ferromagnetic fine metal powder, 12 parts of vinyl chloride copolymer (MR110 made by ZEON Corporation), 3 parts of polyurethane resin (UR8200 made by Toyobo Co., Ltd.), 10 parts of alpha alumina (HIT55 made by Sumitomo Chemical Co., Ltd.), 5 parts of carbon black (#55 made by Asahi Carbon Co., Ltd.), 3 parts of phenylphosphonic acid, 10 parts of butylstearate, 5 parts of butoxy ethyl stearate, 3 parts of isohexadecyl stearate, 2 parts of stearic acid, and 180 parts of cyclohexanone.

Respective components of raw material of coating D were made to be 80 parts of non-magnetic powder (TiO$_2$: crystalline rutile, average primary particle diameter of 0.035 micrometers, specific surface area of 40 m$^2$/g by BET method, pH 7, TiO$_2$ content of 90% or more, and DBP oil absorption of 27 to 38 g/100 g, and finishing agent Al$_2$O$_3$: 8 w/t %), 20 parts of carbon black (Conductex Sc-U made by Colombian carbon co.), 12 parts of vinyl chloride copolymer (MR110 made by ZEON Corporation), 5 parts of polyurethane resin (UR8200 made by Toyobo Co., Ltd.), 4 parts of phenylphosphonic acid, 1 parts of butylstearate, 3 parts of stearic acid, 250 parts of methyl ethyl ketone/cyclohexane (8-to-2 mixed solvent).

According to a coating method and a coating apparatus of the present invention, it is possible to give ultrathin and uniform coating on a web lest a coating defect should arise in scraping-off type coating. Hence, the coating apparatus according to the present invention is effective in particular for forming an ultrathin magnetic layer, which is unprecedented and is 2 $\mu$m or less thick, like a magnetic recording medium in recent years.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A coating apparatus which applies a coating liquid on a continuously traveling web with a precoating apparatus excessively than desired quantity of the coating liquid, and scrapes off an excess of the coating liquid with a doctor blade with relatively pressing the doctor blade on a coated side surface of the web, the apparatus comprising:

a pressure distribution adjusting device which adjusts pressure distribution between the doctor blade and the web in a width direction of the web; and wherein the pressure distribution adjusting device comprises a roller inclination mechanism that has a roller in at least one of an upstream side and a downstream side of the doctor blade in a traveling direction of the web, and inclines the roller in the width direction of the web by an inclination mechanism.

2. The coating apparatus of claim 1, wherein said rollers are expander rollers.

3. The coating apparatus of claim 1, wherein a curvature of an edge face of the doctor blade is 1–30 mm.

4. The coating apparatus of claim 1, wherein a thickness of the coating liquid applied on said web after being scraped off by the doctor blade is 2 $\mu$m or less in a wet condition.

5. A coating apparatus which applies a coating liquid on a continuously traveling web with a precoating apparatus excessively than desired quantity of the coating liquid, and scrapes off an excess of the coating liquid with a doctor blade with relatively pressing the doctor blade on a coated side surface of the web, the apparatus comprising:

a pressure distribution adjusting device which adjusts pressure distribution between the doctor blade and the web in a width direction of the web, wherein the pressure distribution adjusting device comprises a blade inclination mechanism that inclines the doctor blade including the tip of the doctor blade facing the web in the width direction of the web.

6. The coating apparatus of claim 5, wherein a curvature of an edge face of the doctor blade is 1–30 mm.

7. The coating apparatus of claim 5, wherein a thickness of the coating liquid applied on said web after being scraped off by the doctor blade is 2 $\mu$m or less in a wet condition.

* * * * *